(12) United States Patent
Tonkovich et al.

(10) Patent No.: US 7,507,274 B2
(45) Date of Patent: *Mar. 24, 2009

(54) SEPARATION PROCESS USING MICROCHANNEL TECHNOLOGY

(75) Inventors: Anna Lee Tonkovich, Dublin, OH (US); Steven T. Perry, Galloway, OH (US); Ravi Arora, Dublin, OH (US); Dongming Qiu, Bothell, WA (US); Michael Jay Lamont, Hilliard, OH (US); Deanna Burwell, Cleveland Heights, OH (US); Terence Andrew Dritz, Worthington, OH (US); Jeffrey S. McDaniel, Columbus, OH (US); William A. Rogers, Jr., Marysville, OH (US); Laura J. Silva, Dublin, OH (US); Daniel J. Weidert, Lewis Center, OH (US); Wayne W. Simmons, Dublin, OH (US); G. Bradley Chadwell, Reynoldsburg, OH (US)

(73) Assignee: Velocys, Inc., Plain City, OH (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/367,044

(22) Filed: Mar. 2, 2006

(65) Prior Publication Data
US 2006/0249020 A1 Nov. 9, 2006

Related U.S. Application Data

(60) Provisional application No. 60/657,930, filed on Mar. 2, 2005.

(51) Int. Cl.
*B01D 53/04* (2006.01)
*B01J 19/00* (2006.01)
(52) U.S. Cl. .............................. 95/106; 95/115; 95/130; 95/143

(58) Field of Classification Search ..................... 95/90, 95/95–106, 114, 115, 130, 143, 148
See application file for complete search history.

(56) References Cited

U.S. PATENT DOCUMENTS

| 3,710,547 A | 1/1973 | Nelson ........................... 55/58 |
| 4,392,362 A | 7/1983 | Little ............................ 62/514 |

(Continued)

FOREIGN PATENT DOCUMENTS

| CA | 2247662 | 3/1999 |

(Continued)

OTHER PUBLICATIONS

International Preliminary Report on Patentability, Application No. PCT/US2006/007595, mailed Jul. 19, 2007.

(Continued)

*Primary Examiner*—Frank M Lawrence
(74) *Attorney, Agent, or Firm*—Renner, Otto, Boisselle & Sklar, LLP

(57) ABSTRACT

The disclosed invention relates to a process and apparatus for separating a first fluid from a fluid mixture comprising the first fluid. The process comprises: (A) flowing the fluid mixture into a microchannel separator in contact with a sorption medium, the fluid mixture being maintained in the microchannel separator until at least part of the first fluid is sorbed by the sorption medium, removing non-sorbed parts of the fluid mixture from the microchannel separator; and (B) desorbing first fluid from the sorption medium and removing desorbed first fluid from the microchannel separator. The process and apparatus are suitable for separating nitrogen or methane from a fluid mixture comprising nitrogen and methane. The process and apparatus may be used for rejecting nitrogen in the upgrading of sub-quality methane.

57 Claims, 44 Drawing Sheets

U.S. PATENT DOCUMENTS

| | | | |
|---|---|---|---|
| 4,516,632 A | 5/1985 | Swift et al. | 165/167 |
| 4,909,924 A | 3/1990 | Raatz et al. | 208/111 |
| 4,960,450 A | 10/1990 | Schwarz et al. | 62/18 |
| 5,174,796 A | 12/1992 | Davis et al. | 55/26 |
| 5,268,023 A | 12/1993 | Kirner | 95/103 |
| 5,309,637 A | 5/1994 | Moriarty | 29/890.054 |
| 5,317,805 A | 6/1994 | Hoopman et al. | 29/890.03 |
| 5,385,876 A | 1/1995 | Schwarz et al. | 502/80 |
| 5,597,773 A | 1/1997 | Evans et al. | 502/348 |
| 5,611,214 A | 3/1997 | Wegeng et al. | 62/498 |
| 5,614,460 A | 3/1997 | Schwarz et al. | 502/418 |
| 5,689,966 A | 11/1997 | Zess et al. | 62/238.6 |
| 5,726,118 A | 3/1998 | Ivey et al. | 502/417 |
| 5,727,618 A | 3/1998 | Mundinger et al. | 165/80.4 |
| 5,792,239 A | 8/1998 | Reinhold, III et al. | 95/101 |
| 5,811,062 A | 9/1998 | Wegeng et al. | 422/129 |
| 5,837,741 A | 11/1998 | Schwarz et al. | 521/124 |
| 5,858,314 A | 1/1999 | Hsu et al. | 422/211 |
| 5,989,316 A | 11/1999 | Kuznicki et al. | 95/130 |
| 5,997,826 A | 12/1999 | Lodeng et al. | 422/190 |
| 6,056,932 A | 5/2000 | von Hippel et al. | 423/376 |
| 6,093,379 A | 7/2000 | Golden et al. | 423/230 |
| 6,126,723 A | 10/2000 | Drost et al. | 96/4 |
| 6,129,973 A | 10/2000 | Martin et al. | 428/166 |
| 6,159,358 A | 12/2000 | Mulvaney, III et al. | 423/376 |
| 6,192,596 B1 | 2/2001 | Bennett et al. | 34/76 |
| 6,197,092 B1 | 3/2001 | Butwell et al. | 95/96 |
| 6,200,536 B1 | 3/2001 | Tonkovich et al. | 422/177 |
| 6,205,793 B1 | 3/2001 | Schimp | 62/46.1 |
| 6,216,343 B1 | 4/2001 | Leland et al. | 29/890.032 |
| 6,220,497 B1 | 4/2001 | Benz et al. | 228/118 |
| 6,225,257 B1 | 5/2001 | Putyera et al. | 502/432 |
| 6,230,408 B1 | 5/2001 | Ehrfeld et al. | 29/890.039 |
| 6,284,217 B1 | 9/2001 | Wang et al. | 423/651 |
| 6,313,393 B1 | 11/2001 | Drost | 136/201 |
| 6,336,956 B1 | 1/2002 | Moreau et al. | 95/96 |
| 6,352,577 B1 | 3/2002 | Martin et al. | 96/4 |
| 6,381,846 B2 | 5/2002 | Insley et al. | 29/890.039 |
| 6,409,072 B1 | 6/2002 | Breuer et al. | 228/111.5 |
| 6,415,860 B1 | 7/2002 | Kelly et al. | 165/748 |
| 6,440,895 B1 | 8/2002 | Tonkovich et al. | 502/439 |
| 6,444,012 B1 | 9/2002 | Dolan et al. | 95/99 |
| 6,451,864 B1 | 9/2002 | Wang et al. | 518/715 |
| 6,479,428 B1 | 11/2002 | Tonkovich et al. | 502/302 |
| 6,488,838 B1 | 12/2002 | Tonkovich et al. | 208/108 |
| 6,490,812 B1 | 12/2002 | Bennett et al. | 34/433 |
| 6,491,880 B1 | 12/2002 | Wang et al. | 422/211 |
| 6,497,750 B2 | 12/2002 | Butwell et al. | 95/96 |
| 6,503,298 B1 | 1/2003 | Monzyk et al. | 95/96 |
| 6,508,862 B1 | 1/2003 | Tonkovich et al. | 95/106 |
| 6,533,840 B2 | 3/2003 | Martin et al. | 95/45 |
| 6,540,975 B2 | 4/2003 | Tonkovich et al. | 423/659 |
| 6,558,634 B1 | 5/2003 | Wang et al. | 422/173 |
| 6,607,678 B2 | 8/2003 | Wang et al. | 252/373 |
| 6,616,909 B1 | 9/2003 | Tonkovich et al. | 423/648.1 |
| 6,622,519 B1 | 9/2003 | Mathias et al. | 62/611 |
| 6,652,627 B1 | 11/2003 | Tonkovich et al. | 95/104 |
| 6,660,237 B2 | 12/2003 | Wang et al. | 422/222 |
| 6,666,909 B1 | 12/2003 | TeGrotenhuis et al. | 95/273 |
| 6,675,875 B1 | 1/2004 | Vafai et al. | 165/80.4 |
| 6,680,044 B1 | 1/2004 | Tonkovich et al. | 423/652 |
| 6,713,036 B1 | 3/2004 | Vanden Bussche et al. | 423/584 |
| 6,734,137 B2 | 5/2004 | Wang et al. | 502/328 |
| 6,746,651 B1 | 6/2004 | Ponzo et al. | 422/220 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,762,149 B2 | 7/2004 | Tonkovich et al. | 502/439 |
| 6,769,444 B2 | 8/2004 | Guzman et al. | 137/15.01 |
| 6,773,684 B2 | 8/2004 | Lesieur et al. | 422/198 |
| 6,814,781 B2 | 11/2004 | Tonkovich et al. | 95/90 |
| 6,851,171 B2 | 2/2005 | Schmitt | 29/469 |
| 6,990,290 B2 | 1/2006 | Kylberg et al. | 392/465 |
| 7,250,074 B2 * | 7/2007 | Tonkovich et al. | 95/130 |
| 2001/0018140 A1 | 8/2001 | Hermann et al. | 429/20 |
| 2002/0028164 A1 | 3/2002 | Schutte et al. | 422/198 |
| 2002/0144600 A1 | 10/2002 | TeGrotenhuis et al. | 95/273 |
| 2002/0192118 A1 | 12/2002 | Zech et al. | 422/99 |
| 2003/0007904 A1 | 1/2003 | Tonkovich et al. | 422/180 |
| 2003/0045747 A1 | 3/2003 | Wurziger et al. | 562/418 |
| 2003/0116503 A1 | 6/2003 | Wang et al. | 210/660 |
| 2003/0219903 A1 | 11/2003 | Wang et al. | 436/37 |
| 2004/0034111 A1 | 2/2004 | Tonkovich et al. | 518/726 |
| 2004/0055329 A1 | 3/2004 | Mathias et al. | 62/611 |
| 2004/0104010 A1 | 6/2004 | Kenny et al. | 165/80.4 |
| 2004/0107831 A1 | 6/2004 | Graham et al. | 95/96 |
| 2004/0123626 A1 | 7/2004 | Caze et al. | 65/17.2 |
| 2004/0125689 A1 | 7/2004 | Ehrfeld et al. | 366/165.1 |
| 2004/0130057 A1 | 7/2004 | Mehrabi et al. | 264/171.13 |
| 2004/0131345 A1 | 7/2004 | Kylberg et al. | 392/465 |
| 2004/0131829 A1 | 7/2004 | Joseph et al. | 428/166 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |
| 2004/0188326 A1 | 9/2004 | Tonkovich et al. | 208/139 |
| 2004/0220434 A1 | 11/2004 | Brophy et al. | 568/959 |
| 2004/0228781 A1 | 11/2004 | Tonkovich et al. | 422/222 |
| 2004/0228882 A1 | 11/2004 | Qiu et al. | 424/400 |
| 2004/0229752 A1 | 11/2004 | Long et al. | 502/303 |
| 2004/0234566 A1 | 11/2004 | Qiu et al. | 424/401 |
| 2005/0032240 A1 | 2/2005 | Lee et al. | 436/180 |
| 2005/0045030 A1 | 3/2005 | Tonkovich et al. | 95/90 |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |

FOREIGN PATENT DOCUMENTS

| | | |
|---|---|---|
| DE | 100 09 059 A1 | 2/2000 |
| EP | 0 885 086 B1 | 8/2001 |
| EP | 1 311 341 B1 | 8/2001 |
| EP | 0 904 608 B1 | 12/2001 |
| EP | 1 232 790 A1 | 8/2002 |
| EP | 1 382 382 A1 | 7/2003 |
| EP | 1 362 634 A1 | 11/2003 |
| WO | 97/32687 | 9/1997 |
| WO | 98/55812 | 12/1998 |
| WO | 99/48805 | 9/1999 |
| WO | 00/06295 | 10/2000 |
| WO | 01/10773 A1 | 2/2001 |
| WO | 01/12312 A2 | 2/2001 |
| WO | 01/54807 A1 | 8/2001 |
| WO | 01/95237 A2 | 12/2001 |
| WO | 02/14854 A1 | 2/2002 |
| WO | 02/087729 A1 | 7/2002 |
| WO | 02/064248 A2 | 8/2002 |
| WO | 03/078052 A1 | 9/2003 |
| WO | 03/106386 A2 | 12/2003 |
| WO | 2004/016347 A2 | 2/2004 |
| WO | 2004/101138 A1 | 5/2004 |
| WO | 2004/037418 A1 | 6/2004 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |

| | | |
|---|---|---|
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |
| WO | 2004/091771 A1 | 10/2004 |
| WO | 2004/099113 A1 | 11/2004 |
| WO | 2005/003025 A2 | 1/2005 |

OTHER PUBLICATIONS

International Search Report and Written Opinion of the International Searching Authority, Application No. PCT/US2006/007595, mailed Sep. 19, 2006.

Kestenbaum: "Synthesis of ethylene oxide in a microreaction system"; *Microreaction Technology: Industrial Prospects*; IMRET 3: Proceedings of the Third International Converence on Microreaction Technology.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology.

Gohring et al.; "Gas Phase Reactions in Ceramic Microreactors"; IMERT 6, Marz 1-14, 2002, New Orleans, USA AIChE Conference Proceedings 55-60.

Hsing et al.; "Simulation of Microchannel Chemical Reactors for Heterogeneous Partial Oxidation Reactions"; Chemical Engineering Science 55 (2000) 3-13.

Matlosz et al.; "Microreactors as Tools in Chemical Research"; Microreaction Technology; IMRET 5: Proceedings of the Fifth International Conference on Microreaction Technology. (May 27-30, 2001).

Srinivasn et al.; "Micromachined Reactors for Catalytic Partial Oxidation Reactions"; AlChE Journal; Nov. 1997; vol. 43, No. 11; pp. 3059-3069.

TeGrotenhuis et al.; Optimizing Microchannel Reactors by Trading-Off Equilibrium and Reaction Kinetics through Temperature Management; Prepared for presentation at IMRET 6—6$^{th}$ International Conference on Microreaction Technology; Mar. 10-14, 2002.

Wegeng et al.; "Compact Fuel Processors for Fuel Cell Powered Automobiles Based on Microchannel Technology"; Fuel Cells Bulletin No. 28; pp. 8-13.

Rostami et al.; "Flow and Heat Transfer for Gas Flowing in Microchannels: a Review"; Heat and Mass Transfer 38 (2002) 359-367.

Matlosz et al.; "Selective Oxidation of 1-Butene to Maleic Anhydride—Comparison of the Performance between Microchannel Reactors and a Fixed Bed Reactor"; Microreaction Technology; IMRET 5: Proceedings of the Fifth International Conference on Microreaction Technology. (2001).

Steinfeldt et al.; "Comparative Studies of the Oxidative Dehydrogenation of Propane in Micro-Channels Reactor Module and Fixed-Bed Reactor"; Studies in Surface Science and Catalysis; 2001 Elsevier Science B.V.; pp. 185-190.

Beretta et al.; "Production of Olefins via Oxidative Dehydrogenation of Light Paraffins at Short Contact Times"; Catalysis Today; 2001 Elsevier Science B.V.; pp. 103-111.

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res. 2003, 41, 5462-5466.

Dong et al.; "A New Concept in the Design of Pressure-Swing Adsorption Processes for Multicomponent Gas Mixtures"; *Ind. Eng. Chem. Res.*; vol. 38; pp. 233-239; 1999.

Park et al.; "Adsorber Dynamics and Optimal Design of Layered Beds for Multicomponent Gas Adsorption"; Chemical Engineering Science, Vo. 53, No. 23, pp. 3951-3963; 1998.

Cracknell et al.; "Adsorption and Selectivity of Carbon Dioxide with Methane and Nitrogen in Slip-Shaped Carbonaceous Micropores: Simulation and Experiment"; *Adsorption*; Vo. 2; pp. 193-203; 1996.

Heuchel et al.; "Adsorption of Carbon Dioxide and Methane and Their Mixtures on an Activated Carbon Simulation and Experiment"; *Langmuir*, vol. 15, No. 25, 1999.

Harlick et al.; "Adsorption of Carbon Dioxide, Methane, and Nitrogen: Pure and Binary Mixture Adsorption by ZSM-5 with $SiO_2$/$Al_2O_3$ Ratio of 30"; *Separation and Science and Technology*, vol. 37(1): pp. 33-60; 2002.

Yun et al.; "Adsorption of Methane, Ethane, and Their Binary Mixtures on MCM-41: Experimental Evaluation of Methods for the Prediction of Adsorption Equilibrium"; *Langmuir*, vol. 18; No. 7, 2002.

Sudibandriyo et al.; "Adsorption of Methane, Nitrogen, Carbon Dioxide, and Their Binary Mixtures on Dry Activated Carbon at 318.2 K and Pressures up to 13.6 MPa"; *Langmuir*; vol. 19; No. 13, pp. 5323-5331; 2003.

Sakoda et al.; "Adsorption of Methane onto Activated Carbon by a Graphite Crystal Agtregate Model"; *Fundamentals of Adsorption*; pp. 781-788; 1996.

Predescu et al.; "Adsorption of Nitrogen, Methane, Carbon Monoxide, and Their Binary Mixtures on Aluminophosphate Molecular Sieves"; *Adsorption*; vol. 3, pp. 7-25; 1996.

Braeuer et al.; "Calculation of Single Adsorption Isotherms from Gravimetrically Measured Binary Gas Mixture Adsorption Isotherms on Activated Carbon at High Pressures"; *Separation and Purfication Technology*; Vo. 12; pp. 255-263; 1997.

Sweatman et al.; "Characterization of Porous Materials by Gas Adsorpotion at Ambient Temperatures and High Pressure"; *J. Phys. Chem. B.*; vol. 105, No.7; pp. 1403-1411; 2001.

Gomes et al.; "Coalseam Methane Recovery by Vacuum Swing Adsorption"; *Separation and Purfication Technology*; vol. 24; pp. 189-196; 2001.

Chihara et al.; "Control of Adsorption Rate on Zeolite by Chemical Vapor Deposition"; *Fundamentsls of Adsorption*; 1996.

Sun et al.; "Correlating $N_2$ and $CH_4$ Adsorption on Microporous Carbon Using a New analytical Model"; *Engery & Fuels*; vol. 12, No. 6; 1998.

Jacquinot et al.; "Determination of Methane and other Small Hydrocarbons with a Platinum-Nafion Electrode by Stripping Voltammetry"; *Analytical Checmica Acta*; pp. 1-10; 2001.

Davies et al.; Development and Validation of Pore Structure Models for Adsorption in Activated Carbons; *Langmuir*, vol. 15, No. 19; 1999.

Buczek; "Development of Texture of Carbonacceous Sorbent for use in Methane Recovery from Gaseous Mixtures"; *Inzynieria Chemiczna I Procesowal*; vol. 21; pp. 385-392; 2000.

Warmuzinski et al.; "Effect of Adsorption Pressure on Methane Purity during PSA Separations of $CH_4$/$N_2$ Mixtures"; *Chemical Engineering and Processing*; vol. 38; pp. 55-60; 1999.

Kulkami et al.; "Enrichment of Methane Concentration via Separation of Gases using Vortex Tubes"; *Journal of Energy Engineering*; pp. 1-12; 2002.

Hoover et al.; "Gas Compression Using Temperature Swing Adsorption"; *Separation Science and Technology*; 37(14); pp. 3187-3199; 2002.

Roualdes et al.; "Gas Diffusion and Sorption Properties of Polysiloxane Membranes Prepared by PECVD"; *Journal of Membrane Science*; 198; pp. 299-310; 2002.

Mogri et al.; "Gas Sorption and Transport in Side-Chain Crystalline and Molten Poly(octadecyl acrylate)"; *Polymer*; vol. 42; pp. 2531-2542; 2001.

Wang et al.; "Gas Transport and Sorption in Polyaniline Thin Film"; *Synthetic Metals*; vol. 102; pp. 1333-1334; 1999.

Puziy et al.; "Heterogeneity of Synthetic Carbons Obtained from Polyimides"; *Applied Surface Science*; vol. 196; pp. 89-97; 2002.

Mentasty et al.; "High Pressure Methane Adsorption on NaX and NaY Zeolites with Different Si/Al Ratios"; *Adsorption Science Technology*; Vol. 11; pp. 209-216; 1994.

Jayaraman et al.; "Kinetic Separation of Methane/Carbon Dioxide by Molecular Sieve Carbons"; *Separation Science and Technology*; vol. 37(11); pp. 2505-2528; 2002.

Olajossy et al.; "Methane Separation from Coal Mine Methane Gas by Vacuum Pressure Swing Adsorption"; *Chemical Engineering Research & Design*; vol. 81; pp. 474-482; 2003.

Ustinov et al.; "Modeling of Gas Adsorption Equilibrium Over a Wide Range of Pressure: A Thermodynamic Approach Based on Equation of State"; *Journal of Colloid and Interface Sciencel*; vol. 250; pp. 49-62; 2002.

Puziy et al.; "Modeling of High-Pressure Adsorption Using the Bender Equation of State"; *Langmuir*; vol. 19; pp. 314-320; 2003.

Park et al.; "Numerical Analysis on the Power Consumption of the PSA Process for Recovering $CO_2$ from Flue Gas"; *Ind. Eng. Chem. Res.*; vol. 41; pp. 4122-4131; 2002.

Sun et al.; "Predicing $CH_4$ Adsorption Capacity of Microporus Carbon Using $N_2$ Isotherm and a New Analytical Model"; *American Chemical Society, Division of Fuel Chemistry*; vol. 43; pp. 596-600; 1998.

Fuertes; "Preparation and Characterization of Adsorption-Selective Carbon Membranes for Gas Separation"; *Adsorption*; Vo. 7; pp. 117-129; 2001.

Takeuchi et al.; "Production of Tasty Drinking Water by Activated Carbon Adsorption Followed by Contact with Some Natural Ores"; $7^{th}$ Conference Asia Pac. Fonfed. Chem. Eng. $21^{st}$ Autralas, Chem. Eng. Conf.; pp. 527-532; 1993.

Rittig et al.; "Pure and Mixed-Gas Sorption Measurements on Zeolitic Adsorbents via Gas-Phase Nuclear Magnetic Resonance"; *Ind. Eng. Chem. Res.*; vol. 41; pp. 4430-4434; 2002.

Melnitchenko et al.; "Selective Gas Adsorption by Metal Exchanged Amorphous Kaolinite Derivatives"; *Applied Clay Science*; vol. 17; pp. 35-53; 2000.

Fatehi et al.; "Separtion of Methane Nitrogen Mixtures by Pressure Swing Adsorption using a Carbon Molecular Sieve"; *Adsorption Science and Technology*; vol. 9; pp. 199-204; 1995.

Zhou et al.; "Studies on the Physical Adsorption Equilibria of Gases on Porous Solids over a Wide Temperature Range Spanning the Critical Region—Adsorption on Microporous Activated Carbon"; *Chinese Journal of Chemistry*; vol. 19; pp. 943-948; 2001.

Quinn; "Supercritical Adsorptiion of 'Permanent' Gases Under Corresponding States on Various Carbons"; *Carbon*; vol. 40; pp. 2767-2773; 2002.

Barton et al.; "Tailored Porous Materials"; *Chem. Mater.*; vol. 11; pp. 2633-2666; 1999.

Pires; "Textural and Surface Chemistry Characterization of Zeolites via Adsorption Phenomena"; *Handbook of Surfaces and Interfaces of Materials*; pp. 481-507; 2001.

Kluson et al.; "The Design of Microporous Graphitic Adsorbents for Selective Separation of Gases"; *Separation and Purfication Technology*; vol. 20; pp. 15-24; 2000.

Clarkson et al.; "The Effect of Pore and Gas Pressure Upon the Transport Properties of Coal: a Laboratory and Modeling Study. I. Isotherms and Pore Volume Distributions"; *Fuel*; pp. 1333-1344; 1999.

Salem et al.; "Thermodynamics of High-Pressure Adsorption of Argon, Nitrogen, and Methane on Microporous Adsorbents"; *Langmuir*; vol. 14; pp. 3376-3389; 1998.

Maksymovych; "Investigation of the Influence of added Platinum on abilities of Methane Adsorption Semiconductor Sensors"; *Advances in Science and Technology*; vol. 26, pp. 311-316; 1999.

Choso et al.; "Dissociative Adsorption and Subsequent Reactions of Methane on Ar-ion Sputtered Single Crystal of LiNb03"; *Journal of Molecular Catalysis A: Chemical*pp. 225-231; 1998.

Baronskaya et al.; "Ethylene Recovery from the Gas Product of Methane Oxidative Coupling by Temperature Swing Adsorption"; *Gas Separation & Purification*; vol. 10; pp. 85-88, 1996.

Triebe et al.; "Adsorption of Methane, Ethane and Ethylene on Molecular Sieve Zeolites"; *Gas Separation & Purfication*; vol. 10; pp. 81-84; 1996.

Rychlicki et al.; "Methane Adsorption on Microporous activated Carbons"; *Polish Journal of Chemistry*; vol. 69; pp. 1328-1334; 1995.

Amankwah et al.; "Storage of Energy Gases on Activated Carbon on the Basis of Structural Parameters and Energetic Heterogeneity as Determined by High Pressure Adsorption of Methane and Hydrogen"; 1994; 163 pp. Avail.: Univ. Microfilms Int., Order No. DA9522510, From Diss. Abstr. Intl., B 1995, 56(3), 1566.

Pan; "Pore Structure Alternation of a Carbon Moledular Sieve for the Separation of Hydrogen Sulfide from Methane by Adsorption"; *Adsorption Science and Technology*; vol. 10; pp. 193-201; 1993.

Choi et al.; "Adsorption Equilibria of Methane, Ethane, Ethylene, Nitrogen, and Hydrogen onto Activated Carbon"; *J. Chem. Eng. Data*; 2003; 48; pp. 603-607.

Chau et al.; "Zeolite Micromembranes"; *Lab Chip*; 2003; 3, pp. 53-55.

Qinglin et al.; "Revisiting Transport of Gases in the Micropores of Carbon Molecular Sieves"; *Langmuir*: 2003; 19; pp. 393-405.

Qinglin et al.; "Binary and Ternary Adsorption Kinetics of Gases in Carbon Molecular Sieves"; *Langmuir*; 2003; 19; pp. 5722-5734.

Molina-Sabio et al.; "Phosphoric Acid Activated Carbon Discs for Methane Adsorption"; *Carbon*; 41; 2003; pp. 2113-2119.

Uraki et al.; "Activated Carbon Sheet Prepared from Softwood Acetic Acid Lignin"; *J. Wood Sci*; 2000; pp. 46:52-58.

Zhou et al.; "A Feasibility Study of Separating $CH_4/N_2$ by Adsorption"; *Chinese J. Ch. E.* 10 (5) 558; 2002.

* cited by examiner

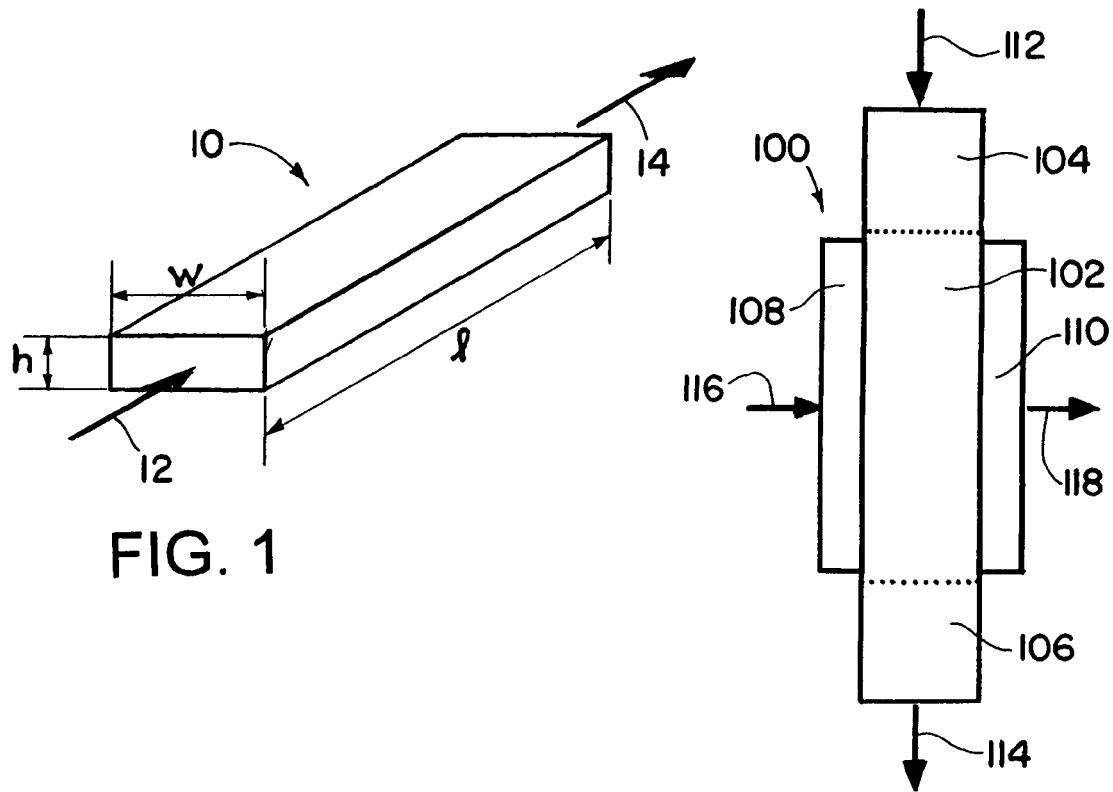
FIG. 1
FIG. 2
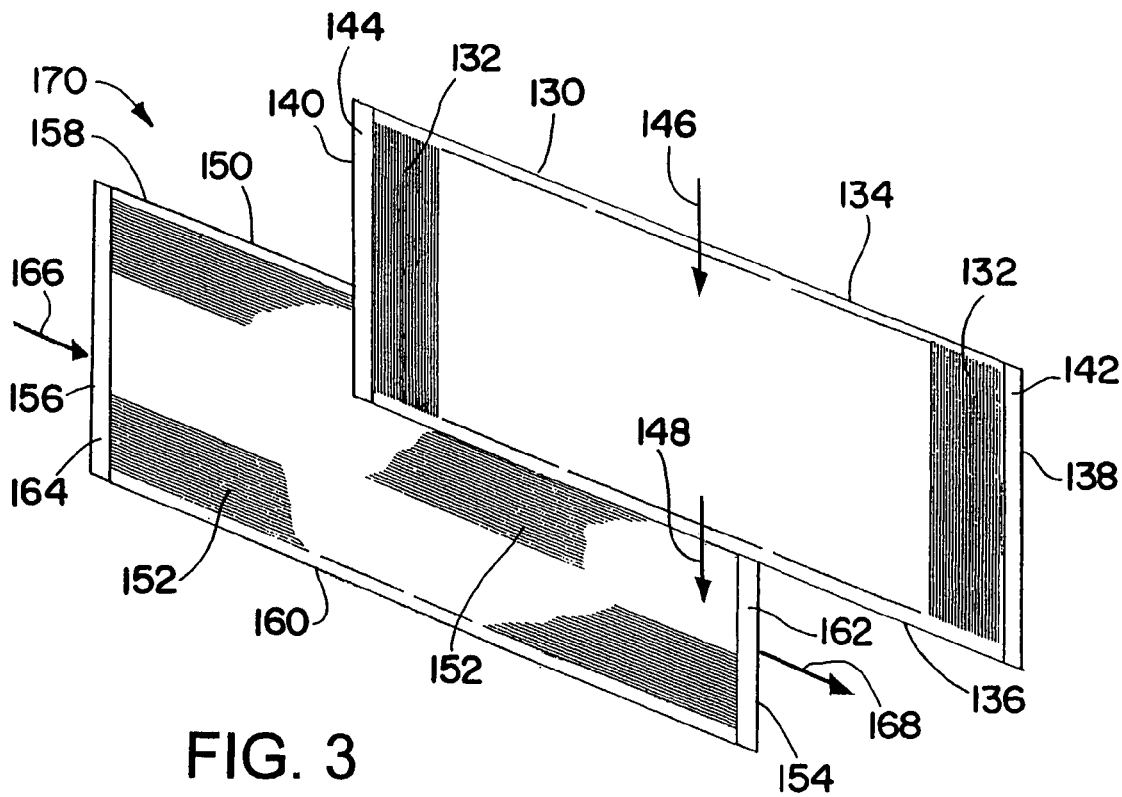
FIG. 3

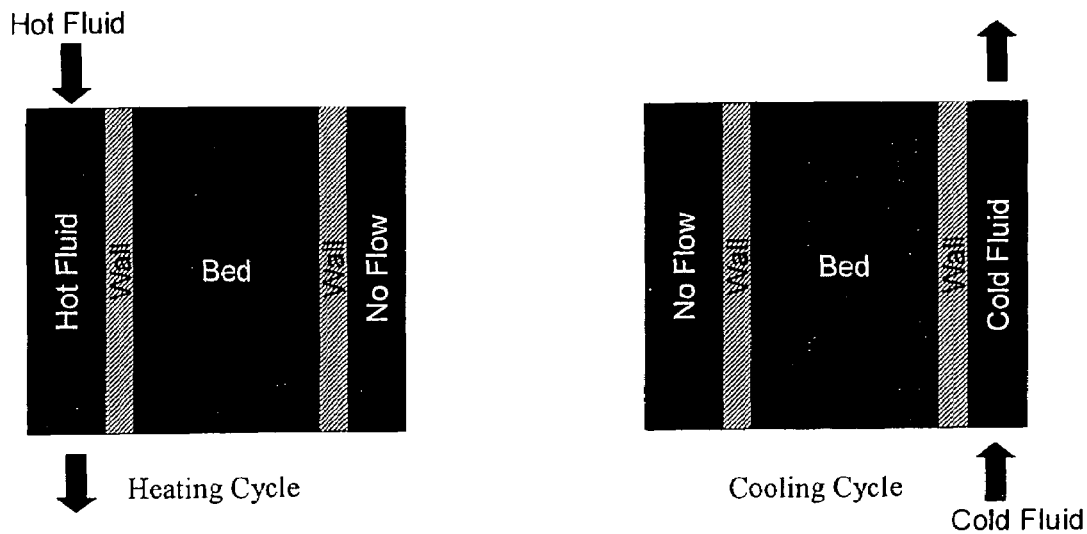
FIG. 23
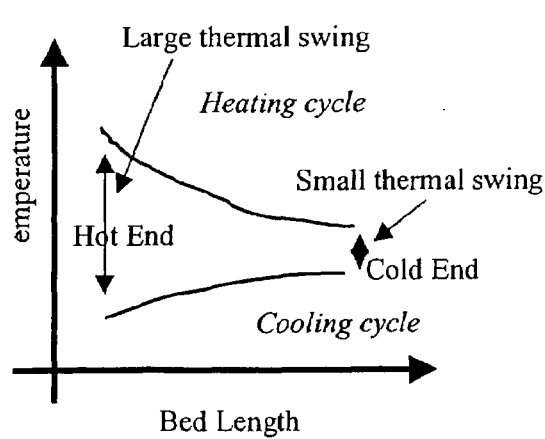
Temperature profile for process of Figs. 21 and 22
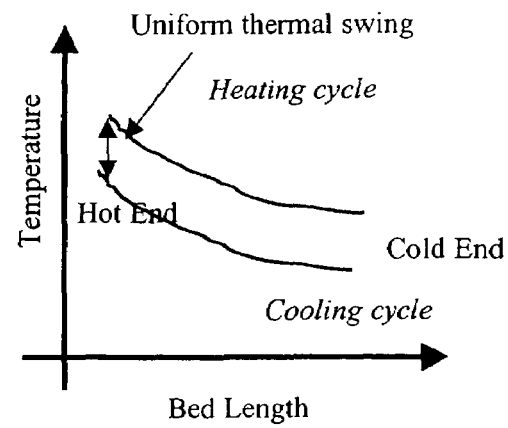
Temperature profile for process of Fig. 23
FIG. 24

Adsorbent testing apparatus. Process gases flow downward through the (vertically mounted) adsorbent bed in the center tube and heat exchange fluid flows co-currently in an outer annulus to maintain near isothermal operation.

Adsorbent system system flow diagram.

Outlet molar flow rate of nitrogen and methane for equimolar feed mixture, 6 C and 2 psig. Dead time is 1 second.

Outlet molar flowrate of nitrogen and methane for 90% methane and 10% nitrogen at 6 C and 2 psig. Dead time is 1 second.

Outlet molar flowrate of nitrogen and methane for equimolar mixture at 6 C and 100 psig. Dead time is 7.3 seconds.

Outlet molar flowrate of nitrogen and methane for 90% methane and 10% nitrogen at 6 C and 100 psig. Dead time is 7.3 seconds.

Outlet molar flowrate of nitrogen and methane for 90% methane and 10% nitrogen at 40 C and 100 psig. Dead time is 7.3 seconds CH$_4$ and N$_2$ concentrations at the exit of the adsorbent bed (left axis) and total outlet flow rate (right axis) for equimolar inlet mixture at 6 C and 100 psig. Dead time is 7.3 seconds.

Outlet flow rate reading from mass flow meter (left axis) and nitrogen and methane analyzer readings (right axis, before calibration correction) for adsorption capacity tests on Calgon carbon adsorbent using an equimolar feed mixture at 60 °C and 100 psig. Dead time is 7 seconds.

Outlet flow rate reading from mass flow meter and corrected total outlet flow (left axis) and argon, nitrogen, and methane flows at the sorbent bed exit (right axis) for adsorption capacity tests on Calgon carbon adsorbent while feeding 0.5 SLPM CH$_4$ and 0.5 SLPM N$_2$ at 60 °C and 100 psig. Dead time is 7 seconds.

Outlet flow rate reading from mass flow meter and corrected total outlet flow (left axis) and argon, nitrogen, and methane flows at the sorbent bed exit (right axis) for adsorption capacity tests on Calgon carbon adsorbent while feeding 0.9 SLPM $CH_4$ and 0.1 SLPM $N_2$ at 60 °C and 100 psig. Dead time is 7 seconds.

Nitrogen Rejection Unit schematic

Fig. 36. Representative picture of adsorber/desorber unit, where the adsorption channels are the longer slots interleaved between heat exchange microchannels Average adsorbent bed temperature as a function of cycle time and heat exchange flowrate.

Comparison of temperatures in bed and coolants for the case of three sec cycle

Fully Assembled Bench-scale Device

Experimental test setup for the ultra-fast thermal swing adsorption single channel nitrogen rejection unit test device.

Schematic of the ultra-fast thermal swing adsorption single channel nitrogen rejection unit test device.

Experimental test setup for the ultra-fast thermal swing adsorption single channel nitrogen rejection unit test device (heat exchange fluid flow not shown.)

Experimental test setup for the ultra-fast thermal swing adsorption single channel nitrogen rejection unit test device product purity testing (heat exchange fluid flow not shown.)

Experimental heat exchange fluid flow diagram for the cylindrical ultra-fast thermal swing adsorption single channel nitrogen rejection unit test device (process flow not shown.)

Schematic of the cylindrical ultra-fast thermal swing adsorption single channel nitrogen rejection unit test device.

Quadratic fit of bed temperature swing data in cylindrical ultra-fast thermal swing adsorption test device for a cycle time of 10 seconds.

Thermal swing temperature data taken during preliminary ultra-fast thermal swing experiments with pure methane feed, 240 ml/min heat exchange fluid at 90°C hot and 10°C cold with a cycle time of 10 seconds.

Differential methane capacity (normalized to 20°C temperature swing) from preliminary thermal swing adsorption tests on cylindrical test device. Corrected values assume that only the adsorbent recovered from the device after removal from test setup (60% of initial) was present during testing.

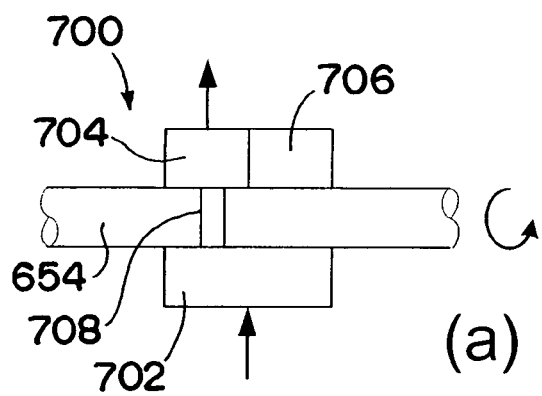
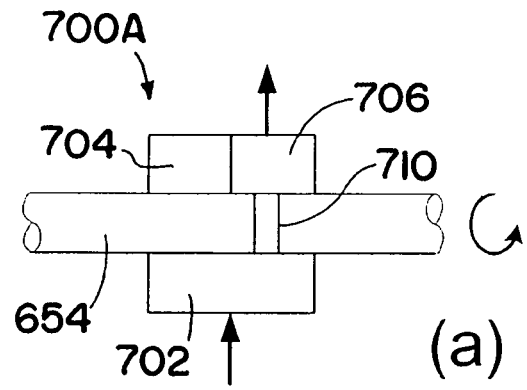
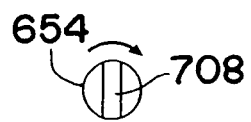 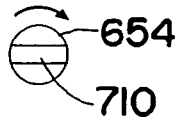      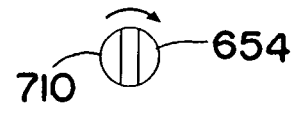
FIG. 53                 FIG. 54
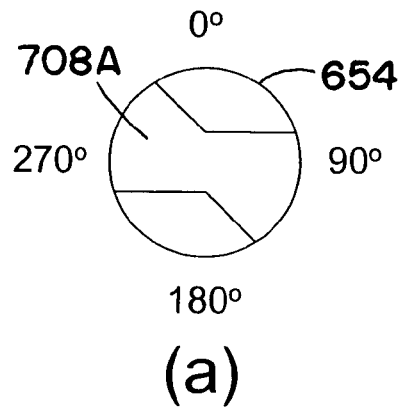   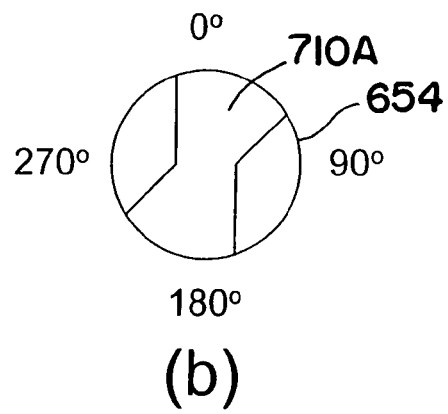
FIG. 55

SEPARATION PROCESS USING MICROCHANNEL TECHNOLOGY

This application claims priority under 35 U.S.C. §119(e) to U.S. Provisional Application Ser. No. 60/657,930, filed Mar. 2, 2005. The disclosure in this prior application is incorporated herein by reference.

This invention was made with Government support under Contract DE-FC26-03NT41905 awarded by the United States Department of Energy. The Government has certain rights in this invention.

TECHNICAL FIELD

This invention relates to a process for separating a first fluid from a mixture of fluids comprising the first fluid. This invention is particularly suitable for upgrading sub-quality methane gas from coal mines, landfills, and other sub-quality sources.

BACKGROUND

Methane emissions from various sources represent a significant portion of non-$CO_2$ greenhouse gas emissions. Traditionally, coal mine and landfill operators have been able to recover only a small percentage of dilute methane gas streams because they contain significant quantities of contaminants, such as $CO_2$, oxygen, water vapor, and nitrogen. The cost of conventional gas separation systems, in particular nitrogen removal units, represents one of the most significant hurdles to mitigating non-$CO_2$ greenhouse emissions. Removal of methane from sub-quality sources has the potential to reduce annual greenhouse gas emissions by about 23.5 billion equivalent kilograms of $CO_2$ and to enable the cost-effective recovery of about 3.5 trillion cubic feet per year of natural gas. This represents a reduction of about 0.3% in annual U.S. greenhouse gas emissions at no net cost when the value of pipeline quality natural gas is realized.

Four commercial methods may be used to remove nitrogen from natural gas: cryogenic distillation, pressure swing adsorption (PSA), lean oil absorption, and membrane separation. Cryogenic distillation involves the condensation of dry natural gas, followed by distillation of nitrogen at very low temperatures (e.g., about −150° C.). This technique is used commercially to separate nitrogen from natural gas. Although methane recovery is high, there is a significant pretreatment cost (water and $CO_2$ removal). In addition, the complexity of the system makes reliability an issue. Cryogenic distillation is generally more cost-effective at large capacities (e.g., about 20 million standard cubic feet per day (MMSCFD)), while most coal mine and landfill opportunities are typically in the 2-10 MMSCFD capacity range. Cryogenic distillation also requires significant energy to compress the gas stream.

In most conventional PSA processes, methane is selectively adsorbed onto carbon sieves, leaving nitrogen in the raffinate. Pretreatment and multiple beds are required, which leads to high capital costs. This method also requires methane to be recompressed and is inflexible to variations in flow rates. PSA has been used on a limited commercial basis for nitrogen separation and is best suited for low (e.g., about 2 to 10 MMSCFD) gas flow rates and high nitrogen content.

The lean oil absorption process involves the absorption of methane in chilled hydrocarbon oil. This process is energy-intensive and, therefore, has high processing costs. In addition, the large equipment used for this process makes redeployment unlikely.

Membrane separation involves separating nitrogen from natural gas by a process wherein the methane selectively permeates through a membrane, and the raffinate is a nitrogen-rich stream that can be burned to run a permeate compressor. Membranes have a low methane recovery (e.g., about 80%) that makes them less attractive.

SUMMARY

The present invention, in at least one embodiment, provides a solution to one or more of the problems presented by the prior art. The invention relates to a process for separating a first fluid from a fluid mixture comprising the first fluid using microchannel technology. This process may be used for separating any fluid mixture, including gaseous mixtures, liquid mixtures, and the like. This process may be used for separating nitrogen or methane from a fluid mixture comprising nitrogen and methane. This process may be used in upgrading sub-quality methane sources such as coal mine methane gases (e.g., gob gas), landfill methane gases, geological gas from well heads, and the like. The inventive process may be operated at a lower cost as compared to membrane separation systems. This lower cost may allow for marginal natural gas sources to be economically upgraded and utilized. The inventive process may employ a modular approach that allows units to be redeployed, which is difficult for equipment intensive processes such as cryogenic distillation and lean oil absorption. The inventive process may be operated over a wide range of flow rates which makes it applicable to numerous applications.

The invention relates to a process for separating a first fluid from a fluid mixture comprising the first fluid, the process comprising: (A) flowing the fluid mixture into a microchannel separator, the microchannel separator comprising at least one, and in one embodiment a plurality of process microchannels containing a sorption medium, the fluid mixture being maintained in the microchannel separator until at least part of the first fluid is sorbed by the sorption medium, removing non-sorbed parts of the fluid mixture from the microchannel separator; and (B) desorbing the first fluid from the sorption medium, removing the desorbed first fluid from the microchannel separator.

In one embodiment the invention relates to a process for separating a first fluid from a fluid mixture comprising the first fluid, the process comprising:

(A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, removing non-sorbed parts of the fluid mixture from the microchannel separator, flowing the cooled heat exchange fluid out of the at least one heat exchange channel, heating the cooled heat exchange fluid to form a heated heat exchange fluid; and (B) heating the sorption medium to desorb first fluid from the sorption medium, the sorption medium being heated using the heated heat exchange fluid formed in step (A), the heated heat exchange fluid being in at least one heat exchange channel, the at least one heat exchange channel being in thermal contact with the sorption medium, removing desorbed first fluid from the microchannel separator, flowing the heated heat exchange fluid out of the at least one heat exchange channel, cooling the heated heat exchange fluid to form a cooled heat exchange fluid, the cooled heat exchange fluid being used in step (A) to cool the fluid mixture and the sorption medium.

In one embodiment, during cooling the heated heat exchange fluid to form the cooled heat exchange fluid the heat exchange fluid undergoes expansion. In this embodiment, the heat exchange fluid may flow through at least one expansion device.

In one embodiment, during heating the cooled heat exchange fluid to form the heated heat exchange fluid the heat exchange fluid undergoes compression. In this embodiment, the heat exchange fluid may be compressed in at least one compressor.

In one embodiment, during the cooling of the fluid mixture and the sorption medium the heat exchange fluid is at least partially vaporized. In this embodiment, heat exchange fluid may be at least partially vaporized in the at least one heat exchange channel.

In one embodiment, during the heating of the sorption medium the heat exchange fluid is at least partially condensed. In this embodiment, the heat exchange fluid may be at least partially condensed in the at least one heat exchange channel.

In one embodiment, the invention relates to a process for separating a first fluid from a fluid mixture comprising the first fluid, the process comprising:
(A) flowing the fluid mixture into a microchannel separator in contact with a sorption medium, the fluid mixture being maintained in the microchannel separator until at least part of the first fluid is sorbed by the sorption medium, increasing pressure within the microchannel separator to cause non-sorbed parts of the fluid mixture to flow out of the microchannel separator; and
(B) desorbing first fluid from the sorption medium, increasing pressure within the microchannel separator to cause the desorbed first fluid to flow out of the microchannel separator.

In one embodiment, the invention relates to a process for separating a first fluid from a fluid mixture comprising the first fluid, the process comprising:
(A) flowing the fluid mixture into a microchannel separator in contact with a sorption medium, the sorption medium comprising a mixture of activated carbon particulates and thermally conductive particulates, the fluid mixture being maintained in the microchannel separator until at least part of the first fluid is sorbed by the sorption medium, removing non-sorbed parts of the fluid mixture from the microchannel separator; and
(B) desorbing first fluid from the sorption medium, removing desorbed first fluid from the microchannel separator.

In one embodiment, the invention relates to a process for separating nitrogen from a fluid mixture comprising nitrogen and methane, the process comprising:
(A) flowing the fluid mixture in a microchannel separator in contact with a sorption medium and cooling the fluid mixture and the sorption medium to sorb at least part of the methane on the sorption medium, the sorption medium comprising activated carbon particulates and thermally conducted particulates, the fluid mixture and the sorption medium being cooled by a cooled heat exchange fluid in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator; and
(B) heating the sorption medium to desorb first fluid from the sorption medium, the sorption medium being heated using a heated heat exchange fluid, the heated heat exchange fluid being in at least one heat exchange channel, the at least one heat exchange channel being in thermal contact with the sorption medium, at least part of the heated heat exchange fluid being condensed in the at least one heat exchange channel, removing desorbed methane from the microchannel separator.

In one embodiment, the invention relates to a process for separating a first fluid from a fluid mixture comprising the first fluid, the process comprising:
(A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, the cooled heat exchange fluid being heated and/or at least partially vaporized in the at least one heat exchange channel, removing non-sorbed parts of the fluid mixture from the microchannel separator, flowing the cooled heat exchange fluid out of the at least one heat exchange channel through at least one first heat exchanger where it is cooled and/or at least partially condensed; and
(B) heating the sorption medium to desorb first fluid from the sorption medium, the sorption medium being heated using a heated heat exchange fluid, the heated heat exchange fluid being in at least one heat exchange channel, the at least one heat exchange channel being in thermal contact with the sorption medium, the heated heat exchange fluid being cooled and/or at least partially condensed in the at least one heat exchange channel, removing desorbed first fluid from the microchannel separator, flowing the heated heat exchange fluid out of the at least one heat exchange channel through at least one second heat exchanger where it is heated and/or at least partially vaporized.

In one embodiment, the invention relates to a process for separating a first fluid from a fluid mixture comprising the first fluid, the process comprising:
(A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator, flowing the cooled heat exchange fluid out of the at least one heat exchange channel, compressing the cooled heat exchange fluid in a compressor to form a heated heat exchange fluid; and
(B) heating the sorption medium to desorb first fluid from the sorption medium, the sorption medium being heated using the heated heat exchange fluid from step (A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the microchannel separator, flowing the heated heat exchange fluid out of the at least one heat exchange channel, flowing the heated heat exchange fluid through an expansion device to form a cooled heat exchange fluid, the cooled heat exchange fluid being used in step (A) to cool the fluid mixture and the sorption medium.

In one embodiment, the invention relates to a process for separating a first fluid from a fluid mixture comprising the first fluid, the process comprising steps (I)(A), (I)(B), (II)(A) and (II)(B), steps (I)(A) and (II)(B) being conducted simultaneously, and steps (I)(B) and (II)(A) being conducted simultaneously:

step (I)(A) comprising flowing part of the fluid mixture in a first microchannel separator in contact with a sorption medium and cooling the fluid mixture and the sorption medium to sorb at least part of the first fluid on the sorption medium, the fluid mixture and the sorption medium being cooled using the cooled heat exchange fluid formed in step (I)(B), the cooled heat exchange fluid being in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the first microchannel separator, flowing the cooled heat exchange fluid out of the at least one heat exchange channel, compressing the cooled heat exchange fluid in a compressor to form a heated heat exchange fluid;

step (I)(B) comprising heating the sorption medium in the first microchannel separator to desorb first fluid from the sorption medium, the sorption medium being heated using the heated heat exchange fluid formed in step (I)(A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the first microchannel separator, flowing the heated heat exchange fluid out of the at least one heat exchange channel, flowing the heated heat exchange fluid through an expansion device to form a cooled heat exchange fluid;

step (II)(A) comprising flowing part of the fluid mixture in a second microchannel separator in contact with a sorption medium and cooling the fluid mixture and the sorption medium to sorb at least part of the first fluid on the sorption medium, the fluid mixture and the sorption medium being cooled using the cooled heat exchange fluid formed in step (II)(B), the cooled heat exchange fluid being in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator, flowing the cooled heat exchange fluid out of the at least one heat exchange channel, compressing the cooled heat exchange fluid in a compressor to form a heated heat exchange fluid;

step (II)(B) comprising heating the sorption medium in the second microchannel separator to desorb first fluid from the sorption medium, the sorption medium being heated using the heated heat exchange fluid formed in step (II)(A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the second microchannel separator, flowing the heated heat exchange fluid out of the at least one heat exchange channel, flowing the heated heat exchange fluid through an expansion device to form a cooled heat exchange fluid.

In one embodiment, the invention relates to a process for separating a first fluid from a fluid mixture comprising the first fluid, the process comprising steps (I)(A), (I)(B), (II)(A) and (II)(B), the process being conducted using a first microchannel separator, a second microchannel separator, a hot heat exchange fluid source, a cold heat exchange fluid source, the heat exchange fluid in the hot heat exchange fluid source being hot relative to the cold heat exchange fluid in the cold heat exchange fluid source, and a valve assembly for controlling the flow of process fluids and heat exchange fluids, steps (I)(A) and (II)(B) being conducted simultaneously with the valve assembly set in a first position, and steps (II)(B) and (II)(A) being conducted simultaneously with the valve assembly set in a second position:

step (I)(A) comprising flowing part of the fluid mixture through at least one valve in the valve assembly into the first microchannel separator in contact with a sorption medium in the first microchannel separator, flowing cold heat exchange fluid from the cold heat exchange fluid source through at least one valve in the valve assembly into at least one heat exchange channel in thermal contact with the sorption medium in the first microchannel separator, cooling the fluid mixture and the sorption medium in the first microchannel separator to sorb at least part of the first fluid on the sorption medium, removing non-sorbed parts of the fluid mixture from the first microchannel separator, flowing the non-sorbed parts of the fluid mixture through at least one valve in the valve assembly, flowing cold heat exchange fluid from the at least one heat exchange channel in the first microchannel separator through at least one valve in the valve assembly to the cold heat exchange fluid source;

step (I)(B) comprising flowing hot heat exchange fluid from the hot heat exchange fluid source through at least one valve in the valve assembly into at least one heat exchange channel in thermal contact with the sorption medium in the first microchannel separator and heating the sorption medium in the first microchannel separator to desorb first fluid from the sorption medium, removing desorbed first fluid from the first microchannel separator, flowing the desorbed first fluid through at least one valve in the valve assembly, flowing the hot heat exchange fluid from the at least one heat exchange channel in the first microchannel separator through at least one valve in the valve assembly to the hot heat exchange fluid source;

step (II)(A) comprising flowing part of the fluid mixture through at least one valve in the valve assembly into the second microchannel separator in contact with a sorption medium in the second microchannel separator, flowing cold heat exchange fluid from the cold heat exchange fluid source through at least one valve in the valve assembly into at least one heat exchange channel in thermal contact with the sorption medium in the second microchannel separator, cooling the fluid mixture and the sorption medium in the second microchannel separator to sorb at least part of the first fluid on the sorption medium, removing non-sorbed parts of the fluid mixture from the second microchannel separator, flowing the non-sorbed parts of the fluid mixture through at least one valve in the valve assembly, flowing the cold heat exchange fluid from the at least one heat exchange channel in the second microchannel separator through at least one valve in the valve assembly to the cold heat exchange fluid source;

step (II)(B) comprising flowing hot heat exchange fluid from the hot heat exchange fluid source through at least one valve in the valve assembly into at least one heat exchange channel in thermal contact with the sorption medium in the second microchannel separator, heating the sorption medium in the second microchannel separator to desorb first fluid from the sorption medium, removing desorbed first fluid from the second microchannel separator, flowing the desorbed first fluid through at least one valve in the valve assembly, flowing the hot heat exchange fluid from the at least one heat exchange channel in the second microchannel separator through at least one valve in the valve assembly to the hot heat exchange fluid source.

In one embodiment, the invention relates to a process for upgrading sub-quality methane gas, the sub-quality methane gas comprising methane, water, nitrogen, oxygen and carbon dioxide, the process comprising:

(I) removing water from the sub-quality methane gas to form a first intermediate product;

(II) removing nitrogen from the first intermediate product by the steps of (A) flowing the first intermediate product into a microchannel separator in contact with a sorption medium, the first intermediate product being maintained in the microchannel separator until at least part of the nitrogen is sorbed by the sorption medium, removing the non-sorbed parts of first intermediate product to form a second intermediate product;

(B) desorbing nitrogen from the sorption medium, removing the desorbed nitrogen from the microchannel separator; and (III) removing oxygen and carbon dioxide from the second intermediate product to form upgraded methane gas.

In one embodiment, the invention relates to a process for upgrading sub-quality methane gas, the sub-quality methane gas comprising methane, water, nitrogen, oxygen and carbon dioxide, the process comprising:

(I) removing water from the sub-quality methane gas to form a first intermediate product;

(II) removing nitrogen from the first intermediate product by the steps of (A) flowing the first intermediate product into a microchannel separator in contact with a sorption medium, the first intermediate product being maintained in the microchannel separator until at least part of the carbon is sorbed by the sorption medium, removing non-sorbed parts of first intermediate product from the microchannel separator;

(B) desorbing carbon from the sorption medium to form a second intermediate product, removing the second intermediate product from the microchannel separator; and (III) removing oxygen and carbon dioxide from the second intermediate product to form upgraded methane gas.

In one embodiment, the first fluid comprises methane and the fluid mixture comprises methane and nitrogen, the sorption medium comprises activated carbon particulates and diamond powder, the time period for conducting step (A) may be up to about 10 seconds, and in one embodiment from about 1 to about 10 seconds, and in one embodiment from about 2 to about 5 seconds; and the time period for conducting step (B) may be up to about 10 seconds, and in one embodiment from about 1 to about 10 seconds, and in one embodiment from about 2 to about 5 seconds.

BRIEF DESCRIPTION OF THE DRAWINGS

In the annexed drawings, like parts and features have like designations.

FIG. 1 is a schematic illustration of a microchannel useful with the inventive process.

FIG. 2 is a schematic illustration of a microchannel separator which can be used pursuant to the inventive process to separate methane or nitrogen from a fluid mixture comprising methane and nitrogen.

FIG. 3 is a schematic illustration of a layer of process microchannels and a layer of heat exchange microchannels that may be used in the microchannel separator core of the microchannel separator illustrated in FIG. 2.

FIGS. 21-23 are schematic illustrations showing the flow of heat exchange fluid relative to the flow of process fluid in a microchannel separator used in accordance with the inventive process.

FIG. 24 provides an illustration of two thermal profiles, one of the profiles being for the process illustrated in FIGS. 21 and 22, and the other being for the process illustrated in FIG. 23.

FIGS. 53 and 54 are schematic illustrations of the valve blocks used in the process illustrated in FIG. 52.

FIG. 55 is a schematic illustration showing enlarged cross sectional views of alternate embodiments of holes in a shaft that can be used as valve openings in the valve blocks illustrated in FIGS. 53 and 54.

DETAILED DESCRIPTION

Figure 4:
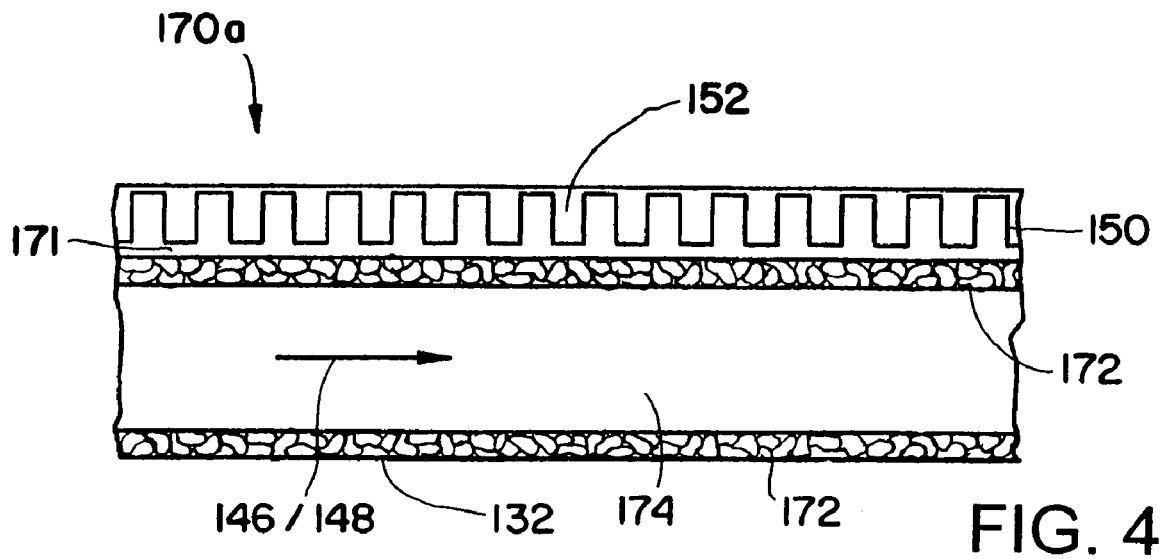
FIG. 4 is a schematic illustration of a process microchannel and adjacent heat exchange channels that may be used in the microchannel separator core of the microchannel separator illustrated in FIG. 2, the flow of heat exchange fluid through the heat exchange channels being cross-current relative to the flow of fluid through the process microchannel.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. An example of a microchannel that may be used with the inventive process as a process microchannel and/or a heat exchange microchannel is illustrated in FIG. 1. Referring to FIG. 1, microchannel 10 has a height (h), width (w) and length (l). Fluid flows through the microchannel 10 in the direction indicated by arrows 12 and 14. Both the height (h) and width (w) are perpendicular to the flow of fluid through the microchannel 10. The height (h) or width (w) of the microchannel may be in the range of about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. The other dimension of height (h) or width (w) may be of any dimension, for example, up to about 3 meters, and in one embodiment about 0.01 to about 3 meters, and in one embodiment about 0.1 to about 3 meters. The length (l) of the microchannel may be of any dimension, for example, up to about 10 meters, and in one embodiment from about 0.1 to about 10 meters, and in one embodiment from about 0.2 to about 10 meters, and in one embodiment from about 0.2 to about 6 meters, and in one embodiment from 0.2 to about 3 meters. Although the microchannel illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel separator" refers to an apparatus comprising at least one process microchannel containing a sorption medium that may be used to separate a fluid from a fluid mixture containing the fluid. The microchannel separator may comprise a plurality of process microchannels that may be operated in parallel, a header or manifold assembly for providing for the flow of fluid into the process microchannels, and a footer or manifold assembly providing for the flow of fluid out of the process microchannels. The microchannel separator may comprise one or more heat exchange channels in thermal contact with the sorption medium for cooling and/or heating during steps (A) and/or (B) of the inventive process.

The term "heat exchange channel" refers to a channel having a heat exchange fluid in it that may give off heat and/or absorb heat.

The term "heat exchange fluid" refers to a fluid that may give off heat and/or absorb heat.

The term "adjacent" when referring to the position of one channel relative to the position of another channel means directly adjacent such that a wall separates the two channels. This wall may vary in thickness. However, "adjacent" channels are not separated by an intervening channel that would interfere with heat transfer between the channels.

The term "thermal contact" refers to two bodies, for example channels, that are not necessarily in contact with each other or adjacent to each other but still may exchange heat between each other. Thus, for example, one body in thermal contact with another body may heat or cool the other body.

The term "fluid" refers to a gas, a liquid, or a gas or a liquid containing dispersed solids, or a mixture thereof. The fluid may be in the form of a gas containing dispersed liquid droplets.

The term "residence time," which may also be referred to as the "average residence time," is the internal volume of a space occupied by a fluid flowing through the space divided by the average volumetric flowrate for the fluid flowing through the space at the temperature and pressure being used.

The term "cycle time" refers to the time period required to complete both steps (A) and (B) of the inventive process.

The term "sorb" refers to adsorption and/or absorption. In one embodiment, one molecule or sorbate has a preferential affinity to a solid sorbent over a second molecule or sorbate.

The term "average sorbent temperature" refers to the mean sorbent temperature of the sorption medium at the end of either step (A) or step (B) of the inventive process, and prior to the commencement of the alternate step, that is, prior to the commencement of the alternating sequential step (B) or step (A). In one embodiment, the average sorbent temperature may be measured at or near the entrance to the sorption medium and at or near the exit from the sorption medium. The average sorbent temperature may be the arithmetic mean of the temperatures measured at or near the entrance to the sorption medium and at or near the exit from the sorption medium.

The terms "standard cubic feet" or "standard cubic meters" refers to volumes measured at a temperature of 20° C. and atmospheric pressure.

The term "gauge pressure" refers to absolute pressure, less atmospheric pressure. For example, a gauge pressure of zero atmospheres corresponds to atmospheric pressure. However, throughout the text and in the appended claims, unless otherwise indicated, all pressures are absolute pressures.

Throughout the text, the following acronyms and abbreviations may be used:
Btu British thermal unit
GHG greenhouse gas
gm gram
GWP global warming potential
HPBV high-performance butterfly valve
kg kilogram
mg milligram
MMSCFD million standard cubic feet per day
MW megawatts
NRU nitrogen rejection unit
psig pound per square inch gauge
psi pounds per square inch
ms millisecond
SLPM standard liters per minute
TSA thermal swing adsorption The inventive process may be used to separate any fluid component from any fluid mixture containing the fluid component. Examples of such separations include oxygen from air, olefins (e.g., ethylene) from mixtures of olefins and paraffins (e.g., ethane), and the like. The fluid components that may be separated or purified include oxygen, hydrogen, nitrogen, $NO_x$ (e.g., NO, $NO_2$), CO, $CO_2$, $H_2S$, HCN, $SO_2$, $CH_3SCH_3$, olefins (e.g., ethylene), paraffins (e.g., ethane), aromatic compounds (e.g., benzene), isomers, halogenated compounds (e.g., chlorides), nitrates, sulfates, sugars, esters, alcohols, ethers, nitro compounds, hydroxyl amines, or mixtures of two or more thereof. The process is suitable for separating nitrogen from methane. Throughout the remainder of the specification the process will be described relative to the separation of nitrogen from methane, however, it is to be understood that the description is applicable to the separation of any fluid component from a fluid mixture containing the fluid component.

In the separation of nitrogen from methane, the fluid mixture may comprise any fluid mixture comprising methane and nitrogen. The fluid mixture may comprise sub-quality methane gas such as coal mine methane gas, methane gas from landfills, and the like. The concentration of methane in the fluid mixture may be in the range from about 1 to about 98% by volume, and in one embodiment about 1 to about 75% by volume. The concentration of nitrogen may be in the range from about 1 to about 98% by volume, and in one embodiment about 4 to about 40% by volume. The fluid mixture may further comprise carbon dioxide. The concentration of carbon dioxide in the fluid mixture may be in the range from about 1 to about 50% by volume, and in one embodiment about 1 to about 30% by volume. The fluid mixture may contain additional components such as oxygen and water vapor. The concentration for each of these additional components may be in the range from about 0.01 to about 10% by volume, and in one embodiment about 0.1 to about 1% by volume. The fluid mixture may be derived from low Btu methane streams, such as those found in coal mines, landfills and other sub-quality sources. The fluid mixtures obtained from coal mines are sometimes referred to as coal mine gob gasses.

In one embodiment, the invention relates to a process for upgrading a sub-quality methane gas wherein the inventive process is used to separate out the nitrogen. In one embodiment, the nitrogen may be separated using a microchannel TSA nitrogen rejection process. In one embodiment, oxygen, water vapor and carbon dioxide may be separated using conventional techniques. The oxygen may be separated using catalytic deoxygenation or oxygen adsorption techniques. The water may be separated using molecular sieves or dehydration. The carbon dioxide may be separated using amine separation, carbon dioxide adsorption or membrane separation. The sequence of these separations may follow any order. In one embodiment, water vapor may be separated out first, followed by nitrogen removal using the inventive process, and then the oxygen and carbon dioxide may be removed.

The inventive sorption/desorption process will be described initially with reference to FIG. 2. Referring to FIG. 2, the process may be conducted using microchannel separator 100 which includes microchannel separator core 102, process header 104, process footer 106, heat exchange header 108 and heat exchange footer 110. The microchannel separator core 102 contains a plurality of process microchannels and a plurality of adjacent heat exchange channels. The heat exchange channels may be microchannels. A sorption medium is contained within the process microchannels. The process microchannels and heat exchange channels may be aligned in layers, one above the other, or side by side. In one embodiment, each layer of process microchannels is positioned between two layers of heat exchange channels, one of the layers of heat exchange channels being used for heating and the other layer of heat exchange channels being used for cooling. In one embodiment, both layers of heat exchange channels may be used for both heating and cooling. The process header 104 provides a passageway for fluid to flow into the process microchannels with an even or substantially even distribution of flow to the process microchannels. The process footer 106 provides a passageway for fluid to flow from the process microchannels in a rapid manner with a relatively high rate of flow. A fluid mixture containing methane and nitrogen flows into microchannel separator 100, as indicated by directional arrow 112, through process header 104 and then into the process microchannels in the microchannel separator core 102 where it contacts the sorption medium. The fluid mixture is maintained in the process microchannels in contact with the sorption medium until at least part of either the methane or the nitrogen is sorbed by the sorption medium. The sorption of either methane or nitrogen with this process is dependent on whether the sorption medium has a preferential affinity for methane or nitrogen. The inventive process may be operated with either type of sorption medium. The non-sorbed parts of the fluid mixture are then removed from the process microchannels. The non-sorbed parts of the fluid mixture may be removed from the process microchannels by applying a pressure differential and/or temperature gradient across the process microchannels sufficient to drive the non-sorbed parts of the fluid mixture out of the process microchannels. The non-sorbed parts of the fluid mixture comprise methane or nitrogen, depending on which remains behind sorbed by the sorption medium. In one embodiment, the non-sorbed parts of the fluid mixture comprises nitrogen and a reduced level of methane; this non-sorbed gaseous mixture may be referred to as tail gas. The temperature within the process microchannels is then changed to provide for desorption of the methane or nitrogen from the sorption medium. The methane or nitrogen is desorbed from the sorption medium. The desorbed methane or nitrogen is then removed from the process microchannels. The desorbed methane or nitrogen may be removed from the process microchannels by applying a pressure differential and/or temperature gradient across the process microchannels sufficient to drive the desorbed methane or nitrogen out of the process microchannels. The non-sorbed fluid components may be recycled through the process microchannels or to other process microchannels connected in series any number of times, for example, one, two, three, four times, etc. A heat exchange fluid flows into heat exchange header 108, as indicated by directional arrow 116, and from heat exchange header 108 through the heat exchange channels in microchannel separator core 102 to heat exchange footer 110, and out of heat exchange footer 110, as indicated by directional arrow 118. The heat exchange fluid may be used to heat and cool the process microchannels. Alternatively, a resistance heater positioned within or adjacent to the process microchannels may be used to heat the process microchannels. The resistance heater may be in contact with the sorption medium. In one embodiment, the heat exchange fluid may be used to cool the process microchannels, and the resistance heater may be used to heat the process microchannels.

In one embodiment, the microchannel separator core 102 may contain layers of process microchannels and heat exchange microchannels aligned side by side as illustrated in FIG. 3. Referring to FIG. 3, process microchannel layers 130 and heat exchange microchannel layers 150 are aligned side by side to provide repeating unit 170. Microchannel layer 130 provides for the flow of process fluid. Microchannel layer 150 provides for the flow of heat exchange fluid. In one embodiment, each microchannel layer 130 may be positioned between adjacent microchannel layers 150 positioned on each side of the microchannel layer 130, the microchannel layers 150 being used for heating and/or cooling. In one embodiment, two or more process microchannel layers 130 may be positioned adjacent to each other to form a vertically or horizontally oriented stack of microchannel layers, and a heat exchange layer 150 may be positioned on one or both sides of the stack.

Microchannel layer 130 contains a plurality of microchannels 132 aligned in parallel, each process microchannel 132 extending along the length of microchannel layer 130 from end 134 to end 136, the process microchannels 132 extending along the width of microchannel layer 130 from end 138 to end 140 of the microchannel layer 130. Bonding strips 142 and 144 are positioned at the ends 138 and 140, respectively, of microchannel layer 130 to permit bonding of the microchannel layer 130 to the next adjacent heat exchange layers 150. The sorption medium is contained within the process microchannels 132. The flow of process fluid through the process microchannels 132 may be in the direction indicated by arrows 146 and 148. Each of the process microchannels 132 may have a cross section having any shape, for example, a square, rectangle, circle, semi-circle, etc. Each process microchannel 132 may have an internal height or gap of up to about 10 mm, and in one embodiment up to about 6 mm, and in one embodiment up to about 4 mm, and in one embodiment up to about 2 mm. In one embodiment, the height or gap may be in the range of about 0.05 to about 10 mm, and in one embodiment about 0.05 to about 6 mm, and in one embodiment about 0.05 to about 4 mm, and in one embodiment about 0.05 to about 2 mm. The width of each of these microchannels may be of any dimension, for example, up to about 3 meters, and in one embodiment about 0.01 to about 3 meters, and in one embodiment about 0.1 to about 3 meters. The length of each process microchannel 132 may be of any dimension, for example, up to about 10 meters, and in one embodiment about 0.2 to about 10 meters, and in one embodiment from about 0.2 to about 6 meters, and in one embodiment from 0.2 to about 3 meters.

Microchannel layer 150 contains a plurality of heat exchange microchannels 152 aligned in parallel, each heat exchange microchannel 152 extending along the width of microchannel layer 150 from end 154 to end 156, the heat exchange microchannels 152 extending along the length of microchannel layer 150 from end 158 to end 160 of microchannel layer 150. Bonding strips 162 and 164 are positioned at ends 154 and 156, respectively, of microchannel layer 150 to permit bonding of the microchannel layer 150 to the next adjacent process microchannel layers 130. The heat exchange fluid may flow through the heat exchange microchannels 152 in the direction indicated by arrows 166 and 168. The flow of heat exchange fluid in the direction indicated by arrows 166 and 168 is cross-current to the flow of process fluid flowing through process microchannels 132, as indicated by arrows 146 and 148. Alternatively, the heat exchange microchannels 152 could be oriented to provide for flow of the heat exchange fluid along the length of the microchannel layer 150 from end 158 to end 160 or from end 160 to end 158. This would result in the flow of heat exchange fluid in a direction that would be cocurrent or counter-current to the flow of process fluid through the process microchannels 132. Each of the heat exchange microchannels 152 may have a cross section having any shape, for example, a square, rectangle, circle, semi-circle, etc. Each of the heat exchange microchannels 152 may have an internal height or gap of up to about 2 mm, and in one embodiment in the range of about 0.05 to about 2 mm, and in one embodiment about 0.05 to about 1.5 mm. The width of each of these microchannels may be of any dimension, for example, up to about 3 meters, and in one embodiment about 0.01 to about 3 meters, and in one embodiment about 0.1 to about 3 meters. The length of each of the heat exchange microchannels 152 may be of any dimension, for example, up to about 10 meters, and in one embodiment from about 0.2 to about 10 meters, and in one embodiment from about 0.2 to about 6 meters, and in one embodiment from 0.2 to about 3 meters.

Repeating unit 170a is illustrated in FIG. 4. Referring to FIG. 4, process microchannel 132 is positioned adjacent to microchannel layer 150 which contains heat exchange microchannels 152. A common wall 171 separates the process microchannel 132 from the heat exchange microchannel layer 150. A sorption medium 172 is adhered to the upper and lower walls of process microchannel 132. A flow path 174 is provided between the layers of sorption medium 172. Process fluid flows through flow path 174 in process microchannel 132 in the direction indicated by directional arrow 146/148 and contacts sorption medium 172. Heat exchange fluid flows through the heat exchange microchannels 152 in a direction that is cross-current to the flow of process fluid through the microchannel 132.

Figure 5:
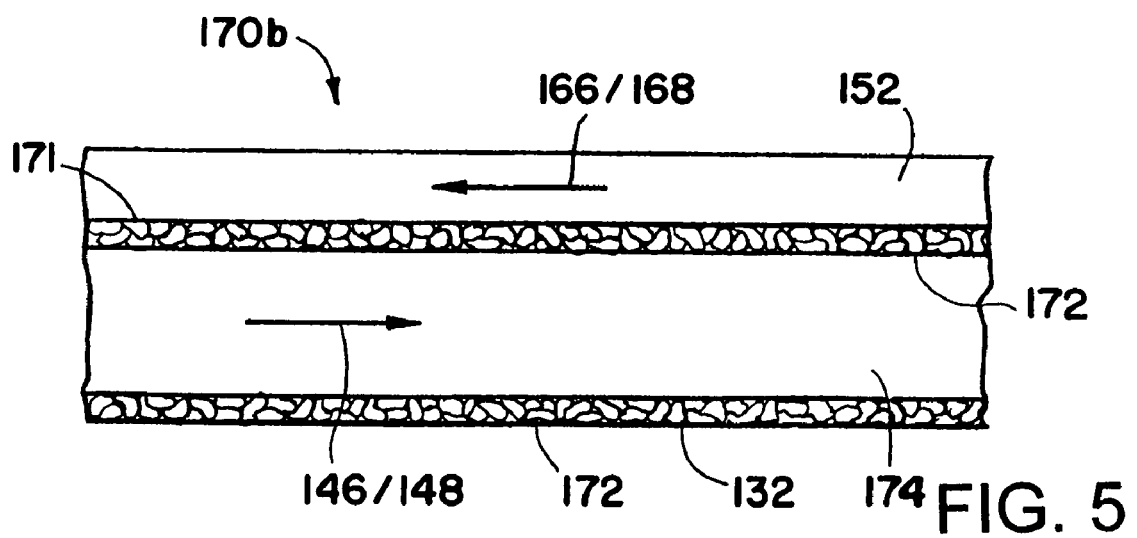
FIG. 5 is a schematic illustration of a process microchannel and an adjacent heat exchange channel that may be used in the microchannel separator core of the microchannel separator illustrated in FIG. 2, the flow of heat exchange fluid through the heat exchange channel being counter-current relative to the flow of fluid through the process microchannel.

Repeating unit 170b illustrated in FIG. 5 is identical to the repeating unit 170a illustrated in FIG. 4 with the exception that the microchannel layer 150 is rotated 90° and the heat exchange fluid flowing through the heat exchange microchannel 152 flows in the direction indicated by direction arrow 166/168 which is countercurrent to the flow of process fluid through the microchannel 132, as indicated by directional arrow 146/148. Alternatively, the heat exchange fluid could flow in the direction opposite to that indicated by directional arrow 166/168 and thereby provide for the flow of heat exchange fluid through the heat exchange microchannel 152 in a direction that would be cocurrent relative to the direction of process fluid through the process microchannel 132.

Figure 16:
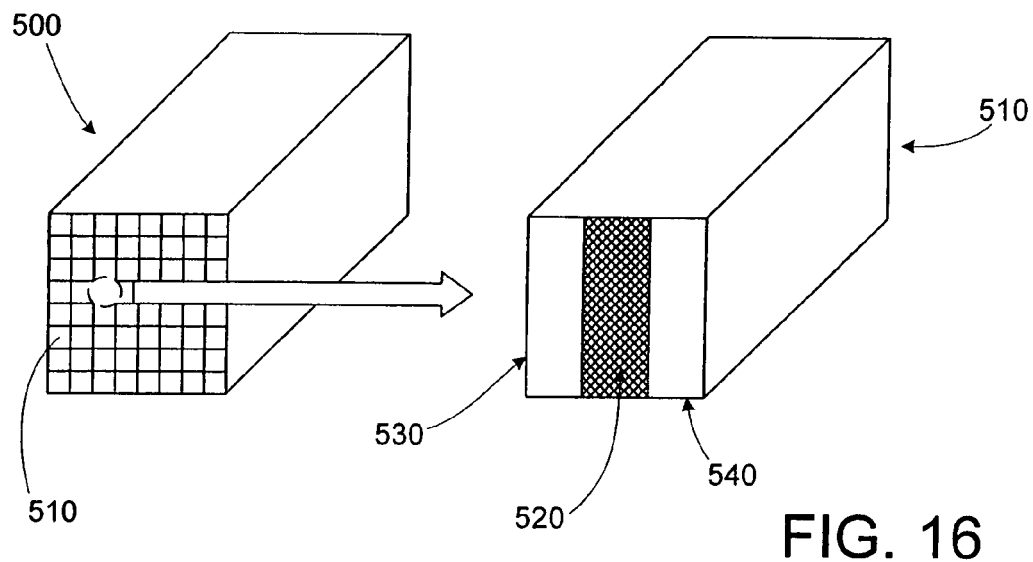
FIG. 16 is a schematic illustration of a microchannel TSA nitrogen rejection unit that can be used pursuant to the inventive process, and a drawing detail showing a schematic illustration of a repeating unit for the microchannel TSA nitrogen rejection unit.

The repeating units illustrated in FIG. 4 and FIG. 5 exemplify configurations wherein heating and cooling fluids flow alternatively through the same heat exchange channels. Alternatively, heating and cooling fluids may flow through separate heat exchange channels in repeating units which contain separate heat exchange channel(s) on each side of the process microchannel, the heat exchange channel(s) on one side of the process microchannel being used for cooling and the heat exchange channel(s) on the other side of the process microchannel being used for heating. This is illustrated in FIG. 16, which is discussed below. Alternatively, the heat exchange channels on each side can be used for both cooling and heating.

The number of microchannels in each of the microchannel layers 130 and 150 may be any desired number, for example, one, two, three, four, five, six, eight, ten, hundreds, thousands, tens of thousands, hundreds of thousands, millions, etc. Similarly, the number of repeating units 170 (or 170a or 170b) of microchannel layers in the microchannel reactor core 102 may be any desired number, for example, one, two, three, four, six, eight, ten, hundreds, thousands, etc.

The microchannels 132 and 152 may have rectangular cross sections and be aligned in side-by-side vertically oriented interleaved planes or horizontally oriented interleaved stacked planes. These planes can be tilted at an inclined angle from the horizontal. These configurations may be referred to as parallel plate configurations. An array of these rectangular channels can be easily arranged in a modularized compact unit for scale-up.

The microchannel separator core 102, including the process microchannels 132 and heat exchange channels 152, process header 104, process footer 106, heat exchange header 108 and heat exchange footer 110 may be made of any material that provides sufficient strength, dimensional stability and heat transfer characteristics to permit operation of the inventive process. These materials include steel; aluminum, titanium; nickel, platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof.

The microchannel separator core 102 may be fabricated using known techniques including wire electrodischarge machining, conventional machining, laser cutting, photochemical machining, electrochemical machining, molding, water jet, stamping, etching (for example, chemical, photochemical or plasma etching) and combinations thereof.

The microchannel separator core 102 may be constructed by forming layers or sheets with portions removed that allow flow passage. A stack of sheets may be assembled via diffusion bonding, laser welding, diffusion brazing, and similar methods to form an integrated device. The microchannel separator core may be assembled using a combination of sheets or laminae and partial sheets or strips. In this method, the channels or void areas may be formed by assembling strips or partial sheets to reduce the amount of material required.

In one embodiment, subsections or modular units of the microchannel separator core 102 may be fabricated using the following components: a substrate piece with a hermetically sealed perimeter and open top/bottom for process flow; and a heat exchange piece. The substrate piece and heat exchange piece may be joined (welded, glued, soldered, etc.) to form a leak-free operating unit. The heat exchange piece may be extruded. The substrate piece and the heat exchange piece may be made from plastic, metal, or other materials as discussed above.

The microchannel separator 100 has appropriate manifolds, valves, conduit lines, etc. to control flow of the process fluid, and the flow of the heat exchange fluid. These are not shown in the drawings, but can be readily provided by those skilled in the art.

Referring to FIGS. 2-5, step (A) of the inventive process may be conducted by flowing the fluid mixture into microchannel separator 100, as indicated by direction arrow 112. In microchannel separator 100 the fluid mixture flows into and through header 104 to process microchannels 132, through the microchannels 132 in contact with sorption medium 172, and then to and through footer 106. The flow of the fluid mixture may be momentarily stopped within the process microchannels 132 to permit sorption of at least part of the methane or nitrogen by the sorption medium 172. The choice of sorption of either methane or nitrogen during this step is dependent upon the sorption medium employed. Process step (A) may be continued until a desired loading of the sorption medium 172 by the methane or nitrogen is achieved. The desired loading level may be in the range of about 0.001 to about 1 gram of methane or nitrogen per gram of sorption medium, and in one embodiment about 0.01 to about 0.1 gram of methane or nitrogen per gram of sorption medium. At the end of this sorption step the non-sorbed parts of the fluid mixture may be removed from the process microchannels. During the sorption part of step (A) of the inventive process, the average sorbent temperature within the process microchannels may be in the range from about −40° C. to about 200° C., and in one embodiment from about −40° C. to about 150° C., and in one embodiment from about 0° C. to about 200° C., and in one embodiment about 20° C. to about 60° C., and in one embodiment from about 20° C. to about 45° C., and in one embodiment about 40° C. The pressure within the process microchannels 132 during step (A) may be in the range from about 0.0001 to about 100 atmospheres of absolute pressure, and in one embodiment from about 0.01 to about 50 atmospheres, and in one embodiment from about 0.1 to about 30 atmospheres, and in one embodiment from about 1 to about 20 atmospheres, and in one embodiment from about 1 to about 10 atmospheres absolute pressure. The period of time for the sorption to occur may range from about 0.1 to about 10 seconds, and in one embodiment about 1 to about 5 seconds.

During step (A), the non-sorbed parts of the fluid mixture may be removed using the following procedure. The inlet valves are closed and the microchannel separator is heated. The resulting pressurization of the system drives the non-sorbed parts of the fluid mixture out of the process microchannels. During this step, the pressure may be increased by about 0.001 to about 10 atmospheres, and in one embodiment about 0.01 to about 1 atmospheres. In one embodiment, a closed system may be employed where both the inlet and outlet valves are closed during heating, followed by opening the outlet valve to reduce the system pressure and remove the non-sorbed parts of the fluid mixture. The outlet valve may also stay open (inlet feed valve closed) during the heating step to begin to remove desorbed methane or nitrogen during all or part of the heating step. The heating time and temperature may be adjusted to optimize performance. Higher purities and lower capital costs may be achieved with this embodiment. This approach may be used for evaluating adsorbent performance under fast thermal cycle conditions.

Step (B) of the inventive process involves desorbing the sorbed methane or nitrogen from the sorption medium 172. This desorption step may be conducted by increasing or decreasing the temperature within the process microchannels relative to the temperature used during the sorption part of step (A). The pressure used during step (B) may be the same as the pressure used during the sorption part of step (A), or it may be higher or lower. In one embodiment, step (B) is conducted at a higher temperature and a lower pressure than the sorption part of step (A). In one embodiment, the average sorbent temperature used during step (B) may be from about 1° C. to about 200° C., and in one embodiment about 10° C. to about 100° C., above or below the temperature used during the sorption part of step (A). During step (B) the average sorbent temperature within the process microchannels may be in the range from about 0° C. to about 200° C., and in one embodiment about 0° C. to about 200° C., and in one embodiment about 10° C. to about 100° C., and in one embodiment about 55° C. to about 80° C., and in one embodiment about 60° C. during step (B). The pressure within the process microchannels 132 during step (B) may be reduced by about 0.01 to about 10 atmospheres, and in one embodiment about 0.1 to about 1 atmospheres below the pressure used during step (A). Alternatively, the pressure within the process microchannels 132 during step (B) may be raised by about 0.1 to about 10 atmospheres, and in one embodiment about 1 to about 5 atmospheres above the pressure used during step (A). The pressure within the process microchannels during step (B) may be in the range from about 0.0001 to about 100 atmospheres absolute pressure, and in one embodiment from about 0.01 to about 50 atmospheres, and in one embodiment from about 0.1 to about 30 atmospheres, and in one embodiment from about 1 to about 20 atmospheres, and in one embodiment from about 1 to about 10 atmospheres, and in one embodiment from about 1 to about 5 atmospheres absolute pressure. The percentage of sorbed material that is desorbed during this step (B) may range from about 5 to about 100%, and in one embodiment about 10 to about 99% by volume. The time for performing this desorbing step may range from about 0.1 to about 10 seconds, and in one embodiment about 1 second to about 5 seconds.

During step (B) the desorbed methane or nitrogen may be removed using the following procedure. The inlet valves are closed and the microchannel separator is heated. The resulting pressurization of the system drives the desorbed methane or nitrogen out of the process microchannels. The pressure may be increased by about 0.001 to about 10 atmospheres, and in one embodiment about 0.01 to about 1 atmospheres. In one embodiment, a closed system may be employed where both the inlet and outlet valves are closed during heating, followed by opening the outlet valve to reduce the system pressure and remove the desorbed methane or nitrogen. The outlet valve may also stay open (inlet feed valve closed) during the heating step to begin to remove methane or nitrogen during all or part of the heating step. The heating time and temperature may be adjusted to optimize performance. Higher purities and lower capital costs may be achieved with this embodiment. For example, a stream of inlet feed may not be required to flow during desorption to aid in material removal; this would avoid diluting the product. A stream of the product may not be required to be diverted to the desorbing stage and thus diluting the inlet portion of the product stream, nor would it be required to be recompressed to the inlet of the microchannel separator.

Figure 18:
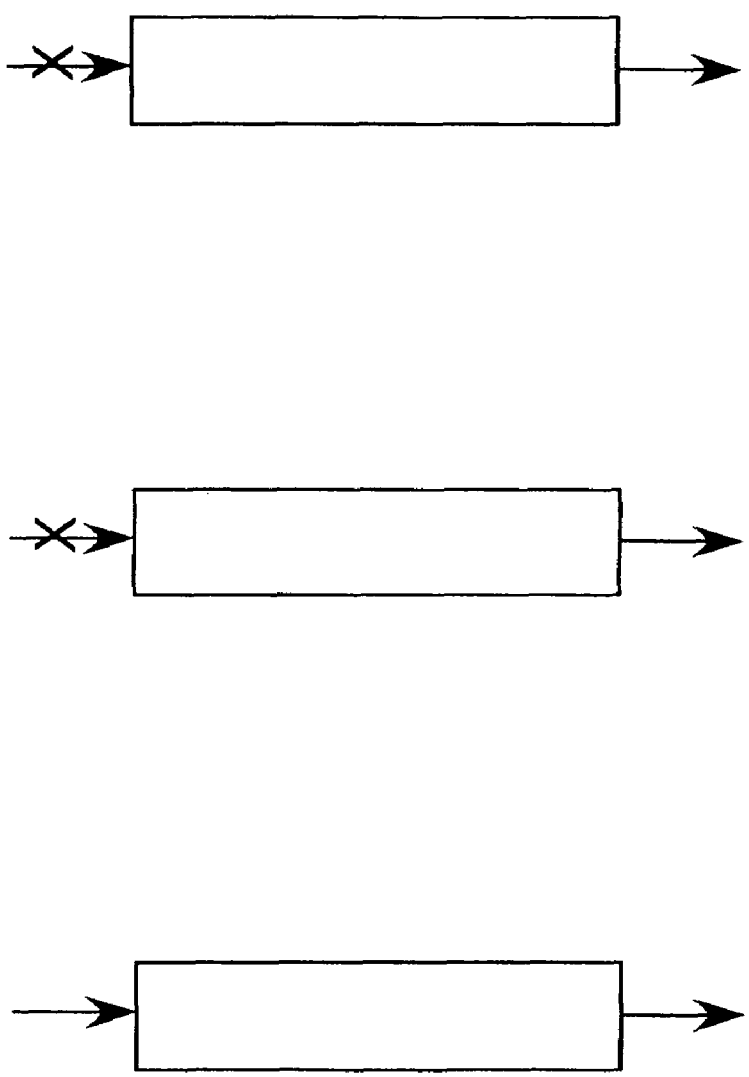
FIG. 18 is a series of three flow diagrams showing a sequence of valve operations for removing non-sorbed parts of the fluid mixture from the microchannels separator during step (A) of the inventive process and desorbed methane or nitrogen during step (B) of the inventive process.

The non-sorbed parts of the fluid mixture may be removed from the process microchannels during step (A) and the desorbed methane or nitrogen may be removed from the process microchannels during step (B) using the following procedure. Referring to FIG. 18, the sorption medium may be sorbed to capacity or within about 80% of capacity at a first temperature (T-sorb) during Step 1. The valve to the inlet of the microchannel separator is closed to prevent an inflow of new fluid during Step 2. After closing the inlet to new fluid, the device is heated to a second temperature (T-desorb, where T-desorb>T-sorb) during Step 3. As the temperature is increased the capacity of the sorption medium is reduced and solutes move from the solid sorbed phase to the gaseous phase. As more solutes enter the gaseous phase, the local gaseous phase pressure increases. As the local gaseous-phase pressure increases a net gradient in pressure from the sorption medium to the microchannel separator outlet increases and fluid flows from the microchannel separator. By this method, no purging fluid to remove non-sorbed parts of the fluid mixture during step (A) or flush fluid to remove desorbed methane or nitrogen during step (B) is required. This procedure is advantageous since if the purging fluid or flush fluid is other than the feed mixture the product will be diluted. If the purging fluid or flush flid is the feed mixture, the product purity will be reduced. If the purging fluid or flush flid is a slip stream of the product mixture, the product recovery will be reduced.

In one embodiment, the valving system described above may be used to pressurize the product mixture. After sorbing to within about 80% of capacity, both the inlet and outlet valves may be closed. The system is heated to reduce the sorbent capacity. As gas is evolved from the solid to the gaseous phase, the local pressure within the device will increase. At higher pressure, the adsorbent capacity will also increase. A comparison of change in capacity per unit temperature over the change in capacity per unit pressure may suggest appropriate adsorbents—where adsorbents that are more sensitive to temperature than pressure are useful.

Figure 19:
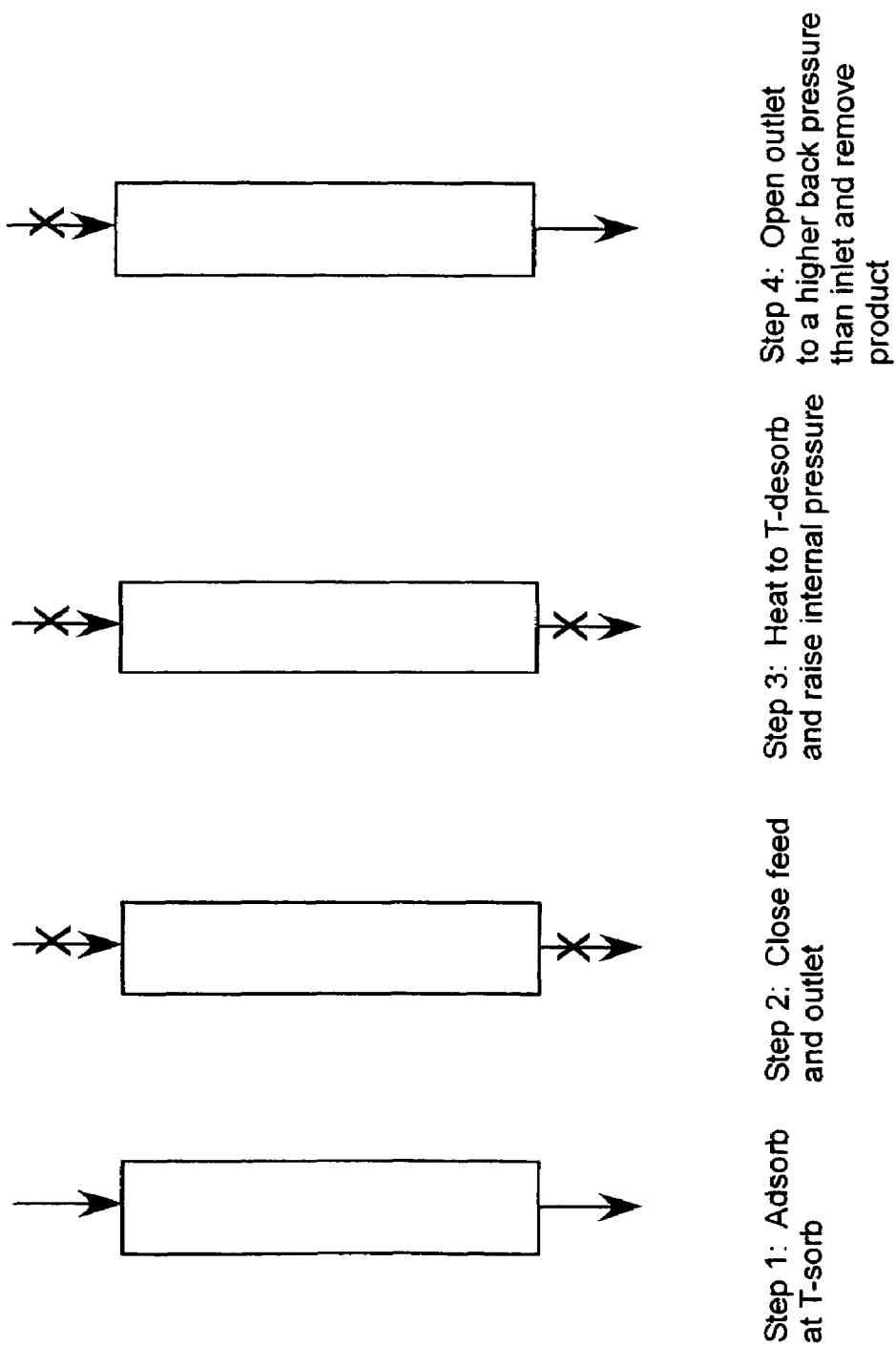
FIG. 19 is a schematic illustration of a sequence of valve openings and closings for pressurizing product within the microchannel separator.
Figure 20:
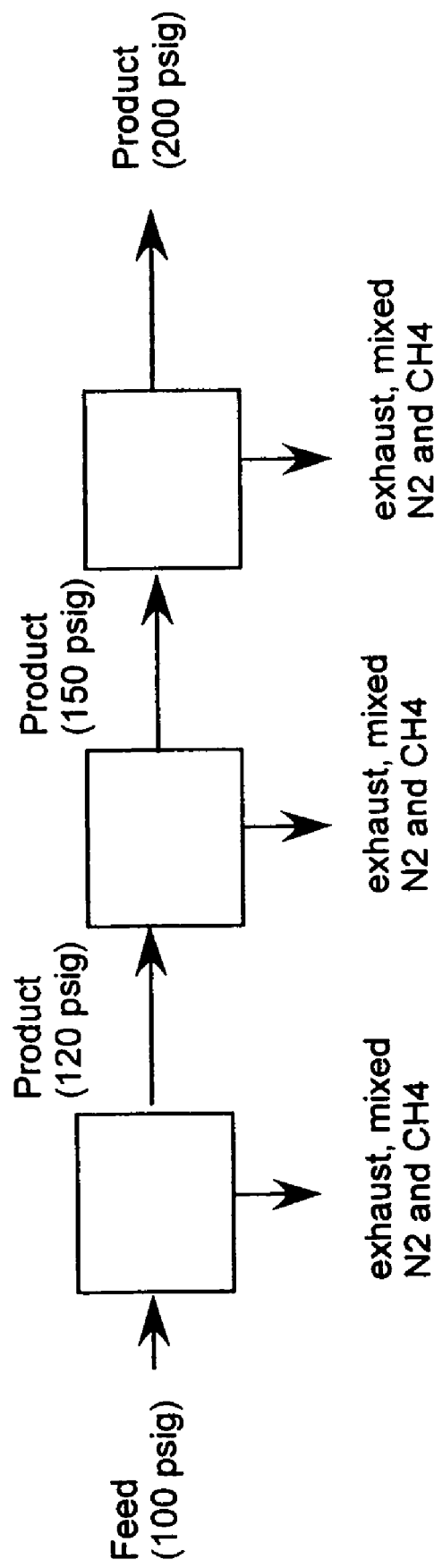
FIG. 20 is a flow diagram illustrating a multi-stage process for thermal compression of a product stream.

After the pressure has increased within the microchannel separator, the outlet valve may be opened and set to a higher pressure setting. In one embodiment, the pressure during adsorption may be held at 100 psig. The pressure may be allowed to rise to 125 psig during heating, and then subsequently, the product may be removed at 120 psig while removing product. Raising the pressure by a significant amount (>20%) may require multiple stages. This approach may be used to offset a pressure drop during adsorption or used for a trim compressor to tailor the product to the final desired product pressure. FIG. 19 illustrates a single stage process to pressurize the product stream (note that a stage includes multiple cyclic steps). FIG. 20 illustrates a multi-stage process for thermal compression of the product stream.

For the above indicated procedures, it may be advantageous if the valves for the microchannel separator were to fully stroke in milliseconds, every few seconds. In one embodiment, the valves should be capable of rapidly opening and closing, 2) have high number of cycles between failures, and 3) inexpensive. High-performance butterfly valves (HPBVs) may be useful. HPBVs are made by a number of manufacturers. An example is the DuZurik HPVB with its PowerRac® actuator.

A typical failure sequence for the HPBV is the seat, packing, and then actuator seals (rebuild). Except for tightening the packing gland, the valve should be removed from service for repair. None of these expected repairs is particularly expensive. The downtime associated with the repair is the significant cost.

For the microchannel separator, a seat failure (minor leakage) should not be a major issue since a small leakage through the seat would have a small effect on unit performance. Secondary shutdown valves for emergency isolation on the feed and product streams may be used to operate the system safely. Assuming that tight shutoff cannot be guaranteed, seat seal life, may be short. An actuator failure, on the other hand, could very easily force the system to shut down for maintenance. Consequently, the mean time between actuator failures may be the basis for a preventative maintenance schedule.

At the end of step (B) the sorption medium 172 may be regenerated. This may be done by flowing a regenerating fluid through the process microchannels 132 in contact with the sorption medium 172. Examples of suitable regenerating fluids include water, nitrogen, methane and carbon dioxide. The regenerating fluid may flow from the header 104 through the process microchannels 132 and then to the footer 106, or in the opposite direction from the footer 106 through the process microchannels 132 to the header 104. During this regenerating step the average sorbent temperature within the process microchannels may be in the range from about 0° C. to about 250° C., and in one embodiment about 0° C. to about 200° C., and in one embodiment about 10° C. to about 100° C., and in one embodiment about 20° C. to about 80° C., and in one embodiment about 60° C. The pressure within the process microchannels 132 during this regeneration step may be in the range from about 0.0001 to about 100 atmospheres, and in one embodiment about 0.01 to about 50 atmospheres, and in one embodiment about 0.1 to about 30 atmospheres, and in one embodiment about 1 to about 20 atmospheres, and in one embodiment about 1 to about 10 atmospheres absolute pressure. The residence time of the regenerating fluid in the process microchannels 132 may be in the range from about 0.1 to about 10 seconds, and in one embodiment about 1 to about 5 second.

In one embodiment, during the operation of steps (A) and (B) of the inventive process, the process microchannels 132 may be cooled and/or heated using a heat exchange fluid flowing through the heat exchange microchannels 152. The heat exchange channels 152 may switch from cooling during step (A) of the inventive process to heating during step (B). Alternatively, separate dedicated cooling and heating heat exchange microchannels 152 may be used. The heat exchange fluid flows from heat exchange header 108 through the heat exchange microchannels 152 to heat exchange footer 110. The heat exchange fluid transfers heat between the heat exchange microchannels 152 and the process microchannels 132. The heat exchange fluid may be recirculated using known techniques. The heat exchange fluid may be any fluid. The heat exchange fluid may comprise one or more of air, steam, liquid water, gaseous nitrogen, liquid nitrogen, oils such as mineral oil, and heat exchange fluids such as Dowtherm A and Therminol which are available from Dow-Union Carbide. The heat exchange fluid may comprise one or more organic compounds containing 1 to about 5 carbon atoms per molecule such as methylenechloride, fluorochloromethanes (e.g., dichlordiflouromethane), hydrocarbons containing 1 to about 5 carbon atoms per molecule (e.g., methane, ethane, ethylene, propanes, butanes, pentanes, etc.), or a mixture of two or more thereof.

In one embodiment, the heat exchange microchannels 152 may comprise process microchannels wherein an endothermic or exothermic process is conducted. Examples of endothermic processes that may be conducted in the heat exchange channels include steam reforming and dehydrogenation reactions. In one embodiment, the incorporation of a simultaneous endothermic reaction to provide an improved heat sink may enable a typical heat flux of roughly an order of magnitude or more above the convective cooling heat flux. Examples of exothermic processes that may be conducted in the heat exchange channels include water-gas shift reactions, methanol synthesis reactions and ammonia synthesis reactions.

In one embodiment, the heat exchange fluid may undergo a phase change as it flows through the heat exchange microchannels 152. This phase change provides additional heat addition or removal from the process microchannels or liquid channels beyond that provided by convective heating or cooling. For a liquid heat exchange fluid being vaporized, the additional heat being transferred may result from the latent heat of vaporization required by the heat exchange fluid. An example of such a phase change may be a heat exchange fluid that undergoes boiling. In one embodiment, the heat exchange fluid boils or undergoes partial boiling in the heat exchange channels. In one embodiment, the amount of heat exchange fluid boiling in the heat exchange channels may be in the range from about 0.1 to about 99% by volume of the total amount of heat exchange fluid in the heat exchange channel, and in one embodiment about 5 to about 30% by volume.

The same heat exchange fluid may be used for cooling during step (A) of the inventive process and heating during step (B). In this embodiment, the heat exchange fluid may be cooled prior to sorbing during step (A) and heated prior to desorbing during step (B). This may be accomplished in separate heat exchangers, for example, microchannel heat exchangers, wherein one or more first heat exchangers are provided for cooling and one or more second heat exchangers are provided for heating. This may be accomplished by flowing the heat exchange fluid through an expansion-compression cycle wherein the heat exchange fluid undergoes expansion prior to sorbing during step (A) of the inventive process and compression prior to desorbing during step (B). In either case the cooling may be enhanced by subjecting the heat exchange fluid to vaporization, for example partial vaporization. This vaporization may take place in heat exchange channels, for example heat exchange microchannels, in thermal contact with the sorption medium during sorbing or upstream of the heat exchange channels. Similarly, heating may be enhanced by subjecting the heat exchange fluid to condensation, for example partial condensation. This condensation may take place in heat exchange channels, for example heat exchange microchannels, in thermal contact with the sorption medium during desorbing or upstream of the heat exchange channels.

The heat flux for convective heat exchange or convective heating in the microchannel separator core 102 may be in the range from about 0.01 to about 125 watts per square centimeter ($W/cm^2$) of surface area of the process microchannels in the microchannel separation core, and in one embodiment from about 0.1 to about 50 $W/cm^2$, and in one embodiment from about 1 to about 25 $W/cm^2$, and in one embodiment from about 1 to about 10 $W/cm^2$. The heat flux for phase change heat exchange may range from about 1 to about 250 $W/cm^2$, and in one embodiment, from about 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$:

The pressure within each individual heat exchange microchannel 152 may be controlled using passive structures (e.g., obstructions), orifices and/or mechanisms upstream of the heat exchange microchannels 152 or in the microchannels. By controlling the pressure within each heat exchange microchannel, the temperature within each heat exchange microchannel can be controlled. A higher inlet pressure for each heat exchange fluid may be used where the passive structures, orifices and/or mechanisms let down the pressure to the desired heat exchange microchannel pressure. By controlling the temperature within each heat exchange microchannel, the temperature in the adjacent process microchannel can be controlled. Thus, for example, each process microchannel may be operated at a desired temperature by employing a specific pressure in the heat exchange microchannel adjacent to the process microchannel. This provides the advantage of precisely controlled temperatures for each process microchannel. The use of precisely controlled temperatures for each process microchannel provides the advantage of a tailored temperature profile and an overall reduction in the energy requirements for the separation process.

The process microchannels 132 may be heated using a resistance heater. The resistance heater may be in the form of heating tape, thin sheets, wire, rods, discs, or similar structures positioned inside the process microchannels 132 or adhered to or embedded in the walls of the process microchannels. Another heating alternative involves using a metal structure such as a metal foam or fin assembly that functions as a resistance heater and is used as a support for the sorption medium 172, the sorbent material being coated on the exterior surface of the metal structure. Another possibility involves using heat conductive particulates (e.g., metallic particulates) intermixed with the sorption medium to control and optimize the overall thermal swing effectiveness. This optimization can be achieved by adjusting the amount and size of the particulates.

In one embodiment, the process microchannels 132 may be heated using a resistance heater, and cooled using a heat exchange fluid flowing through heat exchange microchannels 152. The resistance heater may be positioned in the process microchannels 132 or on one side of the process microchannels 132, and the heat exchange microchannels 152 may be positioned on the other side of the process microchannels 132.

In one embodiment, the thermal swing of the sorption medium (or adsorbent bed) may be effected by the use of a heat exchange fluid that is, for example, cold relative to the sorption medium during step (A) and hot relative to the sorption medium during step (B). The flow orientation of hot and cold heat exchange fluid may be important for effective thermal swing of the bed. The heat exchange fluid flow may be oriented such that it provides uniform thermal swing at all locations of the bed. Since adsorption and desorption of gas on a surface is a function of the surface temperature, non-uniform thermal swing can lead non-uniform adsorption and desorption which may have a negative affect on performance. There are several ways in which heat can be supplied and removed from the bed. These are illustrated in FIGS. 21-23.

Figure 21:
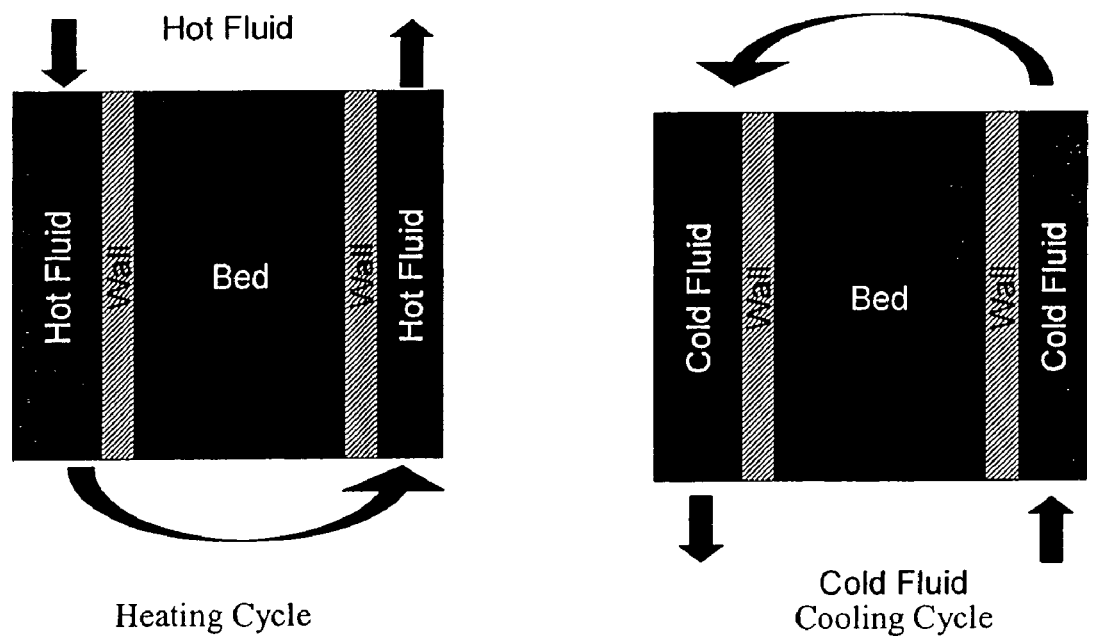
Figure 22:
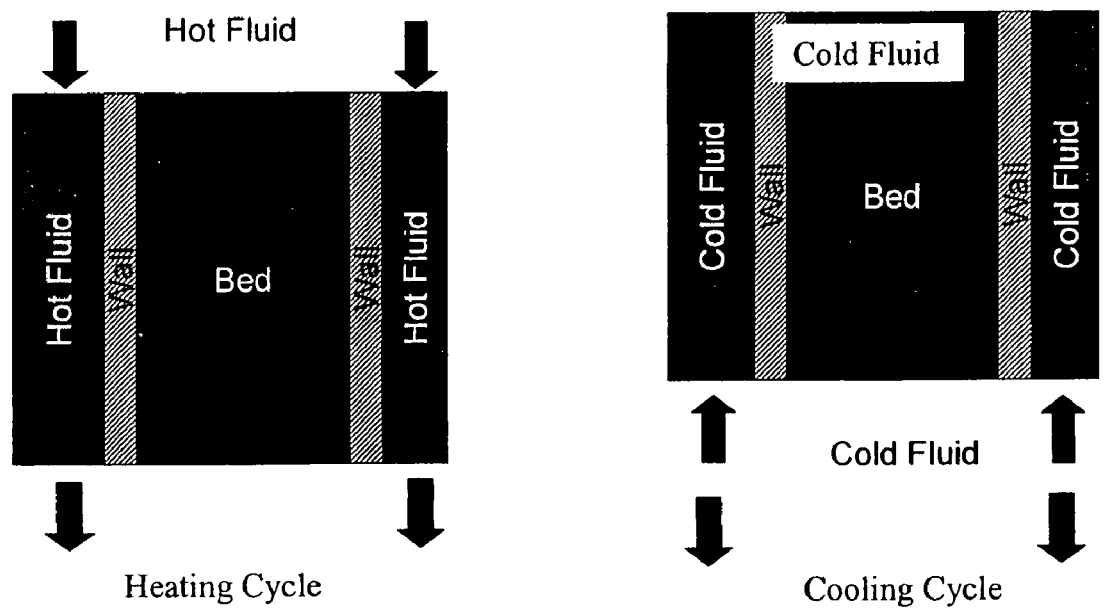

Referring to FIG. 21, the heating and cooling fluids are circulated around the bed as shown during desorption and adsorption cycles, respectively. The entrance for heating and cooling fluid can be from the same location or from different locations relative to the adsorbent bed. In FIG. 21, the entrance of hot and cold fluids is shown at opposite locations relative to the bed. In FIG. 22, the hot and cold fluids flow from one end of the adsorbent bed to other end. The hot and cold fluid inlets are at opposite ends of the adsorbent bed. An advantage of the process in FIG. 22 over the process in FIG. 21 is that with the process in FIG. 22 less volume needs to be displaced when heating and cooling fluids are switched. In both FIGS. 21 and 22, the adsorbent bed is heated or cooled from all sides and there is mixing of hot and cold fluids inside the microchannel separator during thermal cycling. In the process illustrated in FIG. 23, the adsorbent bed is heated or cooled only from one side. An advantage of FIG. 23 over FIGS. 21 and 22 is that FIG. 23 will not have mixing of hot and cold fluids inside the microchannel separator, making it more energy efficient and it can provide a more uniform thermal swing. FIG. 24 illustrates a bed temperature profile during the heating and cooling cycle for FIGS. 21 and 22, and for FIG. 23.

In one embodiment, at least about 5% by volume, and in one embodiment from about 5% to about 100% by volume, and in one embodiment from about 10% to about 99% by volume, and in one embodiment from about 25% to about 99% by volume, and in one embodiment from about 50% by about 99% by volume of the fluid mixture that is sorbed during step (A) may be desorbed during step (B).

Figure 14:
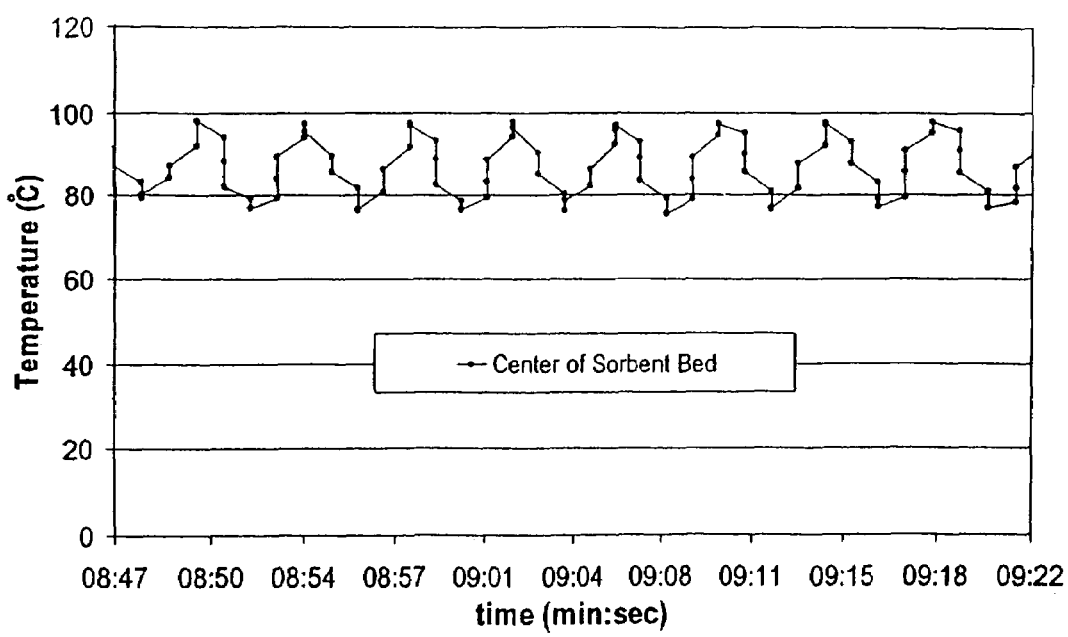
FIG. 14 is a plot of temperature versus time for a microchannel TSA process conducted in accordance with the invention.

In one embodiment, the cycle time required to complete both steps (A) and (B) may be up to about 10 seconds, and in one embodiment from about 0.1 to about 10 seconds, and in one embodiment from about 0.1 to about 8 seconds, and in one embodiment from about 0.2 to about 7 seconds, and in one embodiment from about 0.3 to about 6 seconds, and in one embodiment about 0.5 to about 6 seconds, and in one embodiment about 1 to about 5 seconds, and in one embodiment about 2 to about 5 seconds. In one embodiment, the difference between the average sorbent temperature used in the process microchannels during step (A) and the average sorbent temperature used during step (B) may be in the range from about 1° C. to about 100° C., and in one embodiment about 5° C. to about 75° C., and in one embodiment about 10° C. to about 50° C., and in one embodiment about 10° C. to about 40° C., and in one embodiment about 10° C. to about 30° C., and in one embodiment about 20° C. In one embodiment, the difference in temperature may be about 20° C., and the cycle time may be from about 3 to about 5 seconds. This is illustrated in FIG. 14.

In one embodiment, the average sorbent temperature within the process microchannels during step (A) may be in the range from about 20° C. to about 50° C., and in one embodiment about 20° C. to about 45° C., and in one embodiment about 40° C.; and the average sorbent temperature within the process microchannels during step (B) may be in the range from about 50° C. to about 80° C., and in one embodiment about 55° C. to about 80° C., and in one embodiment about 60° C.

In one embodiment, the flow of the fluid mixture through the process microchannels may be at least about 20 standard cubic meters per hour per cubic meter of volume of the microchannel separator core 102 (SCMH/CM), and in one embodiment from about 20 to about 100 SCMH/CM, and in one embodiment from about 20 to about 50 SCMH/CM, and in one embodiment from about 50 to about 100 SCMH/CM. The recovery of either methane or nitrogen may be at least about 50% by volume of methane or nitrogen in the fluid mixture entering the microchannel separator, and in one embodiment at least about 70% by volume, and in one embodiment at least about 90% by volume.

In one embodiment, the process microchannels 132 may have an internal dimension of height or width of up to about 10 mm, and the heat exchange microchannels 152 may have an internal dimension of height or width of up to about 2 mm. In this embodiment, the relatively large internal height or width of the process microchannels 132 may be used while still allowing relatively fast cycle times if the effective thermal conductivity of the sorption medium 172 is relatively high. For most polymeric or ceramic based sorption mediums, the effective thermal conductivity is on the order of about 1 W/m/K. As the effective thermal conductivity is increased either through the use of co-mixing highly conductive powders or through the use of a highly conductive sorption medium, the height or width of the sorption medium and correspondingly the height or width of the process microchannels 132 may be increased. For effective thermal conductivities of less than about 1 W/m/K, the process microchannels 132 may have an internal height or width of up to about 2 mm. However, as the effective thermal conductivity increases above about 5 W/m/K, the use of larger process microchannels 132 of up to about 10 mm may be used. In these embodiments, heat exchange microchannels 152 may be used to quickly cool the sorption medium 172. A heating microchannel or resistance heating may be used to heat the sorption medium 172.

In one embodiment, a short cycle time may be achieved by the use of process headers 104 and footers 106 that do not contribute substantially to the overall fluid residence time. For example, a one second cycle time may not be achieved if the fluid is retained within the header for 10 seconds. However, if the combined fluid residence time in the header and footer is less than about 0.4 seconds, an overall cycle time of one second may be achieved. In one embodiment, the combined fluid residence time in the process header 104 and process footer 106 may range from about 0.01 to about 1 second, and in one embodiment about 0.1 to about 0.5 second.

The design of headers 104 and footers 106 for fast flush of the fluid requires a balance of short residence times with low header and footer pressure drop to allow for suitable fluid distribution. In one embodiment, the header 104 and footer 106 have geometric designs that enhance the flow of fluid through such headers and footers. Angled headers and footers act to both reduce volume (and thus residence time) and pressure drop to enable good flow distribution. The angle may be in the range of about 5 to about 90 degrees. In addition, open header and footer volumes may be replaced with designs where open volume is only present to directly connect with the process microchannels 132 and is not present above fins, metal plates, and the like. For example, a pipe may be used to distribute fluids from process microchannel to process microchannel (as the pressure drop in a circular or near circular pipe will be lower than rectangular ducts). The flow from the pipe to the process microchannel may be connected via a severe angular entrance region that tapers into a larger rectangular process microchannel. The tapered entrance region advantageously does not overlap fins, metal plates and the like, which may restrict the total volume in the header. Tapered or angular headers have the additional advantage of inhibiting the formation of stagnant areas that are difficult to flush.

In one embodiment of the invention, a split cycle may be used to tailor the purity of the methane. A split cycle is characterized by opening and closing the valves at the end of the process microchannels at a faster rate than the valves that move the fluid mixture between sorption medium beds. This process increases the methane purity and exhausts the fluid mixture until the purity achieves a desired level. As an example, the feed may alternate between two sorption medium beds at a rate of ten seconds, and split cycle times of one second and nine seconds. During the desorption stage, the purge fluid flows through the sorption medium bed to remove the non-sorbed material and then desorb the desired fluid component. During the first part of the cycle the concentration of the effluent fluid contains components of the entire feed fluid mixture that is retained from the previous feed cycle. The temperature during the first part of the split cycle may either be the sorption temperature or higher than the sorption temperature and approach or equal the desorption temperature. The non-sorbed fluids from the previous feed sorption cycle are removed from the process microchannel sorption medium bed during the first part of the split cycle desorption stage. During this first part of the split cycle the concentration of all components decreases except those sorbed during the previous cycle. The effluent of the first part of the split cycle is sent to an exhaust. When the product purity is sufficiently high to achieve the desired target, the valves are switched at the end of the process microchannels to collect the desorbing fluid effluent as the desired product. The split cycle may be performed at any time during the overall cycle. For a ten second feed cycle time, the split cycle time may be one second, five seconds, or any other value less than ten seconds.

Figure 6:
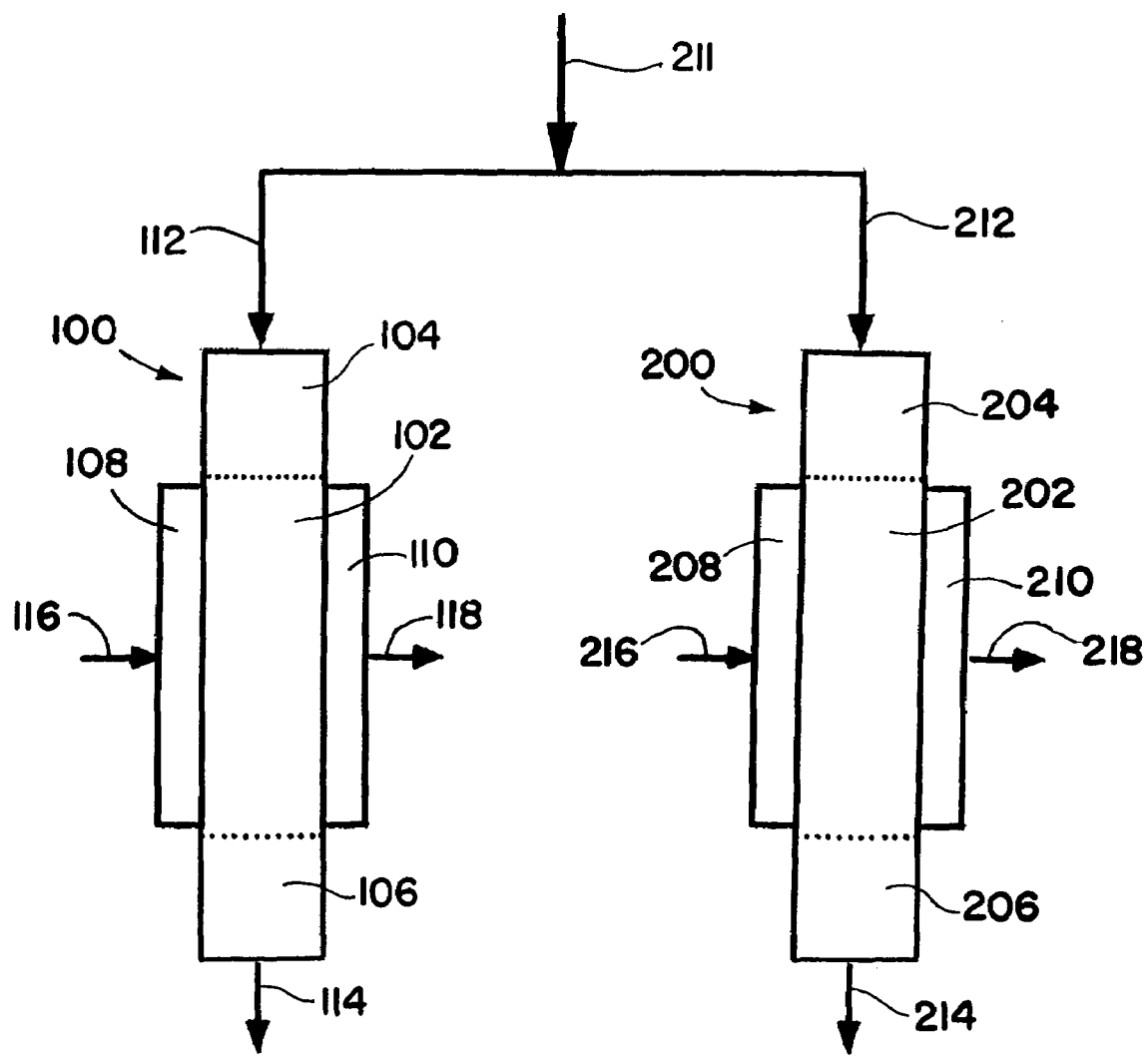
FIG. 6 is a schematic illustration of two microchannel separators which can be operated simultaneously and in parallel pursuant to the inventive process to separate methane or nitrogen from a fluid mixture comprising methane and nitrogen.

The process illustrated in FIG. 6 involves the use of two microchannel separators 100 and 200 operating in parallel. This arrangement allows for a sequential operation wherein step (A) may be conducted in microchannel separator 100 while step (B) is conducted in microchannel separator 200, and vice versa. Microchannel separator 100 is the same as described above with reference to FIG. 2. Microchannel separator 200 is the same as or similar to microchannel separator 100 in construction and operation. Microchannel separator 200 includes microchannel separator core 202, process header 204, process footer 206, heat exchange header 208 and heat exchange footer 210. The microchannel separator core 202 contains a plurality of process microchannels and a plurality of adjacent heat exchange channels. The heat exchange channels may be microchannels. A sorption medium is contained within the process microchannels. The process microchannels and heat exchange channels may be aligned in layers, one above the other, or side by side. A fluid mixture containing methane and nitrogen flows into microchannel separator 200, as indicated by directional arrow 212, through process header 204 and then into the process microchannels in the microchannel separator core 202 where it contacts the sorption medium. The fluid mixture is maintained in the process microchannels in contact with the sorption medium until at least part of either the methane or the nitrogen is sorbed by the sorption medium. The non-sorbed parts of the fluid mixture are then removed from the process microchannels. This may be done by internally pressurizing the system as described above. The non-sorbed parts of the fluid mixture flow through the process microchannels to and through the process footer 206 and out of the microchannel separator 200, as indicated by directional arrow 214. The temperature within the process microchannels is then changed to provide for desorption of the methane or nitrogen from the sorption medium. The methane or nitrogen is desorbed from the sorption medium. The desorbed methane or nitrogen is then removed from the process microchannels. This may be done by internally pressurizing the system as described above. The non-sorbed parts of the fluid mixture may be recycled through the process microchannels any number of times, for example, one, two, three, four times, etc. A heat exchange fluid flows into heat exchange header 208, as indicated by directional arrow 216, and from heat exchange header 208 through the heat exchange channels in microchannel separator core 202 to heat exchange footer 210, and out of heat exchange footer 210, as indicated by directional arrow 218.

The process illustrated in FIG. 6 involves the use of process steps (I)(A), (I)(B), (II)(A) and (II)(B). Step (I)(A) and (I)(B) may be conducted in the same manner as steps (A) and (B) described above with reference to FIG. 2. The only difference is that step (I)(A) initially involves flowing only a portion of the fluid mixture through line 211 to line 112. From that point on the above description of steps (A) and (B) with reference to FIG. 2 are applicable to the description of steps (I)(A) and (I)(B) with reference to FIG. 6.

Step (II)(A) of the process illustrated in FIG. 6 may be conducted by flowing another portion of the fluid mixture through line 211 to line 212, and then through line 212 to microchannel separator 200. In microchannel separator 200 the fluid mixture flows into header 204, the process microchannels in microchannel separator core 204 in contact with a sorption medium, and footer 208. The fluid mixture is maintained in the process microchannels at a desired temperature and pressure to permit at least part of the methane or nitrogen to be sorbed by the sorption medium. This process may be continued until a desired loading of the sorption medium by the methane or nitrogen is achieved. The desired loading level may be in the range of about 0.001 to about 1 gram of methane or nitrogen per gram of sorption medium, and in one embodiment about 0.01 to about 0.1 gram of methane or nitrogen per gram of sorption medium. At the end of this sorption step the non-sorbed parts of the fluid mixture may be removed from the process microchannels by internally pressurizing the system as described above.

During the sorption part of step (II)(A) in microchannel separator 200 the average sorbent temperature within the process microchannels may be in the range from about −40° C. to about 200° C., and in one embodiment from about −40° C. to about 150° C., and in one embodiment from about 0° C. to about 200° C., and in one embodiment about 20° C. to about 60° C., and in one embodiment from about 30° C. to about 50° C., and in one embodiment about 40° C. The pressure within the process microchannels during step (II)(A) may be in the range from about 0.0001 to about 100 atmospheres, and in one embodiment from about 0.01 to about 50 atmospheres, and in one embodiment from about 0.1 to about 30 atmospheres, and in one embodiment from about 1 to about 20 atmospheres, and in one embodiment about 1 to about 10 atmospheres absolute pressure. The period of time for the sorption to occur may range from about 0.1 to about 10 seconds, and in one embodiment about 1 to about 5 seconds.

Step (II)(B) involves desorbing the sorbed fluid component from the sorption medium in the microchannel separator 200. This desorption step may be conducted by increasing or decreasing the average sorbent temperature of the sorption medium relative to the temperature used during the sorption part of step (II)(A). The pressure used during step (II)(B) may be the same as the pressure used during the sorption part of step (II)(A). In one embodiment, step (II)(B) is conducted at a higher temperature and a lower pressure than the sorption part of step (II)(A). The temperature used in step (II)(B) may be increased by about 1° C. to about 100° C., and in one embodiment about 10° C. to about 60° C., above the temperature that is used during the sorption part of step (II)(A). Alternatively, the temperature used in step (II)(B) may be decreased by about 1° C. to about 100° C., and in one embodiment about 10° C. to about 60° C., below the temperature that is used during the sorption part of step (II)(A). During step (II)(B) the temperature within the process microchannels may be in the range from about 0° C. to about 250° C., and in one embodiment about 0° C. to about 200° C., and in one embodiment about 10° C. to about 100° C., and in one embodiment about 40° C. to about 80° C., and in one embodiment about 60° C. during step (II)(B). The pressure within the process microchannels during step (II)(B) may be reduced by about 0.01 to about 10 atmospheres, and in one embodiment about 0.1 to about 5 atmospheres, below the pressure used during step (II)(A). Alternatively, the pressure within the process microchannels during step (II)(B) may be raised by about 0.1 to about 10 atmospheres, and in one embodiment about 1 to about 5 atmospheres above the pressure used during step (II)(A). The pressure during step (II)(B) may be in the range from about 0.0001 to about 100 atmospheres, and in one embodiment from about 0.01 to about 50 atmospheres, and in one embodiment from about 0.1 to about 30 atmospheres, and in one embodiment from about 1 to about 20 atmospheres, and in one embodiment from about 1 to about 10 atmospheres, and in one embodiment from about 1 to about 5 atmospheres absolute pressure. The percentage of sorbed material that is desorbed during this step (II)(B) may range from about 5% to about 100%, and in one embodiment from about 10 to about 99%. The period of time for performing this desorbing step may range from about 0.1 to about 10 seconds, and in one embodiment about 1 to about 5 seconds.

During step (II)(B) the desorbed methane or nitrogen is removed from the process microchannels. This may be done by internally pressurizing the system as described above. This process may be continued until a desired level of removal of the methane or nitrogen from the microchannel separator 200 is achieved.

At the end of step (II)(B) the sorption medium in the microchannel separator 200 may be regenerated. This may be done by flowing a regenerating fluid through the process microchannels in contact with the sorption medium. The regenerating fluid may be water, nitrogen, methane, a condensable fluid, and the like. The regenerating fluid may flow from the header 204 through the process microchannels and then to the footer 206, or in the opposite direction from the footer 206 through the process microchannels to the header 204. The average sorbent temperature within the process microchannels may be in the range from about 0° C. to about 250° C., and in one embodiment about 0° C. to about 200° C., and in one embodiment about 10° C. to about 100° C., and in one embodiment about 40° C. to about 80° C., and in one embodiment about 60° C. during this regeneration step. In one embodiment, the process microchannels may be cooled at a temperature that is from about 10° C. to about 100° C., and in one embodiment about 20° C. to about 60° C. below the flush temperature used during step (II)(B). The pressure within the process microchannels during this regeneration step may range from about 0.0001 to about 100 atmospheres, and in one embodiment from about 0.01 to about 50 atmospheres, and in one embodiment from about 0.1 to about 30 atmospheres, and in on embodiment from about 1 to about 20 atmospheres, and in one embodiment about 1 to about 10 atmospheres absolute pressure. The residence time for the regenerating fluid in the process microchannels may range from about 0.1 to about 10 seconds, and in one embodiment about 1 second to about 5 seconds.

During the operation of steps (I)(A), (I)(B), (II)(A) and (II)(B) of the process illustrated in FIG. 6, the microchannel separators 100 and 200 may be cooled or heated using heat exchange microchannels, or heated using resistance heating in the same manner as described above. Referring to FIG. 6, during the operation of steps (II)(A) and (II)(B) a heat exchange fluid flows from the exchange header 208 through heat exchange microchannels to heat exchange footer 210. The heat exchange fluid may be recirculated using known techniques. The heat exchange microchannels used in the microchannel separator 200 may have the same dimensions and be made of the same materials as the heat exchange microchannels used in the microchannel separator 100.

In one embodiment, the microchannel separators 100 and 200 may be operated in a sequential manner and in combination with one or more heat exchangers to provide for heating in one of the microchannel separators and at the same time cooling in the other microchannel separator, followed by a reversal from heating to cooling or cooling to heating in the microchannel separators. For example, the inventive process may be operated as a TSA process with cooling during step (I)(A) of the inventive process in microchannel separator 100 in combination with heating during step (II)(B) of the inventive process in microchannel separator 200, followed by a reversal from cooling to heating in microchannel separator 100 to effect step (I)(B) of the inventive process and from heating to cooling in microchannel separator 200 to effect step (II)(A) of the inventive process. In this embodiment, steps (I)(A) and (II)(B) may be conducted simultaneously, and steps (I)(B) and (II)(A) may be conducted simultaneously.

Figure 7:
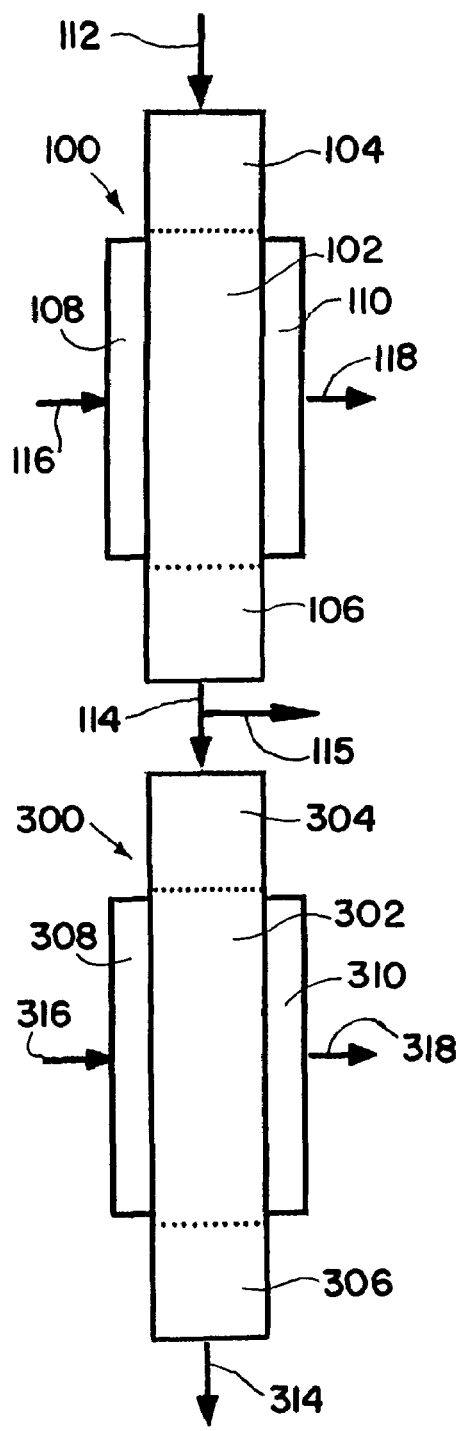
FIG. 7 is a schematic illustration of two microchannel separators which can be operated in series pursuant to the inventive process to separate methane or nitrogen from a fluid mixture comprising methane and nitrogen.

The process illustrated in FIG. 7 involves the use of two microchannel separators 100 and 300 operating in series. This arrangement allows for a sequential operation wherein steps (A) and (B) may be conducted in microchannel separator 100 to provide a first separation of the methane or nitrogen from the fluid mixture, and then repeated in microchannel separator 300 to provide a second separation to provide a more complete separation of the methane or nitrogen from the fluid mixture. Microchannel separator 100 is the same as described above with reference to FIG. 2. Microchannel separator 300 is the same as or similar in construction and operation to microchannel separator 100. Microchannel separator 300 includes microchannel separator core 302, process header 304, process footer 306, heat exchange header 308 and heat exchange footer 310. The microchannel separator core 302 contains a plurality of process microchannels and a plurality of adjacent heat exchange channels. The heat exchange channels may be microchannels. A sorption medium is contained within the process microchannels. The process microchannels and heat exchange channels may be aligned in layers, one above the other, or side by side. A fluid mixture containing methane and nitrogen flows into microchannel separator 300, as indicated by arrow 114, through process header 304 and then into the process microchannels in the microchannel separator core 302 where it contacts the sorption medium. The fluid mixture is maintained in the process microchannels in contact with the sorption medium until at least part of either the methane or the nitrogen is sorbed by the sorption medium. The non-sorbed part of the fluid mixture is then removed from the process microchannels. This may be done by internally pressurizing the system as described above. The non-sorbed parts of the fluid mixture flow through the process microchannels to and through the process footer 306 and out of the microchannel separator 300, as indicated by directional arrow 314. The temperature within the process microchannels is then changed to provide for desorption of the methane or nitrogen from the sorption medium. The methane or nitrogen is desorbed from the sorption medium. The desorbed methane or nitrogen is then removed from the process microchannels. This may be done by internally pressurizing the system as described above. The non-sorbed fluid components may be recycled through the process microchannels any number of times, for example, one, two, three, four times, etc. A heat exchange fluid flows into heat exchange header 308, as indicated by directional arrow 316, and from heat exchange header 308 through the heat exchange channels in microchannel separator core 302 to heat exchange footer 310, and out of heat exchange footer 310, as indicated by directional arrow 318.

The process illustrated in FIG. 7 involves the use of process steps (I)(A), (I)(B), (II)(A) and (II)(B). Step (I)(A) and (I)(B) may be conducted in the same manner as steps (A) and (B) described above with reference to FIG. 2. Thus, the above description of steps (A) and (B) with reference to FIG. 2 are applicable to the description of steps (I)(A) and (I)(B) with reference to FIG. 7.

At the end of step (I)(B), the desorbed methane or nitrogen flow out of the process footer 106, as indicated by arrows 114 and 115. The non-sorbed parts of the fluid mixture removed from microchannel separator 100 during step (I)(A) flow into microchannel separator 300 to commence step (II)(A) of the inventive process. In microchannel separator 300 the fluid mixture flows into header 304, the process microchannels in microchannel separator core 302 in contact with a sorption medium, and footer 308. The fluid mixture is maintained in the process microchannels at a desired temperature and pressure to permit at least part of the methane or nitrogen to be sorbed by the sorption medium. This process may be continued until a desired loading of the sorption medium by the methane or nitrogen is achieved. The desired loading level may be in the range of about 0.001 to about 1 gram of methane or nitrogen per gram of sorption medium, and in one embodiment about 0.01 to about 0.1 gram of methane or nitrogen per gram of sorption medium. At the end of this sorption step the non-sorbed parts of the fluid mixture are removed from the microchannel separator 300. This may be done by internally pressurizing the system as described above.

During the sorption part of step (II)(A) in microchannel separator 300 the average sorbent temperature within the process microchannels may be in the range from about −40° C. to about 200° C., and in one embodiment from about −40° C. to about 150° C., and in one embodiment from about 0° C. to about 200° C., and in one embodiment about 20° C. to about 60° C., and in one embodiment about 30° C. to about 50° C., and in one embodiment about 40° C. The pressure within the process microchannels during step (II)(A) may be in the range from about 0.0001 to about 100 atmospheres, and in one embodiment from about 0.01 to about 50 atmospheres, and in one embodiment from about 0.1 to about 30 atmospheres, and in on embodiment from about 1 to about 20 atmospheres, and in one embodiment about 1 to about 10 atmospheres absolute pressure. The period of time for the sorption to occur may be in the range from about 0.1 to about 10 seconds, and in one embodiment about 1 to about 5 seconds.

Step (II)(B) involves desorbing the sorbed fluid component from the sorption medium in the microchannel separator 300. This desorption step may be conducted by increasing or decreasing the average sorbent temperature within the process microchannels relative to the temperature used during the sorption part of step (II)(A). The pressure used during step (II)(B) may be the same as the pressure used during the sorption part of step (II)(A) or it may be lower or higher. In one embodiment, step (II)(B) may be conducted at a higher temperature and a lower pressure than the sorption part of step (II)(A). The temperature used in step (II)(B) may be increased by about 10° C. to about 200° C., and in one embodiment about 10° C. to about 60° C., above the temperature that is used during the sorption part of step (II)(A). Alternatively, the average sorbent temperature used in step (II)(B) may be decreased by about 10° C. to about 100° C., and in one embodiment about 20° C. to about 60° C., below the average sorbent temperature that is used during the sorption part of step (II)(A). During step (II)(B), the average sorbent temperature within the process microchannels may be in the range from about 0° C. to about 250° C., and in one embodiment about 0° C. to about 200° C., and in one embodiment about 10° C. to about 100° C., and in one embodiment about 40° C. to about 80° C., and in one embodiment about 60° C. to about 80° C. The pressure within the process microchannels during step (II)(B) may be reduced by about 0.01 to about 10 atmospheres, and in one embodiment by about 0.1 to about 1 atmosphere, below the pressure used during step (II)(A). Alternatively, the pressure within the process microchannels during step (II)(B) may be raised by about 0.1 to about 10 atmospheres, and in one embodiment about 1 to about 5 atmospheres above the pressure used during step (II)(A). The pressure during step (II)(B) may be in the range from about 0.0001 to about 100 atmospheres, and in one embodiment from about 0.01 to about 50 atmospheres, and in one embodiment from about 0.1 to about 30 atmospheres, and in on embodiment from about 1 to about 20 atmospheres, and in one embodiment about 1 to about 10 atmospheres absolute pressure. The percentage of sorbed material that is desorbed during this step (II)(B) may range from about 5% to about 100%, and in one embodiment about 10% to about 99%. The period of time for performing this desorbing step may range from about 0.1 to about 10 seconds, and in one embodiment about 1 to about 5 seconds.

During step (II)(B) the desorbed methane or nitrogen is removed from the microchannel separator 300. This may be done by internally pressurizing the system as described above. This process may be continued until a desired level of removal of the methane or nitrogen from the microchannel separator 300 is achieved.

At the end of step (II)(B) the sorption medium in the microchannel separator 300 may be regenerated. This may be done by flowing a regenerating fluid through the process microchannels in contact with the sorption medium. The regenerating fluid may be nitrogen, methane, water, carbon dioxide, a condensable fluid, and the like. The regenerating fluid may flow from the header 304 through the process microchannels and then to the footer 306, or in the opposite direction from the footer 306 through the process microchannels to the header 304. During this regeneration step the average sorbent temperature within the process microchannels may be in the range from about 0° C. to about 250° C., and in one embodiment about 0° C. to about 200° C., and in one embodiment about 10° C. to about 100° C., and in one embodiment about 40° C. to about 80° C., and in one embodiment about 60° C. In one embodiment, the regenerating temperature may be about 10° C. to about 100° C., and in one embodiment about 20° C. to about 80° C. below the flush temperature used during step (II)(B). The pressure within the process microchannels during this regeneration step may range from about 0.0001 to about 100 atmospheres, and in one embodiment from about 0.01 to about 50 atmospheres, and in one embodiment from about 0.1 to about 30 atmospheres, and in on embodiment from about 1 to about 20 atmospheres, and in one embodiment about 1 to about 10 atmospheres absolute pressure. The residence time for the regenerating fluid in the process microchannels may range from about 0.1 to about 10 seconds, and in one embodiment about 1 second to about 5 seconds.

During the operation of steps (I)(A), (I)(B), (II)(A) and (II)(B) of the process illustrated in FIG. 7, the microchannel separators 100 and 300 may be cooled or heated using heat exchange microchannels, or heated using resistance heating in the same manner as described above. Referring to FIG. 7, during the operation of steps (II)(A) and (II)(B) a heat exchange fluid flows from the exchange header 308 through heat exchange microchannels in the microchannel separator core 302 to heat exchange footer 310. The heat exchange fluid may be recirculated using known techniques. The heat exchange microchannels used in the microchannel separator core 302 may have the same dimensions and be made of the same materials as the heat exchange microchannels used in the microchannel separator core 102.

The inventive process, in one embodiment, may employ a valve assembly for controlling the flow of the fluids in the process. This is illustrated in FIGS. 52-55. The process illustrated in FIG. 52 may be used for any of the fluid separations described above, but is particularly suitable for separating nitrogen from a fluid mixture containing methane and nitrogen. For example, the process may be used in a nitrogen rejection unit (NRU) during the upgrading of sub-quality methane. The process is described below with reference to separating nitrogen from a fluid mixture containing nitrogen and methane. The valve assembly provides for rapid valve actuation and consequent rapid cycling between steps (A) and (B) of the inventive process. Microchannel separation process 600, which is in the form of a TSA process, employs the use of a first microchannel separator 610, a second microchannel separator 620, a hot heat exchange fluid source 630, a cold heat exchange fluid source 640, and valve assembly 650. The valve assembly 650, which may be referred to as a valve block assembly, comprises motor 652, shaft 654, feed input valve block 660, first microchannel separator product output valve block 662, second microchannel separator product output valve block 664, hot heat exchange fluid input valve block 666, and cold heat exchange fluid input valve block 668. Each of the valve blocks 660, 662, 664, 666 and 668 comprises a valve pair or pair of valves which open and close sequentially. The opening and closing of the valve pairs in the valve blocks 660, 662, 664, 666 and 668 is effected by the rotating movement of shaft 654.

The shaft 654 may comprise a common shaft or a coupled shaft for the separate valve blocks 660, 662, 664, 666 and 668. Holes, for example drilled holes, in the shaft 654 and a common drive motor 652 are used to provide synchronized opening and closing of the valve pairs. Valve reliability may be enhanced relative to conventional valves with actuators since valve actuation is accomplished via a continuous rotary motion rather than a reversing motion. Valve actuation speed is a function of the shaft rotational speed. For example, an 1800 revolutions per minute (RPM) shaft speed, the standard output for most AC motors, translates into 30 revolutions or 60 full open to full open cycles per second. Thus, for a 16.6 ms cycle, the valves would be open for 8.3 ms and closed for 8.3 ms. The rotational speed of the shaft may be reduced, for example, by using a gear reducer. The holes in the shaft may have geometries that are other than circular to facilitate faster opening and shut-off and to vary the "open" and "close" durations. For example, the major and minor dimension for an ellipse may be manipulated to improve the valves ability to go from no flow to full flow faster, and vice versa. Various flow rates may be accomplished by varying the shaft diameter within each valve block, maintaining the same shaft centerline, and/or introducing mating coupling between the valve blocks. The internal clearances may be wetted and the valve blocks and shaft may utilize mechanical seals to prevent leaks at the shaft to block to outside interface.

The valve blocks 660, 662, 664, 666 and 668 are schematically illustrated in FIGS. 53 and 54. For convenience of this discussion, the valve blocks identified in FIGS. 53 and 54 are labeled as valve blocks 700 and 700A. Each of the valve blocks 700 and 700A has an inlet port 702 and a pair of outlet ports 704 and 706. Shaft 654 extends through each of the valve blocks 700 and 700A and separates the inlet port 702 from the outlet ports 704 and 706. For each of the valve blocks 700 and 700A, shaft 654 has holes 708 and 710. These are schematically illustrated in FIGS. 53(a), (b) and (c) and FIGS. 54(a), (b) and (c). FIGS. 53(b) and (c), and FIGS. 54(b) and (c) are schematic illustrations of cross sections of the shaft 654 showing the relative positions of the holes 708 and 710. The holes 708 and 710 project through the shaft 654 at right angles relative to each other so that when one of the holes is in the "open" position the other is in the "closed" position. This is illustrated in FIG. 53(a) wherein hole 708 is in an open position and hole 710 is in a closed position. Thus, fluid flowing through the valve block 700 flows into inlet port 702, through hole 708 and out through outlet port 704. Similarly, in FIG. 54(a) hole 710 is in an open position and hole 708 is in a closed position. Thus, fluid flowing through the valve block 700A flows into inlet port 702, through hole 710 and out through outlet port 706.

FIGS. 55(a) and (b) illustrate alternate embodiments of the holes 708 and 710. In FIGS. 55(a) and (b), holes 708A and 710A have geometries that converge from a maximum diameter at the surface of the shaft 654 to a minimum diameter at the center of the shaft. By alternating the geometries or the holes in the shaft, the opening and closing rates can be altered. The 0°, 90°, 180° and 270° in FIGS. 55(a) and (b) represent the synchronization of the holes within a valve block as the shafts rotate.

Similar functionality may be accomplished by synchronizing multiple motorized or mechanically linked ball valves with special drillings so that they rotate continuously in on direction. Another alternate method to achieve fast actuation times with high reliability would be to use a common cam shaft to open and close the valves sequentially.

Figure 52:
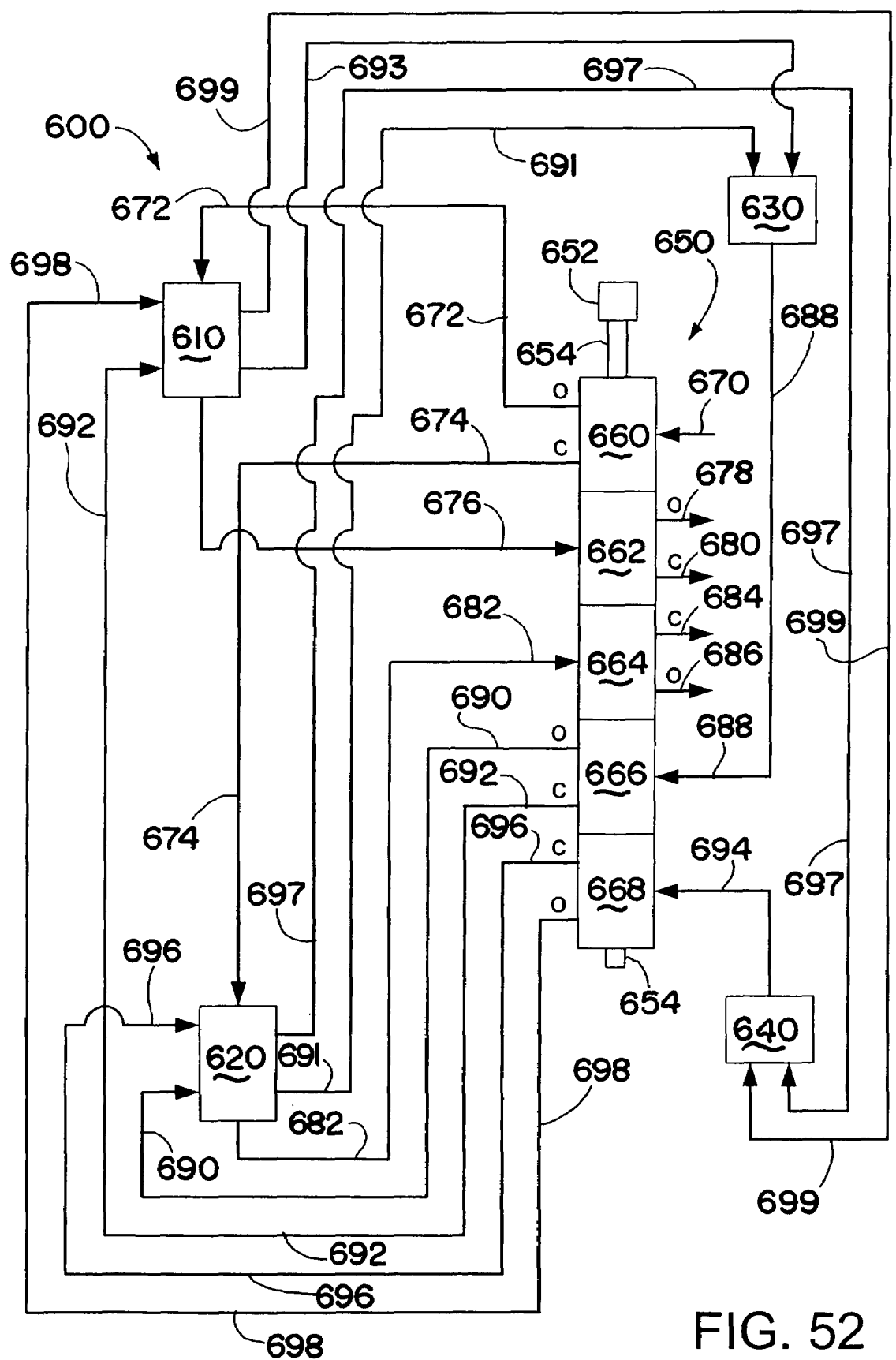
FIG. 52 is a schematic illustration of a process for separating a first fluid (e.g., nitrogen) from a mixture of fluids comprising the first fluid (e.g., mixture of nitrogen and methane) employing two microchannel separators and a valve assembly for controlling the flow of fluids in the process.

Referring to FIG. 52, feed input valve 660 controls the input of the fluid mixture being treated (e.g., fluid mixture containing nitrogen and methane) and provides for the flow of the feed input to the first microchannel separator 610 through line 672 and the flow of the feed input to the second microchannel separator 620 through line 674, in alternating sequence. First microchannel separator product output valve 662 controls the output of product (e.g., separated nitrogen or separated methane) from first microchannel separator 610 and provides for the flow of such product through lines 678 (e.g., separated nitrogen) or line 680 (e.g., separated methane), in alternating sequence. The product stream containing the separated nitrogen may be referred to as a tail gas stream. Second microchannel separator product output valve 664 controls the output of product (e.g., separated methane or separated nitrogen) from second microchannel separator 620 and provides for the flow of such product through line 684 (e.g., separated nitrogen) or line 686 (e.g., separated methane), in alternating sequence.

Hot (for example, from about 55° C. to about 80° C., and in one embodiment about 60° C.) heat exchange fluid flows from hot heat exchange fluid source 630 through line 688 to hot heat exchange fluid input valve 666. The hot heat exchange fluid flows through valve 666 and from valve 666 through line 690 to second microchannel separator 620 or through line 692 to first microchannel separator 610, in alternating sequence. The hot heat exchange fluid flows from line 690 through heat exchange channels in second microchannel separator 620 and then returns to hot heat exchange fluid source 630 through line 691. Hot heat exchange fluid flows from line 692 through heat exchange channels in first microchannel separator 610 and then returns to hot heat exchange fluid source 630 through line 693.

Cold (for example, from about 20° C. to about 45° C., and in one embodiment about 40° C.) heat exchange fluid flows from cold heat exchange fluid source 640 through line 694 to cold heat exchange fluid input valve 668. The cold heat exchange fluid flows through valve 668, and from valve 668 through line 696 to second microchannel separator 620 or through line 698 to first microchannel separator 610, in alternating sequence. The cold heat exchange fluid flows through heat exchange channels in second microchannel separator 620 and then back to cold heat exchange fluid source 640 through line 697. Cold heat exchange fluid flows from line 698 through heat exchange channels in first microchannel separator 610 and then returns to cold heat exchange fluid source 640 through line 699.

The process illustrated in FIG. 52 involves the use of process steps (A) and (B) as described above. In operation, the valves 660, 662, 664, 666 and 668 are set at a first position by rotating the shaft 654 using motor 652. The valve settings for the first position are as follows (these are shown in FIG. 52):

Valve 660: open (o) to line 672 and closed (c) to line 674
Valve 662: open (o) to line 678 and closed (c) to line 680
Valve 664: closed (c) to line 684 and open (o) to line 686
Valve 666: open (o) to line 690 and closed (c) to line 692
Valve 668: closed (c) to line 696 and open (o) to line 698

While in this first position, the first microchannel separator 610 is operated at a "cold" average sorbent temperature temperature, for example, from about 20° C. to about 45° C., and in one embodiment about 40° C., and the second microchannel separator 620 is operated at a "hot" average sorbent temperature temperature, for example, from about 55° C. to about 80, and in one embodiment about 60° C. Step (A) is conducted in the first microchannel separator 610 at the cold temperature, and step (B) is conducted in the second microchannel separator 620 at the hot temperature. During step (A) the fluid mixture containing nitrogen and methane flows from line 670 through valve 660 to and through line 672 to first microchannel separator 610. In the first microchannel separator 610 the methane is preferentially sorbed on the sorption medium in the microchannel separator, and the nitrogen is separated from the methane and flows out of the first microchannel separator 610 through line 676 to valve 662 and from valve 662 through line 678 out of the system. The removal of the nitrogen from the first microchannel separator 610 may be effected by applying a pressure differential across the process microchannels in the first microchannel separator 610 or by flowing a purging fluid through the process microchannels using additional valves in the valve block assembly 650 (not shown in the drawings). At the same time, process step (B) is conducted in second microchannel separator 620. During process step (B) the methane is desorbed from the sorption medium and flows out of the second microchannel separator 620 through line 682 to valve 664 and through valve 664 to line 686 and out of the system. Cold heat exchange fluid flows from cold heat exchange fluid source 640 through line 694 to valve 668, through valve 668 to line 698, through line 698 to heat exchange channels in first microchannel separator 610, through the heat exchange channels to line 699, and through line 699 back to cold heat exchange fluid source 640. Hot heat exchange fluid flows from hot heat exchange fluid source 630 through line 688 to valve 666, through valve 666 to line 690, through line 690 to heat exchange channels in second microchannel separator 620, through the heat exchange channels to line 691, and through line 691 back to hot heat exchange fluid source 630.

Upon the completion of process step (A) in first microchannel separator 610 and process step (B) in second microchannel separator 620, the shaft 654 in the valve block assembly 650 is rotated to a second position by motor 652 and the valve settings for the valves 660, 662, 664, 666 and 668 are simultaneously changed to the following:

Valve 660: closed (c) to line 672 and open (c) to line 674
Valve 662: closed (c) to line 678 and open (o) to line 680
Valve 664: open (o) to line 684 and closed (c) to line 686
Valve 666: closed (c) to line 690 and open (o) to line 692
Valve 668: open (o) to line 696 and closed (c) to line 698

While in this second position the first microchannel separator 610 is operated at a "hot" average sorbent temperature temperature, for example, from about 55° C. to about 80° C., and in one embodiment about 60° C., and the second microchannel separator 620 is operated at a "cold" average sorbent temperature temperature, for example, from about 20° C. to about 45° C., and in one embodiment about 40° C. Step (A) is conducted in the second microchannel separator 620 at the cold temperature, and step (B) is conducted in the first microchannel separator 610 at the hot temperature. During step (A) the fluid mixture containing nitrogen and methane flows from line 670 through valve 660 to and through line 674 to second microchannel separator 620. In the second microchannel separator 620 the methane is preferentially sorbed on the sorption medium in the microchannel separator, and the nitrogen is separated from the methane and flows out of the second microchannel separator 620 through line 682 to valve 664 and from valve 664 through line 684 out of the system. The removal of the nitrogen from the second microchannel separator 620 may be effected by applying a pressure differential across the process microchannels in the second microchannel separator 620 or by flowing a purging fluid through the process microchannels using additional valves in the valve block assembly 650 (not shown in the drawings). At the same time, process step (B) is conducted in first microchannel separator 610. During process step (B) the methane is desorbed from the sorption medium and flows out of the first microchannel separator 610 through line 676 to valve 662 and through valve 662 to line 680 and out of the system. Cold heat exchange fluid flows from cold heat exchange fluid source 640 through line 694 to valve 668, through valve 668 to line 696, through line 696 to heat exchange channels in second microchannel separator 620, through the heat exchange channels to line 697, and through line 697 back to cold heat exchange fluid source 640. Hot heat exchange fluid flows from hot heat exchange fluid source 630 through line 688 to valve 666, through valve 666 to line 692, through line 692 to heat exchange channels in first microchannel separator 610, through the heat exchange channels to line 693, and through line 693 back to hot heat exchange fluid source 630.

Figure 56:
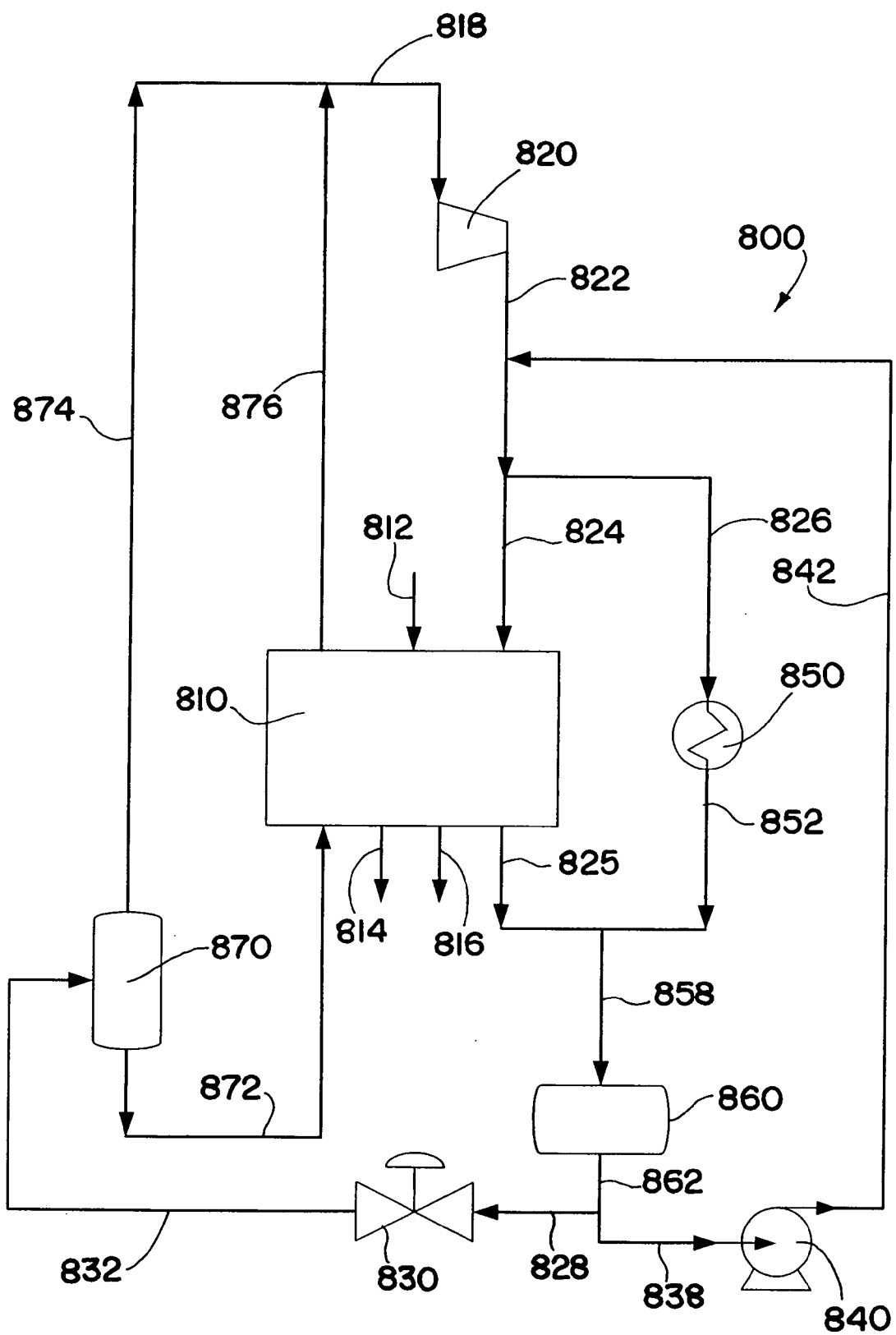
FIG. 56 is a schematic illustration of one embodiment of the inventive process wherein an expansion-compression cycle is used for cooling and heating the heat exchange fluid used to cool and heat the fluids and sorption medium in the microchannel separator during steps (A) and (B) of the inventive process.
Figure 57:
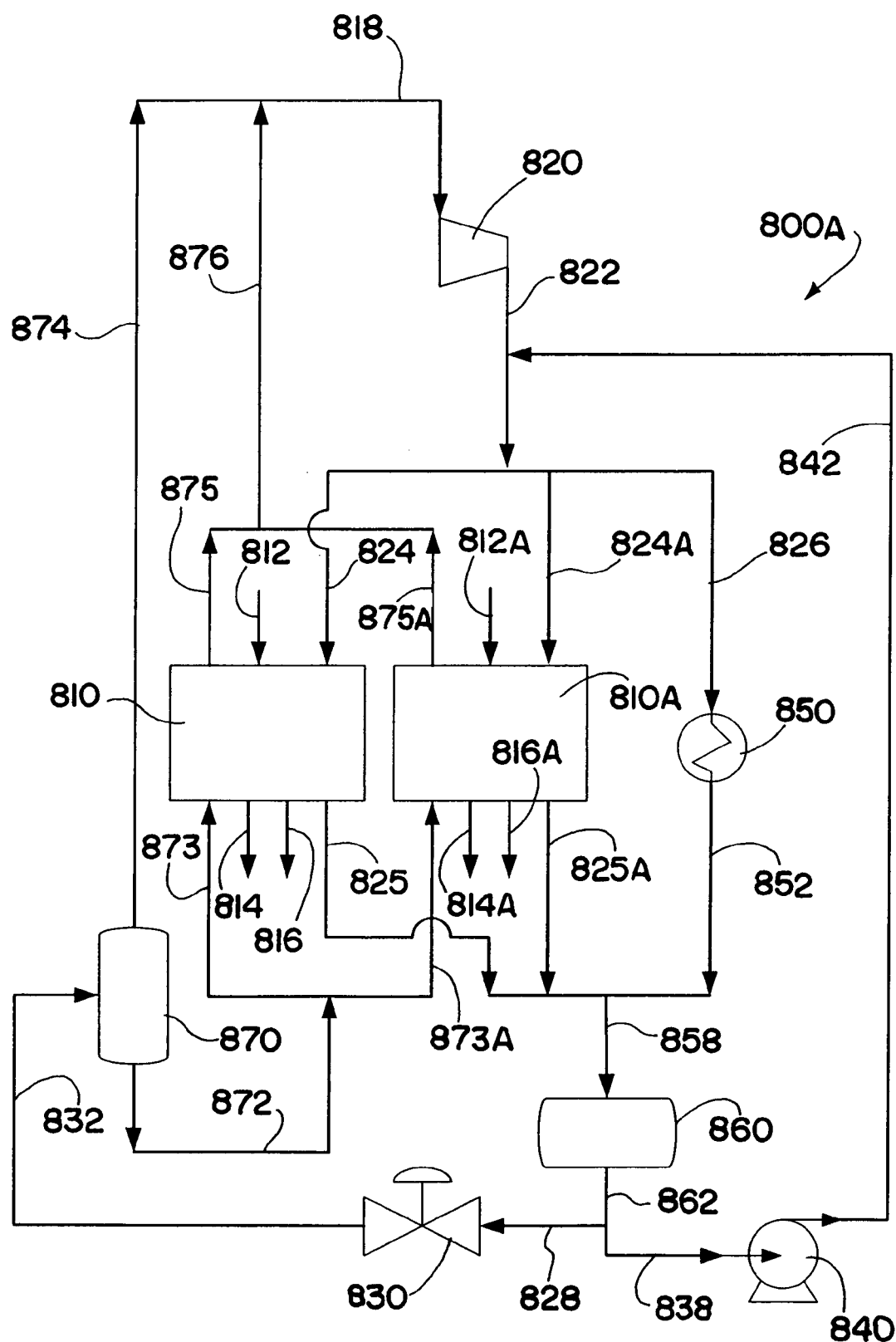
FIG. 57 is a schematic illustration of an alternate embodiment of the process illustrated in FIG. 56 wherein two microchannel separators are employed and an expansion-compression cycle is used for cooling and heating the heat exchange fluid used to cool and heat the fluids and sorption medium in the microchannel separators during steps (A) and (B) of the inventive process, the two microchannel separators being operated in sequence wherein step (A) of the inventive process is conducted in a first microchannel separator while step (B) of the inventive process is simultaneously conducted in a second microchannel separator, then step (B) is conducted in the first microchannel separator while step (A) is conducted in the second microchannel separator.

The inventive process, in one embodiment, may employ an expansion-compression cycle for cooling and heating the heat exchange fluid used to cool and heat the process fluids and sorption medium in the microchannel separator during steps (A) and (B) of the inventive process. This is illustrated in FIGS. 56 and 57. The processes illustrated in FIGS. 56 and 57 may be used for any of the fluid separations described above, but are particularly suitable for separating nitrogen from a fluid mixture containing nitrogen and methane. For example, the process may be used in a nitrogen rejection unit during the upgrading of sub-quality methane. The process is described below with reference to separating nitrogen from a fluid mixture containing nitrogen and methane wherein the methane is sorbed by the sorption medium during step (A) and desorbed during step (B). Alternatively, the nitrogen may be sorbed during step (A) and desorbed during step (B).

Referring initially to FIG. 56, microchannel separation process 800, which is in the form of a TSA process, employs the use of microchannel separator 810, compressor 820, expansion device 830, pump 840, cooler 850, holding drum 860 and flash drum 870. In operation, the microchannel separator 810 may be operated as described above. That is, a fluid mixture containing nitrogen and methane flows into the microchannel separator 810 as indicated by arrow 812. In the microchannel separator 810, the fluid mixture flows into process microchannels which contain a sorption medium. The process fluids in the process microchannels and the sorption medium are cooled during step (A) of the inventive process. At least part of the methane in the fluid mixture is sorbed by the sorption medium. Non-sorbed p,arts of the fluid mixture flow out of the microchannel separator 810 as indicated by arrow 814. The microchannel separator 810 is then heated during step (B) of the inventive process. Methane, which had sorbed on the sorption medium during step (A), is desorbed from the sorption medium and flows out of the microchannel separator 810 as indicated by arrow 816. The time required to complete steps (A) and (B) may be in the range from about 0.1 to about 20 seconds, and in one embodiment from about 2 to about 15 seconds, and in one embodiment from about 2 to about 10 seconds.

The expansion-compression cycle for cooling and heating the heat exchange fluid during steps (A) and (B) of the process as illustrated in FIG. 56 involves flowing the heat exchange fluid from line 828 through expansion device 830. Expansion device 830 may comprise one or a series of expansion valves, one or a series of flash vessels, or a combination of the foregoing. While flowing through the expansion device 830, the heat exchange fluid undergoes a pressure drop resulting in a cooling of the heat exchange fluid. The heat exchange fluid exiting the expansion device 830 may be in the form of a mixture of vapor and liquid. The heat exchange fluid flows from expansion device 830 through line 832 to flash drum 870. In flash drum 870 liquid heat exchange fluid is separated from vapor heat exchange fluid. The vapor heat exchange fluid flows from flash drum 870 through line 874 to line 818 and through line 818 to compressor 820. The liquid heat exchange fluid flows from flash drum 870 through line 872 to microchannel separator 810. In microchannel separator 810 the heat exchange fluid flows through heat exchange channels that are in thermal contact with the sorption medium and process fluids in microchannel separator 810. The heat exchange fluid provides cooling for the sorption medium and fluids in microchannel separator 810. This cooling is used to conduct step (A) of the inventive process. In the heat exchange channels at least part, and in one embodiment all, of the heat exchange fluid vaporizes or boils. This results in added cooling for the sorption medium and process fluids in the microchannel separator 810. Vaporized heat exchange fluid flows out of the microchannel separator 810 through line 876 to line 818 and from line 818 to compressor 820. In compressor 820 the vaporized heat exchange fluid is compressed to form a heated vaporized heat exchange fluid. The heated vaporized heat exchange fluid flows from compressor 820 through lines 822 and 824 to microchannel separator 810. The heated vaporized heat exchange fluid flows through heat exchange channels in microchannel separator 810 which are in thermal contact with the sorption medium and process fluids in microchannel separator 810. The flow of the heated vaporized heat exchange fluid in the heat exchange channels provides heating for the sorption medium and fluids in microchannel separator 810. This heating is used to conduct step (B) of the inventive process. While in the heat exchange channels, the heated vaporized heat exchange fluid condenses at least partially, and in one embodiment it fully condenses. The condensation of the heated vaporized heat exchange fluid in the heat exchange channels provides additional heating for the sorption medium and process fluids being treated in the microchannel separator 810. The heat exchange fluid flows out of the heat exchange channels and out of the microchannel separator 810 as indicated by line 825. The heat exchange fluid flows through line 825 to line 858 and from line 858 to holding drum 860. Part of the compressed heat exchange fluid flowing out of compressor 820 may flow through bypass line 826 to cooler 850, and from cooler 850 through lines 852 and 858 to holding drum 860. The bypass lines 826 and 852 and the cooler 850 may be used to control the amount of vaporized heat exchange fluid flowing through the microchannel separator during step (B) of the inventive process. The heat exchange fluid in holding drum 860 may be at the bubble point of the heat exchange fluid. Vapor from the holding tank 860 may flow through line 862 to line 838 and from line 838 to pump 840. The vapor may flow from pump 840 through line 842 back to line 822 where it is combined with the output from compressor 820. Liquid heat exchange fluid may flow from holding drum 860 through line 862 to line 828, and from line 828 through expansion device 830 where the expansion-compression cycle starts all over again. In this embodiment, the cold heat exchange fluid flows through the heat exchange channels during step (A), while the flow of the hot heat exchange fluid to the microchannel separator 810 is stopped. Similarly, the hot heat exchange fluid flows through the heat exchange channels during step (B), while the flow of the cold heat exchange fluid to the microchannel separator 810 is stopped.

The microchannel separation process 800A illustrated in FIG. 57 is the same as the microchannel separation process 800 illustrated in FIG. 56 with the exception that microchannel separation process 800A employs the use of two microchannel separators, namely, microchannel separators 810 and 810A, rather than one microchannel separator. Microchannel separators 810 and 810A may be operated in alternating sequence. That is, step (A) of the inventive process may be conducted in microchannel separator 810 while step (B) of the inventive process is simultaneously conducted in microchannel separator 810A. Then, step (B) of the inventive process may be conducted in microchannel separator 810 while step (A) of the inventive process is conducted in microchannel separator 810A.

Referring to FIG. 57, microchannel separation process 800A, which is in the form of a TSA process, employs the use of microchannel separators 810 and 810A, compressor 820, expansion device 830, pump 840, cooler 850, holding drum 860 and flash drum 870. In operation, the microchannel separator 810 may be operated as described above wherein part of a fluid mixture containing nitrogen and methane flows into the microchannel separator 810 as indicated by arrow 812. In the microchannel separator 810, the fluid mixture flows into process microchannels which contain a sorption medium. The process fluid in the process microchannels and the sorption medium are cooled during step (A) of the inventive process. At least part of the methane in the fluid mixture is sorbed by the sorption medium. Non-sorbed parts of the fluid mixture flow out of the microchannel separator 810 as indicated by arrow 814. The microchannel separator 810 is then heated during step (B) of the inventive process. Methane, which had sorbed on the sorption medium during step (A), is desorbed from the sorption medium and flows out of the microchannel separator 810 as indicated by arrow 816. Similarly, with microchannel separator 810A, part of the fluid mixture containing nitrogen and methane flows into the microchannel separator 810A as indicated by arrow 812A. In the microchannel separator 810A, the fluid mixture flows into process microchannels which contain a sorption medium. The process fluid in the process microchannels and the sorption medium are cooled during step (A) of the inventive process. At least part of the methane in the fluid mixture is sorbed by the sorption medium. Non-sorbed parts of the fluid mixture flow out of the microchannel separator 810A as indicated by arrow 814A. The microchannel separator 810A is then heated during step (B) of the inventive process. Methane, which had sorbed on the sorption medium during step (A), is desorbed from the sorption medium and flows out of the microchannel separator 810A as indicated by arrow 816A. Step (A) of the inventive process may be conducted in microchannel separator 810 while step (B) of the inventive process is conducted in microchannel separator 810A. Similarly, step (B) may be conducted in microchannel separator 810 while step (A) is conducted in microchannel separator 810A.

The expansion-compression cycle illustrated in FIG. 57 for cooling and heating the heat exchange fluid during steps (A) and (B) will be described initially for the part of the process where step (A) of the inventive process is conducted in microchannel separator 810 and step (B) is simultaneously conducted in microchannel separator 810A. The process involves flowing the heat exchange fluid from line 828 through expansion device 830. Expansion device 830 may be of any of the designs described above. While flowing through the expansion device 830, the heat exchange fluid undergoes a pressure drop resulting in a cooling of the heat exchange fluid. The heat exchange fluid exiting the expansion device 830 may be in the form of a mixture of vapor and liquid. The heat exchange fluid flows from expansion device 830 through line 832 to flash drum 870. In flash drum 870 liquid heat exchange fluid is separated from vapor heat exchange fluid. The vapor heat exchange fluid flows from flash drum 870 through line 874 to line 818 and through line 818 to compressor 820. The liquid heat exchange fluid flows from flash drum 870 through line 872 to line 873 and from line 873 to microchannel separator 810. In microchannel separator 810 the heat exchange fluid flows through heat exchange channels that are in thermal contact with the sorption medium and process fluids in microchannel separator 810. The heat exchange fluid provides cooling of the sorption medium and fluids in microchannel separator 810 sufficient to provide for step (A) of the inventive process. In the heat exchange channels at least part, and in one embodiment all, of the heat exchange fluid vaporizes or boils. This results in added cooling for the sorption medium and process fluids in the microchannel separator 810. Vaporized heat exchange fluid flows out of the microchannel separator 810 through line 875 to line 876, and from line 876 to line 818, and from line 818 to compressor 820. In compressor 820 the vaporized heat exchange fluid is compressed to form a heated vaporized heat exchange fluid. At the same time, heated vaporized heat exchange fluid flows from compressor 820 through lines 822 and 824A to microchannel separator 810A. The heated vaporized heat exchange fluid flows through heat exchange channels in microchannel separator 810A which are in thermal contact with the sorption medium and process fluids in microchannel separator 810A. The flow of the heated vaporized heat exchange fluid in the heat exchange channels provides heating for the sorption medium and fluids in microchannel separator 810A to provide for step (B) of the inventive process. While in the heat exchange channels, the heated vaporized heat exchange fluid condenses at least partially, and in one embodiment it fully condenses. The condensation of the heated vaporized heat exchange fluid in the heat exchange channels provides additional heating for the sorption medium and process fluids being treated in the microchannel separator 810A. The heat exchange fluid flows out of the heat exchange channels and out of the microchannel separator 810A as indicated by line 825A. The heat exchange fluid flows through line 825A to line 858 and from line 858 to holding drum 860. Part of the compressed heat exchange fluid flowing out of compressor 820 may flow through bypass line 826 to cooler 850, and from cooler 850 through lines 852 and 858 to holding drum 860. The bypass lines 826 and 852 and the cooler 850 may be used to control the amount of vaporized heat exchange fluid flowing through the microchannel separator 810A, during step (B) of the inventive process. The heat exchange fluid in holding drum 860 may be at the bubble point of the heat exchange fluid. Vapor from the holding tank 860 may flow through line 862 to line 838 and from line 838 to pump 840. The vapor may flow from pump 840 through line 842 back to line 822 where it is combined with the output from compressor 820. Liquid heat exchange fluid may flow from holding drum 860 through line 862 to line 828, and from line 828 through expansion device 830 where the expansion-compression cycle starts for the next phase of the process.

Upon completion of step (A) in microchannel separator 810 and step (B) in microchannel separator 810A, the process is reversed to provide for step (B) in microchannel separator 810 and step (A) in microchannel separator 810A. Heat exchange fluid from line 828 flows through expansion device 830. While flowing through the expansion device 830, the heat exchange fluid undergoes a pressure drop resulting in a cooling of the heat exchange fluid. The heat exchange fluid exiting the expansion device 30 may be in the form of a mixture of vapor and liquid. The heat exchange fluid flows from expansion device 830 through line 832 to flash drum 870. In flash drum 870 liquid heat exchange fluid is separated from vapor heat exchange fluid. The vapor heat exchange fluid flows from flash drum 870 through line 874 to line 818 and through line 818 to compressor 820. The liquid heat exchange fluid flows from flash drum 870 through line 872 to line 873A and from line 873A to microchannel separator 810A. In microchannel separator 810A the heat exchange fluid flows through heat exchange channels that are in thermal contact with the sorption medium and process fluids in microchannel separator 810A. The heat exchange fluid provides cooling of the sorption medium and fluids in microchannel separator 810A to provide for step (A) of the inventive process. In the heat exchange channels at least part, and in one embodiment all, of the heat exchange fluid vaporizes or boils. This results in added cooling for the sorption medium and process fluids in the microchannel separator 810A. Vaporized heat exchange fluid flows out of the microchannel separator 810A through line 875A and from line 875A to line 876, then through line 876, and from line 876 to line 818 and from line 818 to compressor 820. In compressor 820 the vaporized heat exchange fluid is compressed to form a heated vaporized heat exchange fluid. At the same time, heated vaporized heat exchange fluid flows from compressor 820 through lines 822 and 824 to microchannel separator 810. The heated vaporized heat exchange fluid flows through heat exchange channels in microchannel separator 810 which are in thermal contact with the sorption medium and process fluids in microchannel separator 810. The flow of the heated vaporized heat exchange fluid in the heat exchange channels provides heating for the sorption medium and fluids in microchannel separator 810A to provide for step (B) of the inventive process. While in the heat exchange channels, the heated vaporized heat exchange fluid condenses at least partially, and in one embodiment it fully condenses. The condensation of the heated vaporized heat exchange fluid in the heat exchange channels provides additional heating for the sorption medium and process fluids being treated in the microchannel separator 810. The heat exchange fluid flows out of the heat exchange channels and out of the microchannel separator 810 as indicated by line 825. The heat exchange fluid flows through line 825 to line 858 and from line 858 to holding drum 860. Part of the compressed heat exchange fluid flowing out of compressor 820 may flow through bypass line 826 to cooler 850, and from cooler 850 through lines 852 and 858 to holding drum 860. The bypass lines 826 and 852 and the cooler 850 may be used to control the amount of vaporized heat exchange fluid flowing through the microchannel separator 810, during step (B) of the inventive process. The heat exchange fluid in holding drum 860 may be at the bubble point of the heat exchange fluid. Vapor from the holding tank 860 may flow through line 862 to line 838 and from line 838 to pump 840. The vapor may flow from pump 840 through line 842 back to line 822 where it is combined with the output from compressor 820. Liquid heat exchange fluid may flow from holding drum 860 through line 862 to line 828, and from line 828 through expansion device 830 where the expansion-compression cycle starts over again.

The heat exchange fluid that may be used in the expansion-compression cycles employed in the microchannel separation processes 800 and 800A illustrated in FIGS. 56 and 57 may comprise any heat exchange fluid or refrigerant suitable for use in a vapor compression refrigeration system. These may include nitrogen, ammonia, carbon dioxide, organic compounds containing 1 to about 5 carbon atoms per molecule such as methylenechloride, the fluoro-chloro-methanes (e.g., dichlordiflouromethane), hydrocarbons containing 1 to about 5 carbon atoms per molecule (e.g., methane, ethane, ethylene, propanes, butanes, pentanes, etc.), or a mixture of two or more thereof.

Figure 58:
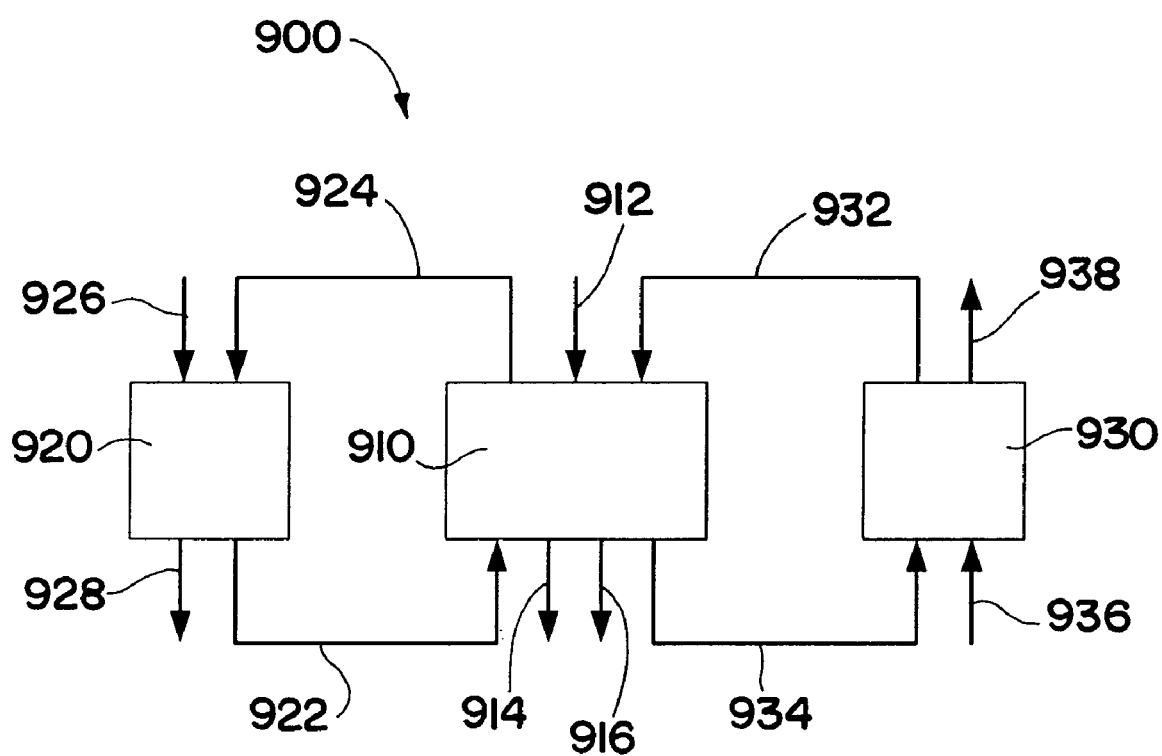
FIG. 58 is a schematic illustration of one embodiment of the invention wherein the microchannel separator is cooled during step (A) of the inventive process using a first heat exchanger and heated during step (B) using a second heat exchanger.

The inventive process, in one embodiment, may employ separate heat exchangers for heating and cooling heat exchange fluid used to cool and heat the process fluids and sorption medium in the microchannel separator during steps (A) and (B) of the inventive process. This is illustrated in FIG. 58. Referring to FIG. 58, microchannel separation process 900, which is in the form of a TSA process, employs the use of microchannel separator 910 and heat exchangers 920 and 930. Either or both of the heat exchangers 920 and 930 may be microchannel heat exchangers. The heat exchange fluid used with each heat exchanger may be the same or it may be different. The process may be used for any separation process. It is described herein with respect to separating nitrogen from a fluid mixture comprising nitrogen and methane. In operation, microchannel separator 910 may be operated as described above. That is, a fluid mixture containing nitrogen and methane flows into the microchannel separator 910, as indicated by arrow 912. In the microchannel separator 910, the fluid mixture flows into process microchannels which contain a sorption medium. The process fluids in the process microchannels and the sorption medium are cooled during step (A) of the inventive process. At least part of the methane in the fluid mixture is sorbed by the sorption medium. Non-sorbed parts of the fluid mixture flow out of the microchannel separator 910 as indicated by arrow 914. The microchannel separator 910 is then heated during step (B). Methane, which had sorbed on the sorption medium during step (A) is desorbed from the sorption medium and flows out of the microchannel separator 910 as indicated by arrow 916. The time required to complete steps (A) and (B) may be in the range from about 0.1 to about 20 seconds, and in one embodiment from about 2 to about 15 seconds, and in one embodiment from about 2 to about 10 seconds.

During the cooling step (A), a cooled heat exchange fluid flows from heat exchanger 920 through line 922 to microchannel separator 910. In the microchannel separator 910, the heat exchange fluid flows through heat exchange channels that are in thermal contact with the sorption medium and process fluids in the microchannel separator. The heat exchange fluid provides cooling for the sorption medium and fluids in the microchannel separator. This cooling is used to conduct step (A) of the inventive process. In the heat exchange channels in microchannel separator 910 the heat exchange fluid may be heated and/or partially or completely vaporized. Any vaporization provides added cooling for the sorption medium and process fluids in the microchannel separator 910. The heat exchange fluid flows out of the microchannel separator 910 through line 924 back to heat exchanger 920. In the heat exchanger 920, the heat exchange fluid is cooled by heat exchange fluid flowing through heat exchanger 920 as indicated by arrows 926 and 928. The heat exchange fluid flowing through lines 926 and 928 may be any of the heat exchange fluids discussed above. In one embodiment, the heat exchange fluid flowing through heat exchanger 920 from line 926 to line 928 may undergo an endothermic chemical reaction in the heat exchanger 920. This may enhance the cooling of the heat exchange fluid used to cool microchannel separator 910. Examples of endothermic reactions that may be conducted in heat exchanger 920 include steam reforming reactions and dehydrogenation reactions.

During the heating step (B), a heated heat exchange fluid flows from heat exchanger 930 through line 932 to microchannel separator 910. In the microchannel separator 910, the heat exchange fluid flows through heat exchange channels that are in thermal contact with the sorption medium and process fluids in the microchannel separator. The heat exchange fluid provides heating for the sorption medium and fluids in the microchannel separator. This heating is used to conduct step (B) of the inventive process. In the heat exchange channels in microchannel separator 910 the heat exchange fluid may be cooled and/or partially or completely condensed. Any condensation provides added heating for the sorption medium and process fluids in the microchannel separator 910. The heat exchange fluid flows out of the microchannel separator 910 through line 932 back to heat exchanger 930. In the heat exchanger 930, the heat exchange fluid is heated by heat exchange fluid flowing through heat exchanger 930 as indicated by arrows 936 and 938. The heat exchange fluid flowing through lines 936 and 938 may be any of the heat exchange fluids discussed above. In one embodiment, the heat exchange fluid flowing through heat exchanger 920 from line 936 to line 938 may undergo an exothermic chemical reaction in the heat exchanger 920. This may enhance the heating of the heat exchange fluid used to heat microchannel separator 910. Examples of exothermic reactions that may be conducted in heat exchanger 930 include water-gas shift reactions, methanol synthesis reactions, and ammonia synthesis reactions.

The sorption medium used in the microchannel separator may have any size and geometric configuration that fits within the process microchannels. The sorption medium may be in the form of particulate solids (e.g., pellets, powder, fibers, and the like) having a median particle diameter of about 1 to about 1000 µm, and in one embodiment about 10 to about 500 µm, and in one embodiment about 25 to about 250 µm. The sorption medium may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The support structure may have a honeycomb construction. The support structure may be the sorbent itself, as in the case of a porous carbon foam. The support structure may also provide mechanical strength for the process microchannel.

The support structure may comprise silica gel, foamed copper, sintered stainless steel fiber, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof.

The sorption medium may be directly washcoated on the interior walls of the process microchannels or onto a support structure. The walls of the process microchannels may have additional features in the form of grooves, indentations, raised bumps, and the like., which may be continuous or discontinuous, to increase the thickness and uniformity of the washcoated sorption medium. The sorption medium may be in the form of a single piece of porous contiguous material, or many pieces in physical contact. In one embodiment, the sorption medium is comprised of a contiguous material and has a contiguous porosity such that molecules can diffuse through the sorption medium. In this embodiment, the fluids flow through the sorption medium rather than around it. In one embodiment, the cross-sectional area of the sorption medium occupies about 1 to about 99%, and in one embodiment about 10 to about 95% of the cross-sectional area of the process microchannels. The sorption medium may have a surface area, as measured by BET, of greater than about 1 $m^2/g$, and in one embodiment greater than about 10 $m^2/g$. In one embodiment, the sorption medium may have a surface area that exceeds about 100 $m^2/g$. In one embodiment, the surface area may exceed about 1000 $m^2/g$.

Figure 8:
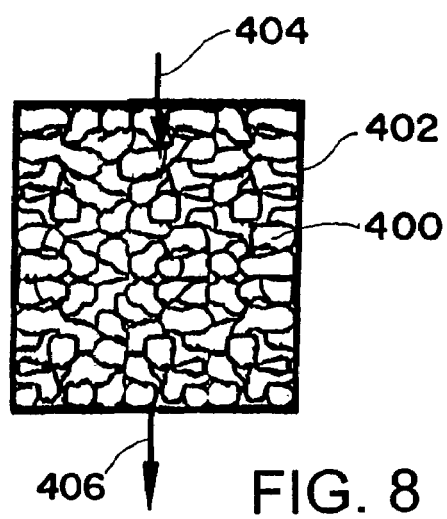
FIG. 8 is a schematic illustration of a cross-sectional view of a process microchannel used with the inventive process, the process microchannel containing a sorption medium having a packed bed configuration.

The sorption medium may be in the form of a packed bed of particulate solids. An example of such a packed bed is illustrated in FIG. 8. In FIG. 8, sorption medium 400, which is in the form of a packed bed of particulate solids, is contained within process microchannel 402. Fluid flows through the packed bed of particulate solids as indicated by arrows 404 and 406.

Figure 9:
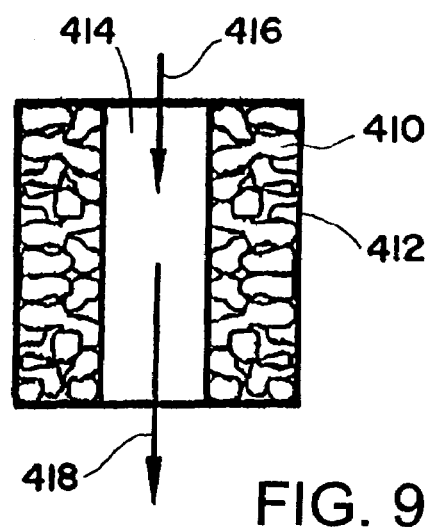
FIG. 9 is a schematic illustration of a cross-sectional view of a process microchannel used with the inventive process, the process microchannel containing a sorption medium having a flow-by configuration.

The sorption medium may be in the form of a flow-by structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 9. In FIG. 9, sorption medium 410 is contained within process microchannel 412. An open passage way 414 permits the flow of fluid through the process microchannel 412 in contact with the sorption medium 410 as indicated by arrows 416 and 418.

Figure 10:
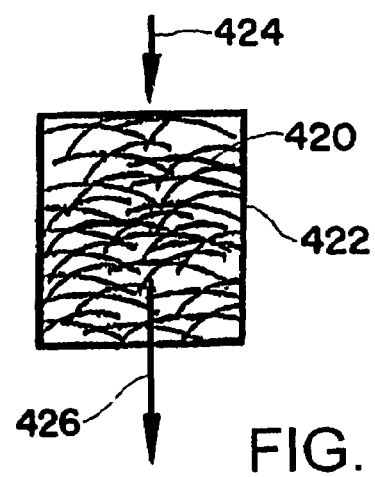
FIG. 10 is a schematic illustration of a cross-sectional view of a process microchannel used with the inventive process, the process microchannel containing a sorption medium having a flow-through configuration.

The sorption medium may be in the form of a flow-through structure such as a foam, wad, pellet, powder, or gauze. An example of a flow-through structure is illustrated in FIG. 10. In FIG. 10, flow-through sorption medium 420 is contained within process microchannel 422 and the fluid flows through the sorption medium 410 as indicated by arrows 424 and 426.

Figure 11:
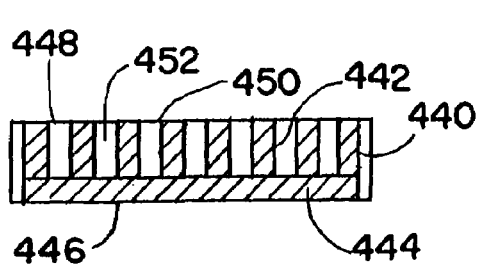
FIG. 11 is a schematic illustration of a process microchannel that may be used in the inventive process, the process microchannel containing a fin assembly comprising a plurality of fins, a sorption medium being supported by the fins.
Figure 12:
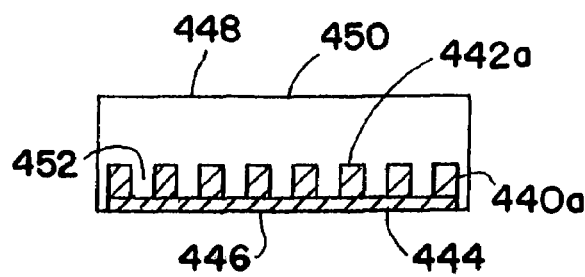
FIG. 12 illustrates an alternate embodiment of the process microchannel and fin assembly illustrated in FIG. 11.
Figure 13:
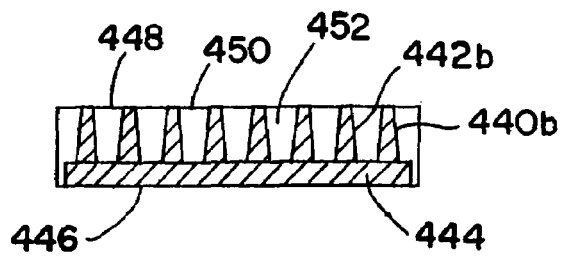
FIG. 13 illustrates another alternate embodiment of the process microchannel and fin assembly illustrated in FIG. 11.

The sorption medium may be supported on an assembly of one or more fins positioned within the process microchannels. Examples are illustrated in FIGS. 11-13. Referring to FIG. 11, fin assembly 440 includes fins 442 which are mounted on fin support 444 which overlies base wall 446 of process microchannel 448. The fins 442 project from the fin support 444 into the interior of the process microchannel 448. The fins 442 extend to and contact the interior surface of upper wall 450 of process microchannel 448. Fin channels 452 between the fins 442 provide passageways for fluid to flow through the process microchannel 448 parallel to its length. Each of the fins 442 has an exterior surface on each of its sides, this exterior surface provides a support base for the sorption medium. With the inventive process, the fluid mixture flows through the fin channels 452, and contacts the sorption medium supported on the exterior surface of the fins 442. During the inventive process, methane or nitrogen is sorbed onto the supported sorption medium, and then desorbed from the supported sorption medium. The fin assembly 440a illustrated in FIG. 12 is similar to the fin assembly 440 illustrated in FIG. 11 except that the fins 442a do not extend all the way to the interior surface of the upper wall 450 of the microchannel 448. The fin assembly 440b illustrated in FIG. 13 is similar to the fin assembly 440 illustrated in FIG. 11 except that the fins 442b in the fin assembly 440b have cross sectional shapes in the form of trapezoids. Each of the fins may have a height ranging from about 0.02 mm up to the height of the process microchannel 448, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 448, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 448 may range from about 1 to about 50 fins per centimeter of width of the process microchannel 448, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 11 or 12, or a trapezoid as illustrated in FIG. 13. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

The sorption medium may comprise any sorption medium that sorbs methane or nitrogen with a preferential affinity over the other at one temperature, and then desorbs the methane or nitrogen at a different temperature. In one embodiment, the sorption medium may sorb methane from a fluid mixture containing methane and nitrogen at a temperature in the range of about 0 to about 200° C., and then desorb the methane at a temperature in the range of about 200 to about 400° C. In one embodiment, the sorption medium may sorb methane at a temperature in the range of about 20° C. to about 60° C. from a coal mine gob gas containing methane, nitrogen, carbon dioxide, oxygen and water vapor, and then desorb the methane at a temperature in the range of about 40 to about 100° C. In one embodiment, the sorption medium has a preferential affinity for nitrogen or other coal mine gob gas constituents and allows the methane to pass through. The sorption medium may comprise activated carbon, microporous carbon powder, porous carbon foam, carbon nanotubes, activated aluminia, zeolites, copper metal complexes, metal-organic complexes, or a combination of two or more thereof. In one embodiment, multiple sorbents such as combinations of activated carbon, activated alumina and/or carbon nanotubes may be used.

The sorption medium may comprise activated carbon, also referred to in the art as carbon molecular sieves (CMS). Activated carbon is a useful adsorbent for methane and carbon dioxide with a high selectivity against nitrogen and other gases. Activated carbon with high surface areas in the range from about 10 to about 4000 $m^2/g$, and in one embodiment about 300 to about 3000 $m^2/g$, may be used. The pore volume may range from about 0.1 to about 10 $cm^3/g$, and in one embodiment about 1 to about 5 $cm^3/g$. Useful sources of activated carbon include coal, peat, wood, or coconut shells. The selected particulate size may vary and is a function of the process microchannel size and desired system pressure drop. Suppliers of activated carbon include Amoco, Pica, Calgon, Barnaby Sutcliffe, and Carbotech.

A useful adsorbent is AX-21, which is supplied by Calgon and is in the form of a microporous carbon powder. This material has a surface area of about 3000 $m^2/g$ and a pore volume of about 1.5 $cm^3/g$. Adsorbent results for AX-21 are provided in the following Table 1.

TABLE 1

| Pressure (psig) | Temperature Low (° C.) | Temperature High (° C.) | Differential Capacity $CH_4$ (mg/gm) | Differential Capacity $N_2$ (mg/gm) |
|---|---|---|---|---|
| 2 | 6 | 40 | 14 | 0.9 |
| 2 | 6 | 60 | 17 | 1.1 |
| 2 | 40 | 60 | 3 | 0.2 |
| 100 | 6 | 40 | 21 | 1.9 |
| 100 | 6 | 60 | 31 | 2.2 |
| 100 | 40 | 60 | 10 | 0.3 |

In one embodiment, the sorption medium may comprise a mixture of activated carbon particulates and thermally conductive particulates. An example of such thermally conductive particulates is diamond powder, for example, industrial diamond powder MBG-660, which is available from Diamond Innovations (Worthington, Ohio, USA). Additional examples include copper, gold, silver, and the like. The thermally conductive particulates may be thermally conductive polymers such as those available under the trade description Cool Poly®E-Series Thermally Conductive Plastics from EMI Solutions. Mixtures of two or more of these can be used. The median particulate diameter of the thermally conductive particulates may be in the range from about 10 to about 1000 microns, and in one embodiment from about 100 to about 500 microns. The ratio on a volume to volume basis of the carbon particulates to thermally conductive particulates may be in the range from about 100:1 to about 1:1, and in one embodiment from about 10:1 to about 2:1.

The sorption medium may comprise metal ions that are complexed (e.g., chelated) by ligands. The metal ions may complex with methane or nitrogen. The metal ions that may be used include Fe(II), Co(II), Cu(I), V(II), Mn(II), Mn(III), Cr(II), Ag(I), Rh(I), Rh(II), Rh(III), U(IV), V(IV), Ru(II), Ru(IV), Ti(III), Cr(IV), Bi(III), Ni(II), W(V), W(IV), Mo(II), Mo(III), Mo(IV), Mo(V), Mo(VI), or a combination of two or more thereof. The Roman numerals in the foregoing indicate oxidation states or valence numbers for the ions.

The ligands that may be used to complex the metal ions include dipyridyl; 2,6-[1-(2-imidazol-4-ylethylimino)ethyl pyridine]; cyclen; cyclam; a Schiff base ligand; acetyl acetonate or an oligomer or polymer thereof; a carboxylate; bipyridyl or an oligomer or polymer thereof; a porphyrin or an oligomer or polymer thereof; a corin or an oligomer or polymer thereof; a polyamide; a protein; 8-hydroxy quinoline or an oligomer or polymer thereof; ethyl cysteinate or an oligomer or polymer thereof; an N-alkyl alkanohydroxamic acid; dimethylglyoxime; sym-diethylethylenediamine; or a combination of two or more thereof. The ligands may include fluoride-carbon bonds. The ligands may be fluorinated (e.g., perfluourinated).

The sorption medium may be inorganic. Examples of inorganic sorption mediums that may be used include $Sb_2O_5$, AgO, PtO, $CrO_2$, PbO, HgO, $Cu_2O$, MnO, $Mn_2O_3$, $Bi_2O_4$, NiO, $NiO_2$, $Cu_2O_3$, SnO, $SnO_2$, $WO_2$, $WO_3$, $W_2O_5$, perfluorinated film, Pt/-alumina, Fe/-alumina, Cu/-alumina, Zn/-alumina, Co/-alumina, zeolite, or a combination of two or more thereof. Included in this group are metal cyanide oligomers and polymers. These include the oligomers and polymers represented by the formulae $[Cu(I)(CN)_x]_n$, $[Fe(II)(CN)_y]_n$, or $[Co(II)(CN)_y]_n$, wherein x is 3; y is 5; and n is a number that is at least 2, and in one embodiment is in the range of about 2 to about 16,500, and in one embodiment about 1000 to about 10,000.

In one embodiment, the process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels.

The product produced by the inventive process may have a methane concentration of up to about 100% by volume, and in one embodiment about 1 to about 98% by volume, and in one embodiment about 10 to about 90% by volume.

Figure 15:
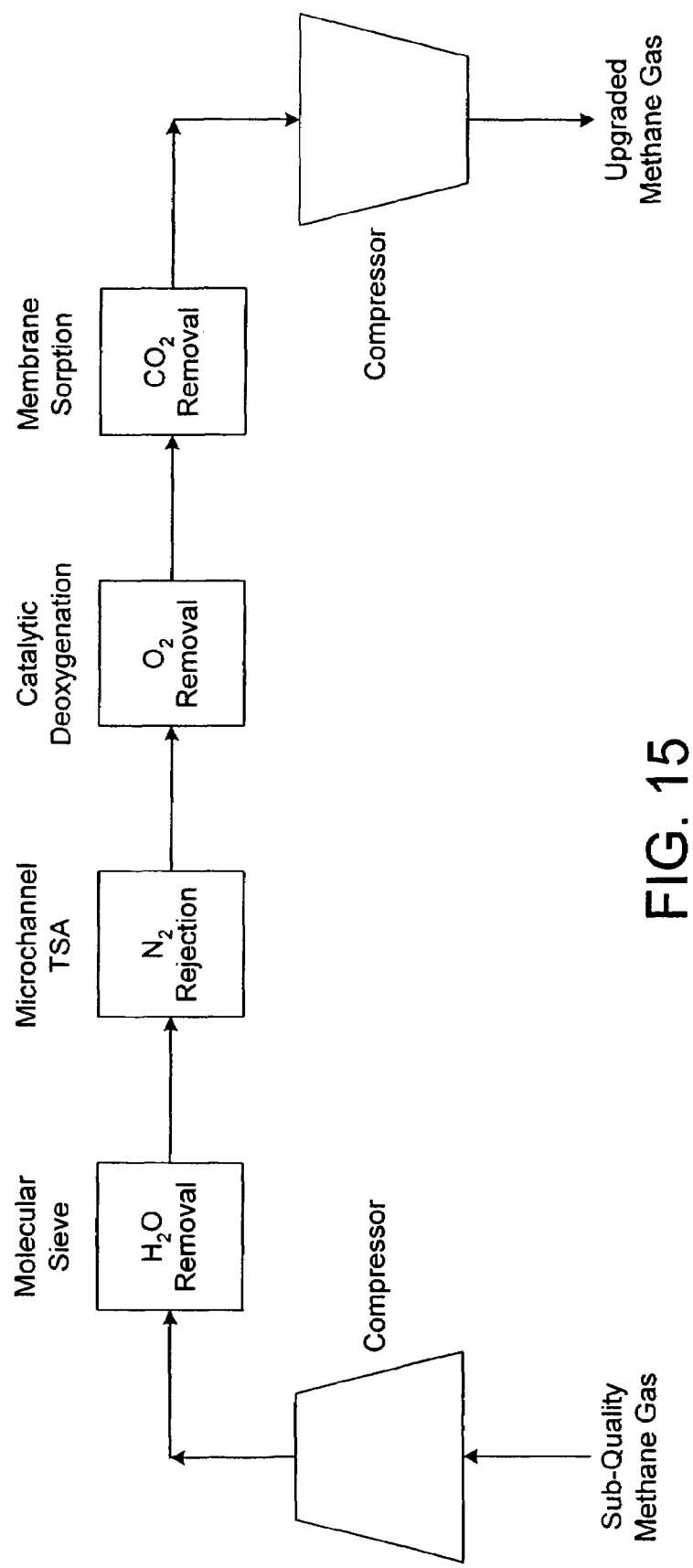
FIG. 15 is a flow diagram illustrating a methane gas upgrading process conducted in accordance with the invention.

In one embodiment, the inventive process can be used in the upgrading of a sub-quality methane gas such as coal mine methane gas. The sub-quality methane gas may comprise methane, water, nitrogen, oxygen, and carbon dioxide. The process is illustrated in FIG. 15. The sub-quality methane gas is compressed in a compressor to a gauge pressure in the range from about 1 to about 50 atmospheres, and in one embodiment about 10 to about 40 atmospheres. The temperature of the sub-quality methane gas may be in the range from about 0° C. to about 200° C., and in one embodiment about 25° C. to about 100° C. The sub-quality methane gas is advanced to a water removal unit wherein water is separated out using conventional techniques, for example, dehydration or filtration using molecular sieves. Examples of the molecular sieves that can be used include: zeolite 5A, 13 X, and the like. The resulting dehydrated sub-quality methane gas is then advanced from the water removal unit to a microchannel TSA nitrogen rejection unit. The microchannel TSA nitrogen rejection unit is a microchannel sorption/desorption unit which can have any of the designs discussed above and be operated using any of the procedures discussed above. In one embodiment, the microchannel TSA nitrogen rejection unit employs microporous carbon powder as the adsorbent, is operated at a pressure in the range from about zero to about 20 atmospheres gauge pressure, and in one embodiment about 6 to about 8 atmospheres gauge pressure, and in one embodiment about 6.8 atmospheres gauge pressure (100 psig), an average sorbent temperature of about 40° C. during the adsorption step (A) and an average sorbent temperature of about 60° C. during the desorption step (B). The adsorbent preferentially adsorbs methane, oxygen and carbon dioxide, and during the adsorption step (A), methane, oxygen and carbon dioxide are adsorbed. The nitrogen may be weakly adsorbed with a capacity at least about 2 times below the methane capacity, and in one embodiment at least about 10 times below the methane capacity. The non or weakly adsorbed nitrogen is removed. The removal of the nonadsorbed or weakly-adsorbed nitrogen may be referred to as a nitrogen rejection step. The average sorbent temperature in the process microchannel is then increased to 60° C. desorb the methane, oxygen and carbon dioxide. The cycle time for completing steps (A) and (B) may be in the range from about 0.1 to about 10 seconds. Alternatively, the microchannel TSA nitrogen rejection unit may be used to reject both nitrogen and water vapor, and thus the initial water vapor removal step would not be required. The desorbed mixture of methane, oxygen and carbon dioxide is advanced to an oxygen removal unit, for example, a catalytic deoxygenation unit, wherein the oxygen is removed. Examples of deoxygenation catalysts that can be used include platinum, palladium, noble metals, and oxides of these metals. In one embodiment, the deoxygenation unit generates heat and this heat may be recovered and used to drive the microchannel TSA nitrogen rejection unit and/or other equipment (e.g., compressors) used in the sub-quality methane gas upgrading process. The remaining mixture of methane and carbon dioxide is advanced to a carbon dioxide removal unit, for example, membrane adsorption unit, wherein carbon dioxide is removed. Examples of the membranes that can be used in the membrane adsorption unit include microporous and polymeric membranes. The final product is an upgraded methane gas. The upgraded methane gas may have a methane concentration in the range from about 90 to about 99.9% by volume, and in one embodiment about 95 to about 99% by volume. The upgraded methane gas may be suitable for use as commercial natural gas. In one embodiment, higher molecular weight hydrocarbons (e.g., ethane, propane, etc.) may be added to the upgraded methane gas to further upgrade marginal quality methane gaseous mixtures. The upgraded methane gas may be advanced through a compressor to a commercial natural gas pipeline or other suitable natural gas storage facility.

An example of a microchannel TSA apparatus that can be used in the nitrogen rejection step for upgrading sub-quality methane gas is illustrated in FIG. 16. The microchannel TSA apparatus 500 is a modular system that contains a plurality of microchannel TSA units 510. Each microchannel TSA unit 510 includes a process microchannel 520 and heat exchange channels 530 and 540. These process microchannels and heat exchange channels can be the same as discussed above. The process microchannel 520 is positioned between the heat exchange channels 530 and 540. The process microchannel 520 contains an adsorbent for preferentially adsorbing methane, and, optionally, oxygen and carbon dioxide, but not nitrogen. One of the heat exchange channels 530 or 540 is used for heating, and the other is used for cooling. During the adsorption phase of the process, i.e. step (A), the average sorbent temperature within the process microchannel 520 may be in the range from about 30° C. to about 50° C., and in one embodiment about 40° C. During the desorption phase of the process, i.e. step (B), the average sorbent temperature within the process microchannel 520 may be in the range of about 40° C. to about 80° C., and in one embodiment about 60° C. The cycle time for completing steps (A) and (B) may be from about 0.1 to about 10 seconds.

The process microchannels 520, and heat exchange channels 530 and 540 may have rectangular cross sections and be aligned in side-by-side vertically oriented interleaved planes or horizontally oriented interleaved stacked planes. These planes can be tilted at an inclined angle from the horizontal. These configurations may be referred to as parallel plate configurations. An array of these rectangular channels can be easily arranged in a modularized compact unit for scale-up.

Figure 17:
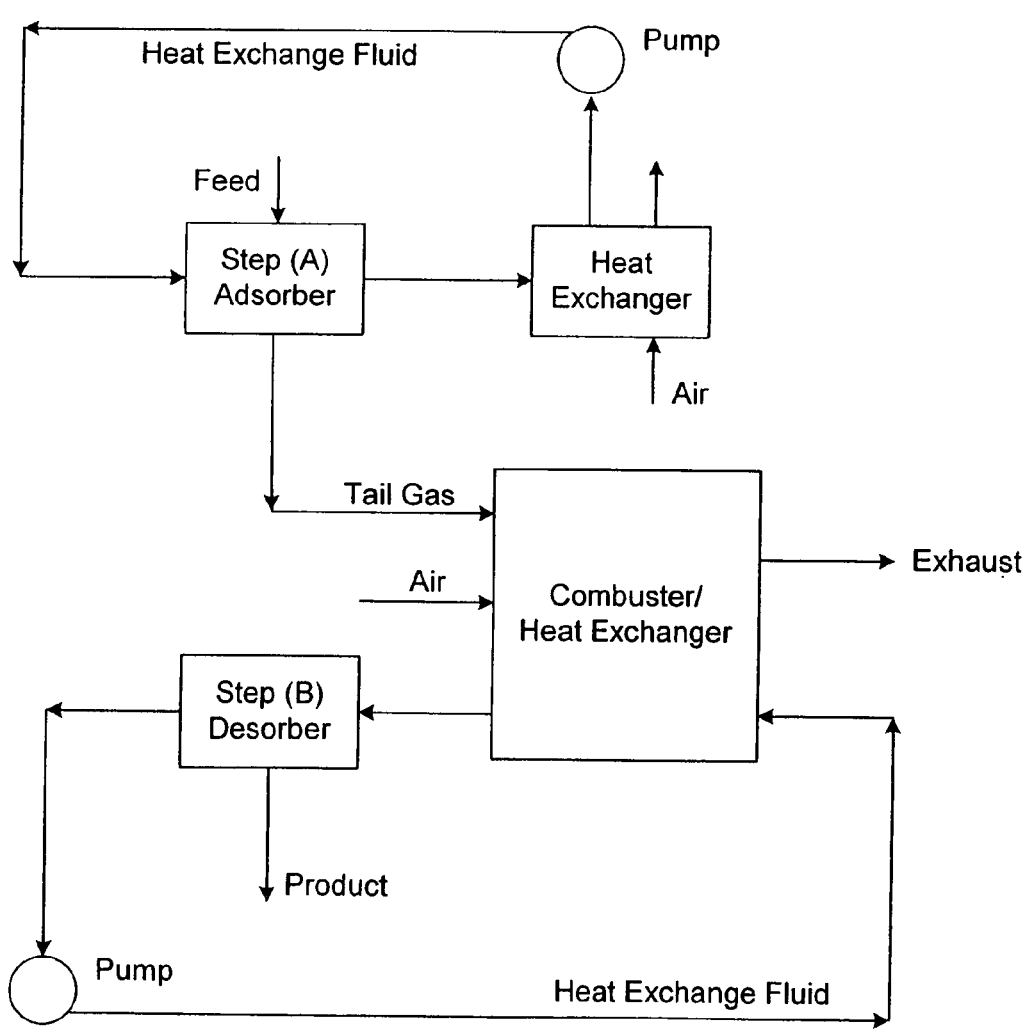
FIG. 17 is a flow diagram illustrating the operation of a microchannel TSA nitrogen rejection unit pursuant to the inventive process.

In one embodiment, less than all of the methane is adsorbed during the adsorption step (A) of the nitrogen rejection process. For example, from about 1 to about 50 percent by volume, and in one embodiment about 1 to about 20 percent by volume of the methane entering the microchannel TSA nitrogen rejection unit may be not be adsorbed during step (A). This results in methane being mixed with the nitrogen that is rejected during step (A). The non-adsorbed gas removed from the microchannel TSA nitrogen rejection unit during step (A) that contains methane can be referred to as a tail gas. The tail gases can be used as an energy source. This is illustrated in FIG. 17. FIG. 17 is a flow sheet illustrating a process for operating the microchannel TSA nitrogen rejection unit. During step (A) of the process, a first heat exchange fluid is circulated through the heat exchange channels 530 for the purpose of providing an average sorbent temperature in the process microchannels in the range from about 30° C. to about 50° C., and in one embodiment about 40° C. The tail gas that is expelled during step (A) is advanced to a combuster/heat exchanger where it is combusted and used to heat a second the heat exchange fluid which is advanced through the heat exchange channels 540 during step (B) of the microchannel TSA process. In one embodiment the tail gas or a portion of the tail gas is combusted within a microchannel. The microchannel combustor may allow more efficient energy recovery and lower NOx production resulting from the shorter time at combustion temperature. During step (B) the average sorbent temperature within the process microchannel may be in the range from about 50° C. to about 70° C., and in one embodiment about 60° C. The use of the tail gas to heat the heat exchange fluid during step (B) provides the microchannel TSA nitrogen rejection unit with an advantage of reduced energy consumption and thereby reduced operating cost.

In the embodiment illustrated in FIG. 17, a two-fluid heat exchange system is used. The two fluid heat exchange system provides more flexibility in terms of choosing heat exchange fluids and requires less compressor power compared to a single fluid heat exchange system. Each heat exchange fluid circulates in a separate heat exchange fluid loop and is heated by a separate heat exchanger. The heat exchange fluids can be in the form of gases or liquids or they can be in the form of two-phase mixtures. One of the heat exchange fluid loops supplies a heat exchange fluid to the heat exchange channels during adsorption, i.e., step (A), and the other heat exchange fluid loop supplies a heat exchange fluid to the heat exchange channels during desorption, i.e., step (B). The pressure within the heat exchange fluid loops may be reduced through valves and recovered through a compressor. The compressor power may be supplied at least in part as a result of combustion of tail gas. For example, in FIG. 17, tail gas is shown as providing an energy source for heating the heat exchange fluid used for desorption.

In one embodiment, energy from the combustion of the tail gas produced during the operation of the microchannel TSA nitrogen rejection unit may be used to operate compressors and/or other equipment used in the upgrading of sub-quality methane gas. The compressor may be used to operate cooling (refrigeration) and/or heating (heat pump) systems to add and/or remove heat from the microchannel TSA nitrogen rejection unit.

The methane upgrading process may require compression to final product pressures in the range from about 1 to about 50 atmospheres absolute pressure, and in one embodiment about 5 to about 40 atmospheres absolute pressure. The compressors used to effect this compression generate heat and typically such heat is rejected to the atmosphere. However, in one embodiment of the invention the heat generated during compression may be used to provide a heat source for the microchannel TSA nitrogen rejection unit. For example, a methane stream containing about 76% by volume methane, about 3% by volume oxygen, about 15% by volume nitrogen, about 3% by volume carbon dioxide, and about 2% by volume water vapor may require a three-stage compressor to increase the pressure from about 2 to about 600 psig (0.14 to 40.8 atmospheres gauge pressure or 1.14 to 41.8 atmospheres absolute pressure). In the first stage the outlet pressure may be about 52.5 psia (3.6 atmospheres absolute pressure), the outlet temperature may be about 149° C. and a 123 horsepower (hp) compressor is required. An interstage cooler recovers about 73 kW to reduce the process temperature to about 49° C. In a second stage compressor, the outlet pressure may be about 177 psia (12 atmospheres absolute pressure), the outlet temperature may be about 185° C., and a 135 hp compressor is required. The second interstage cooler requires about 111 kW to reduce the temperature to about 49° C. The final stage may increase the pressure to about 620 psia (42.4 atmospheres absolute pressure), the outlet temperature may be about 188° C., and a 135 hp compressor is required. The final aftercooler requires about 113 kW to reduce the stream temperature to about 49° C. The sum of the energy available (297 kW) may be converted to energy to drive the microchannel TSA nitrogen rejection unit. In one embodiment, heat from the compressor may be used as an energy source to provide at least part of the heat for heating the process microchannels during the microchannel TSA nitrogen rejection process. In one embodiment, the recovered energy from the compressors may comprise from about 2% to about 100%, and in one embodiment from about 5 to about 25% of the total energy required to heat the process microchannels during the microchannel TSA nitrogen rejection process.

EXAMPLE 1

Figure 25:
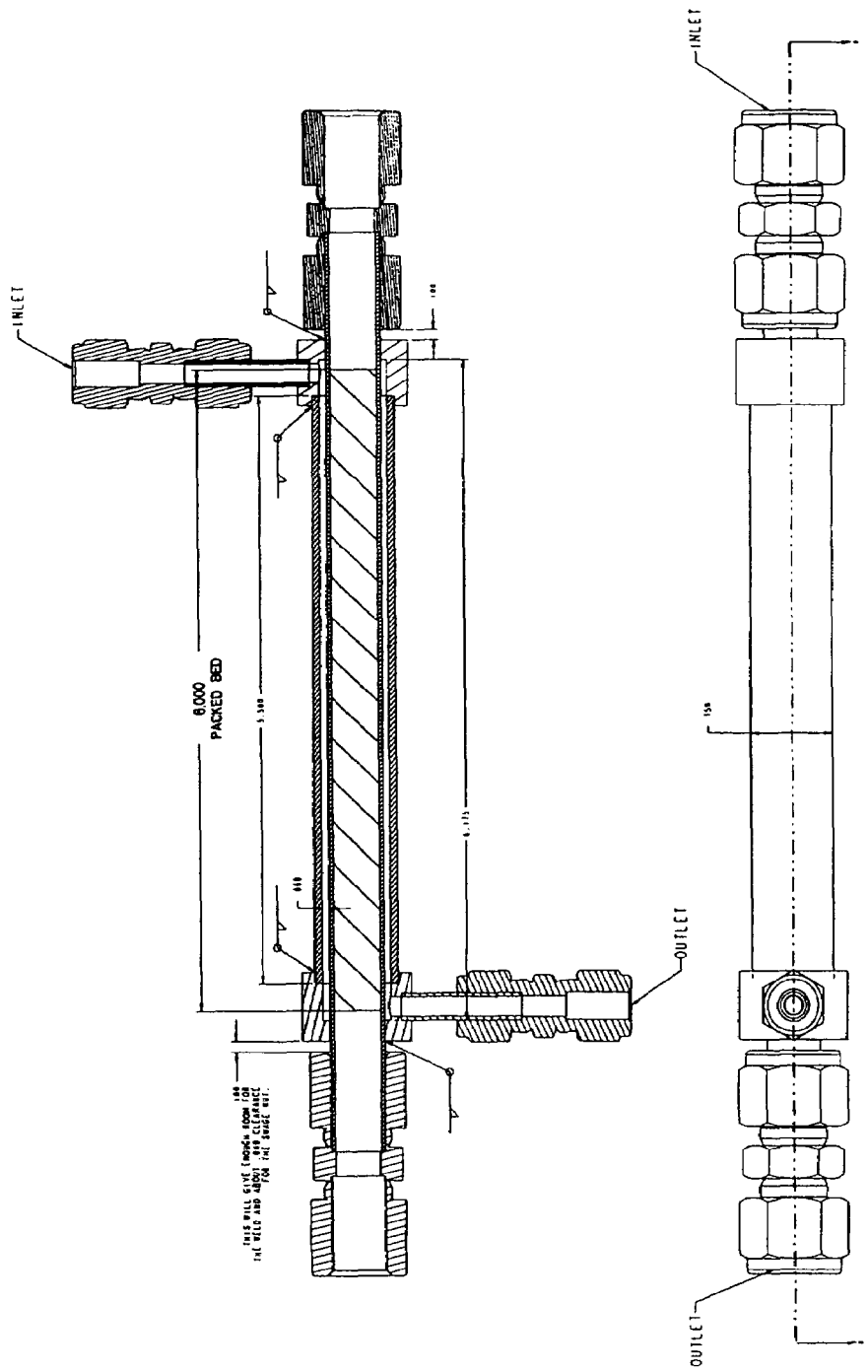
FIG. 25 is an illustration of an adsorbent testing apparatus wherein process gases flow downward through the (vertically mounted) adsorbent bed in the center tube and heat exchange fluid flows co-currently in an outer annulus to maintain near isothermal operation.

A test system is designed to measure adsorption capacity as a function of temperature, pressure, and composition for different solid granulated forms of adsorbents. The system includes an adsorbent bed with heat exchanger to maintain isothermal operation during experiments (as shown in FIG. 25).

The adsorbent bed consists of an inner tube with ½" outside diameter (OD) housed within an outer tube of ¾" OD. The length of the adsorbent bed is 6", for a typical loading of 5 to 7 grams of adsorbent (based on 0.35 to 0.5 g/mL density). 5.4 grams of adsorbent are loaded. A 50/50 mix of glycol and water heat exchange fluid flows through the annulus at 4 gallons/min. The heat exchange fluid temperature can be varied from 0° C. to 45° C.

Figure 26:
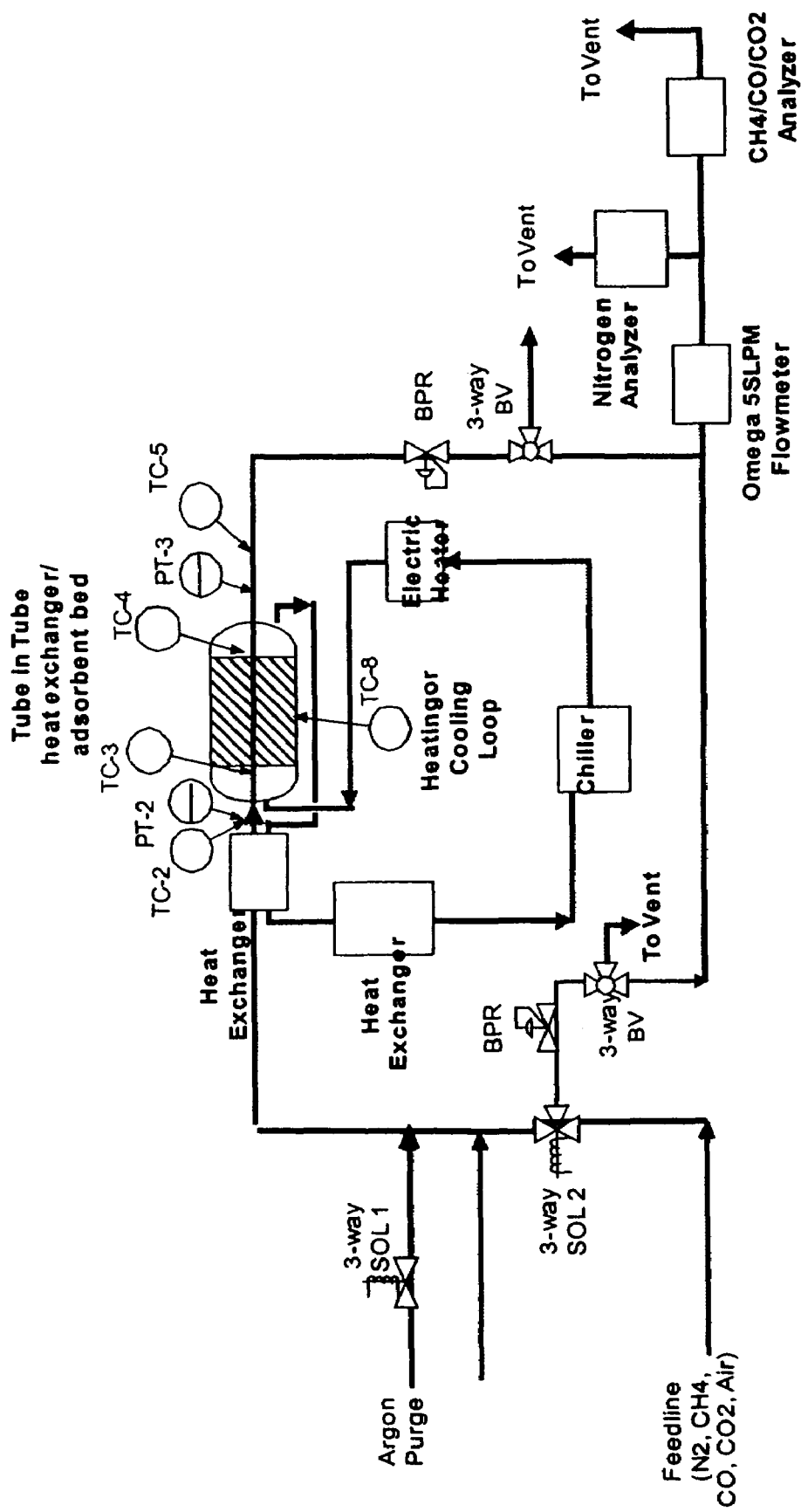
FIG. 26 is an illustration of an adsorbent system flow diagram.
Figure 27:
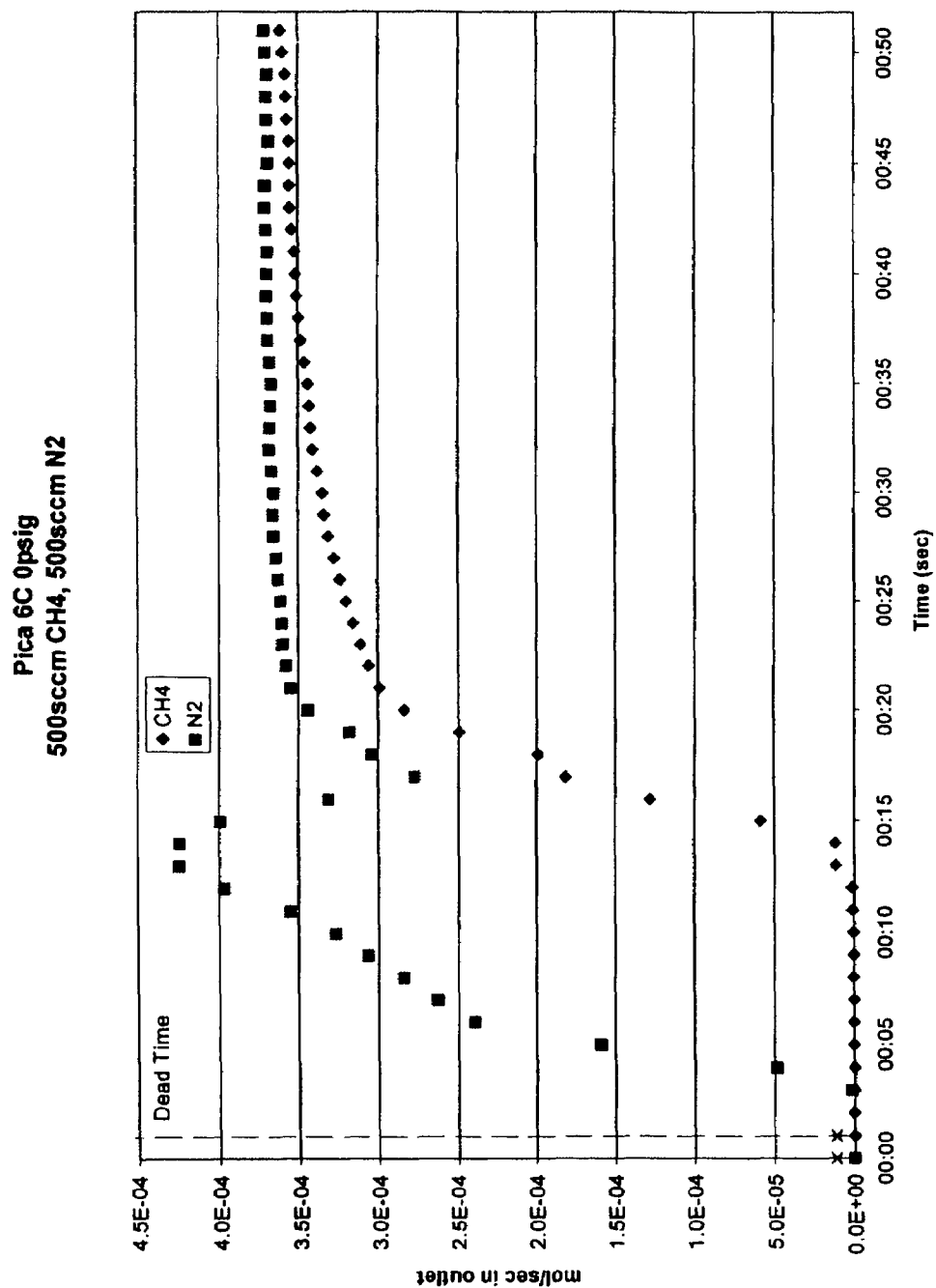
FIGS. 27-32 are plots showing adsorption capacity for a Pica carbon adsorbent.
Figure 28:
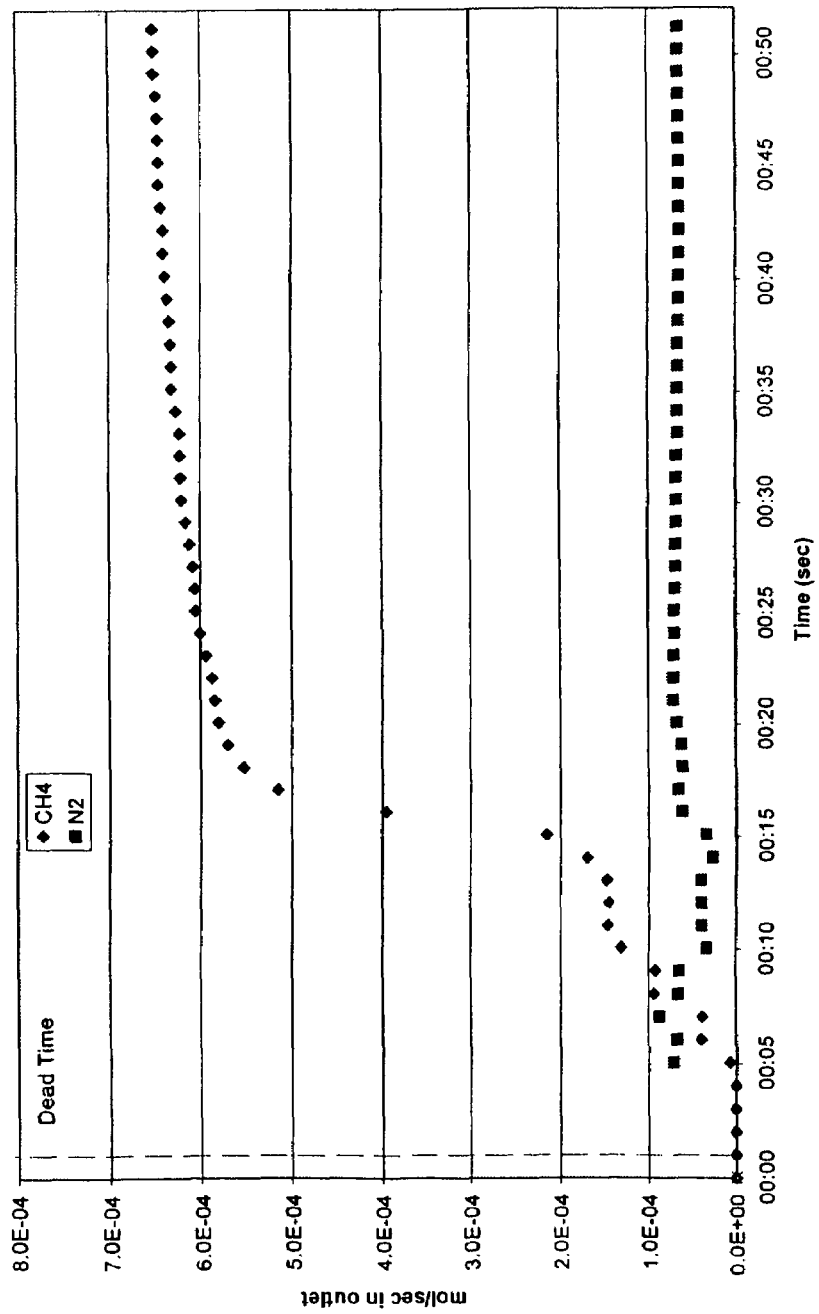
Figure 29:
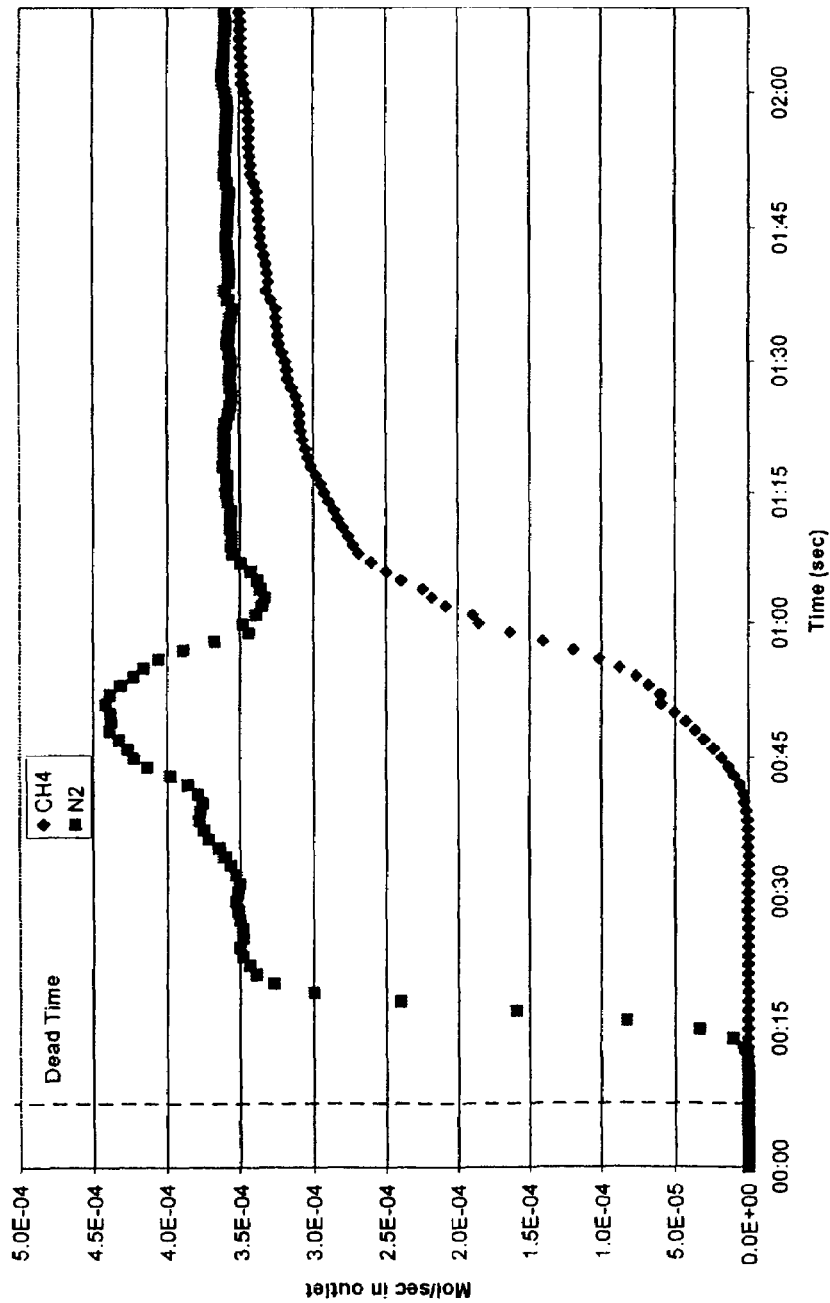
Figure 30:
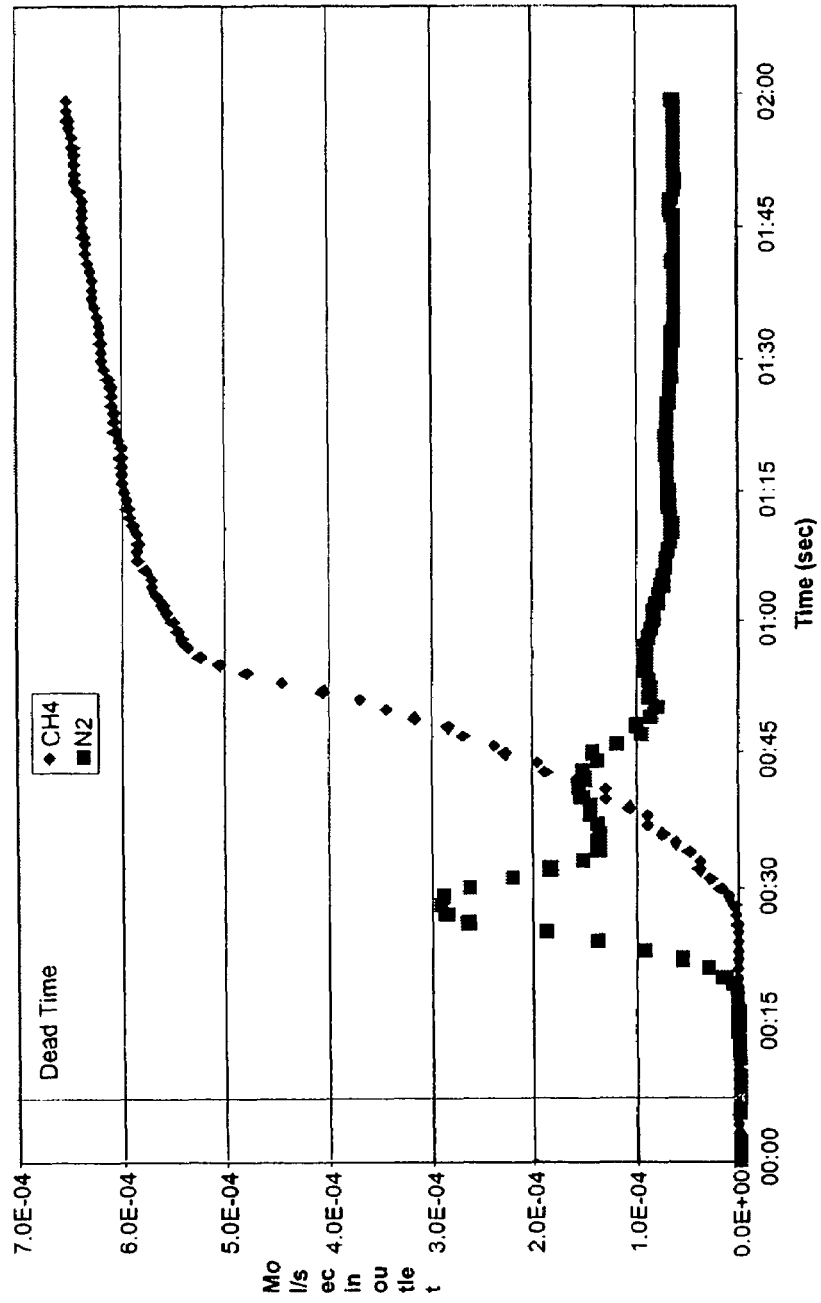
Figure 31:
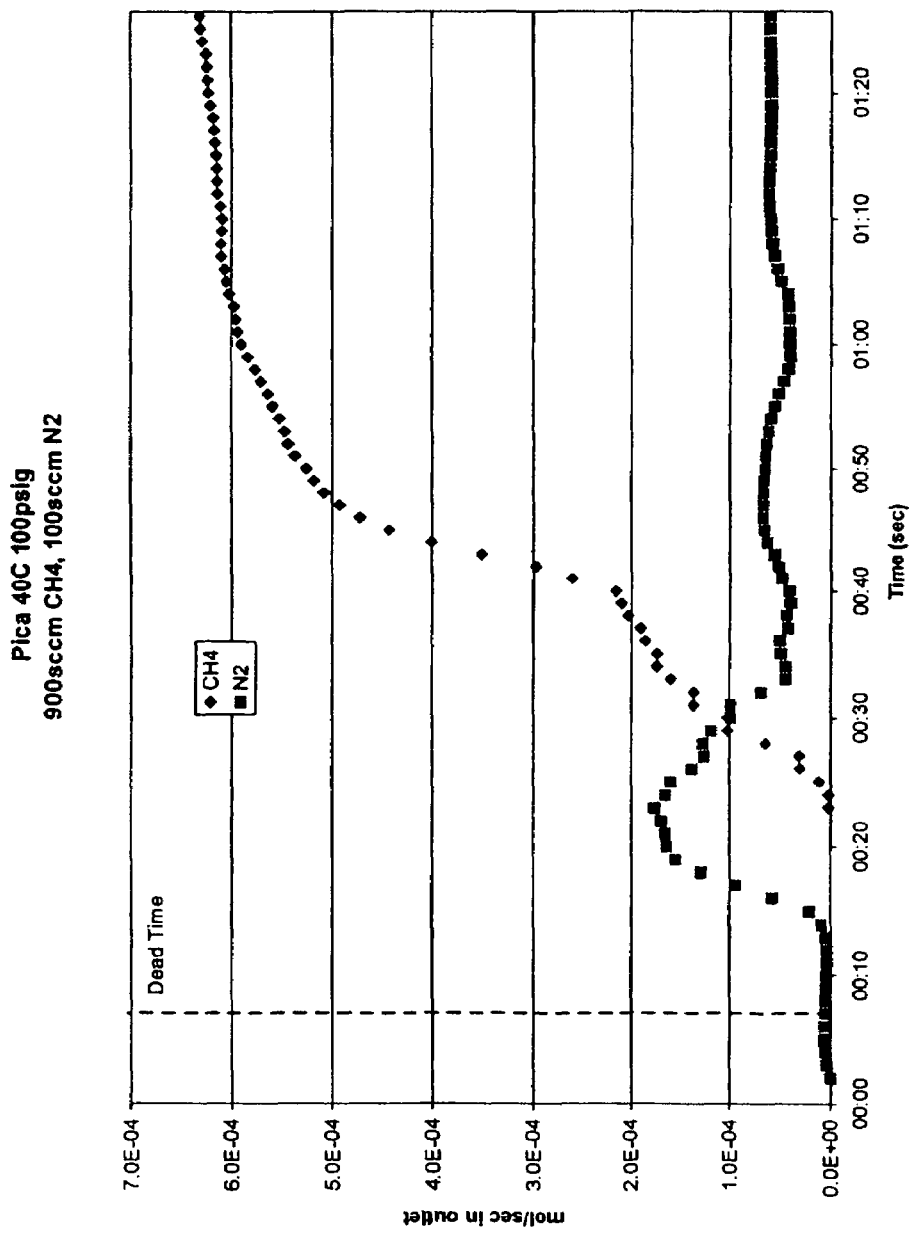
Figure 32:
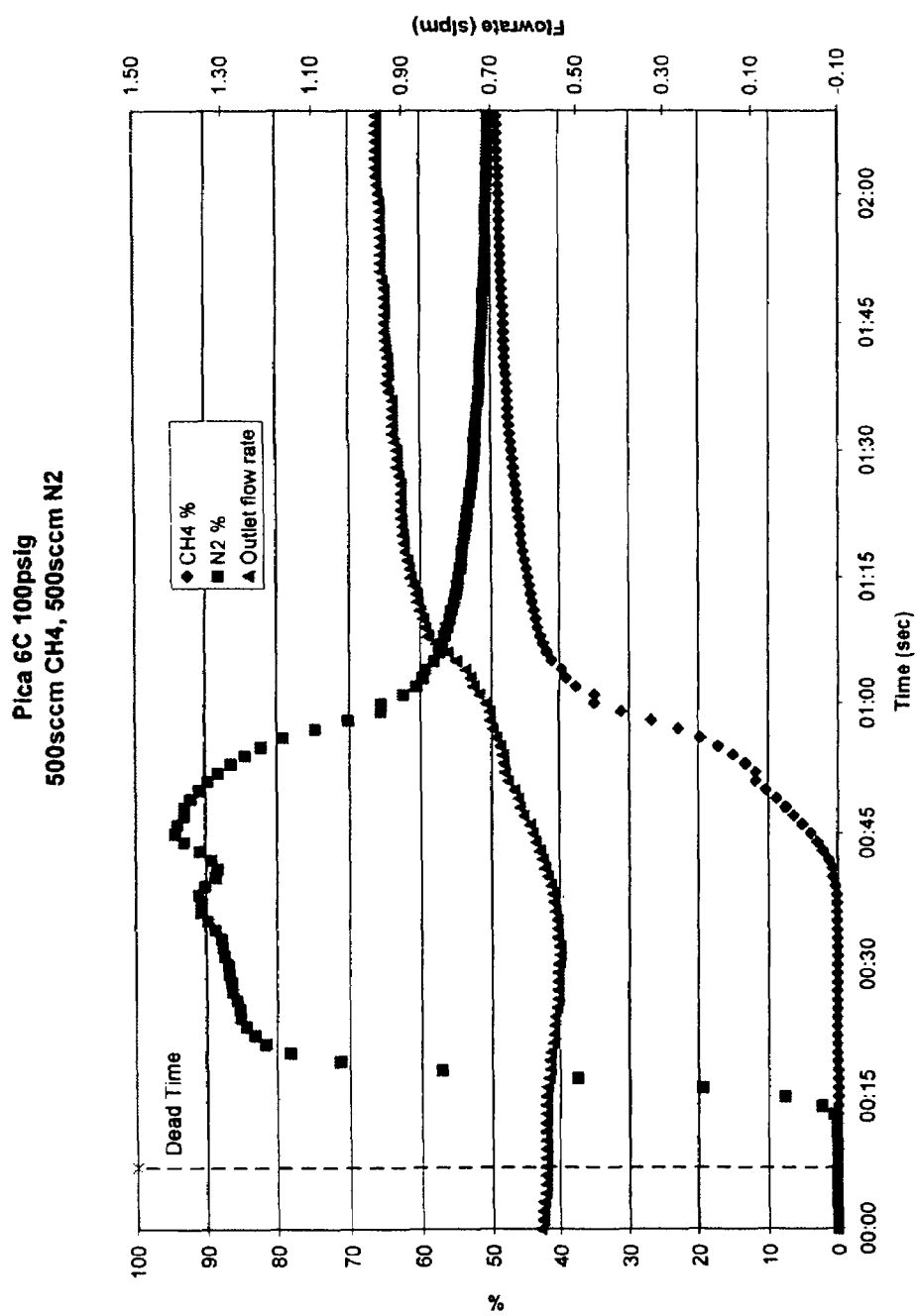

The system (as shown in FIG. 26) also includes a feed line and a purge gas line that can each be electronically turned off and on. The feed line can add a custom mix of methane and nitrogen. The purge line is used to "clean" or desorb the solutes between experiments.

The feed gases are metered separately through Brooks mass flow controllers, mixed, and can either be fed directly to the sample analysis line or fed through a small preheater and into the adsorption bed. At the start of each test while argon is fed to the adsorption bed, the feed gases are routed via 3-way valves to the analyzer system. After leaving the adsorption bed, gases can then be sent to either the bypass vent line or to the sample analysis line which includes an Omega mass flow meter, a Raytech Nitrogen analyzer and a California Analytical Instruments $CH_4/CO/CO_2$ analyzer. As shown in FIG. 19, the flow exiting the flowmeter in the sample analysis line is split to feed the nitrogen and $CH_4/CO_2/CO$ analyzers in parallel.

The procedure for running each experiment is

1) Grind adsorbent particles with mortar and pestle or small ball mill.

2) Sieve the particles to recover the 212- to 425-micron particle size fraction (40-70 mesh).

3) Load the test apparatus with a known weight of undesiccated adsorbent (5-7 gms) from the above particle size fraction.

4) Calibrate flow controllers and analyzers against known standards.

5) Purge the bed with argon at expected total feed flow rate until no other gases are seen by the analyzers.

6) Set system pressure with the BPR (either 0 psig or 100 psig).

7) Set system temperatures by adjusting the temperature of the chiller and the pre-heater.

8) Set feed flow rates and bypass the adsorbent bed, sending them to the analyzer to check composition.

9) Send feed flows to vent and purge (argon) flow to the adsorbent bed and sample analysis line until no more methane or nitrogen is detected in outlet stream.

10) Simultaneously start the feed to the adsorbent bed and stop the purge gas (argon) flow at time to by opening the valve solenoid-1 and closing solenoid-2.

11) Record the measured outlet flow rates and compositions as a function of time via LabView program.

12) After steady-state is established, stop test by closing solenoid-1 and opening solenoid-2 (flow purge gas over the bed to remove the sorbed solutes).

Once the testing is complete, the data can be collected at any given time interval, generally 1-second increments are used. The data collection system records the time when the solenoids are switched giving an exact start time to the test. The system dead time (about 1 second at 2 psig and 7.3 seconds at 100 psig) and the response delay of the analyzers are taken into account when calculating breakthrough time and capacity.

Adsorbent capacity is calculated for each test condition as the cumulative milligrams of each component fed to the system less the cumulative milligrams of each component exiting the system per gram of adsorbent.

$$capacity = \frac{\sum_{j=1}^{n}(mg\ i\ in - mg\ i\ out)_j}{grams\ of\ adsorbent}$$

where mg i in or out is the mass of component i entering or exiting the bed at time increment j (with a total of n time increments). The dead time, or the time required for the process flows to first reach the adsorbent bed is not included in the calculation. The mass of each component i ($CH_4$ and $N_2$) entering and leaving the adsorbent bed is calculated at each time interval j and summed over all time periods from the end of the dead time to the time when each component ceases adsorbing according to the following equations:

$$mg\ i\ in_j = SLPM\ i\ in_j \cdot \left(\frac{1\ min}{60\ sec}\right) \cdot \left(\frac{1\ mmol\ i/min}{0.0224\ SLPM\ i}\right) \cdot \left(\frac{MW_i\ mg\ i}{mmol\ i}\right) \cdot time\ interval_j$$

$$mg\ i\ out_j = SLPM\ out_j \cdot \left(\frac{1\ min}{60\ sec}\right) \cdot \left(\frac{1\ mmol/min}{0.0224\ SLPM}\right) \cdot y_{i,j} \left(\frac{MW_i\ mg\ i}{mmol\ i}\right) \cdot time\ interval_j$$

where SLPM is the flow rate (total or component i) converted to standard liters per minute (standard conditions being 0° C. and 1 atm), $MW_i$ is the molar mass of component i, $y_{i,j}$ is the mole fraction of component i at time j, and time $interval_j$ is the time increment at time j in seconds. The stream composition ($y_{i,j}$) exiting the bed at time j is assumed to be the mole fraction measured in the sample analysis line analyzers after a delay period had elapsed. This delay period (about 0.5 to 1 second longer for $CH_4$ than for $N_2$) is the average time needed for the gas to flow from the bed exit to the analyzer, given the average outlet flow rate during that time. Because of the large proportion of process gases which are adsorbed, variations in the outlet flow rate are very significant and the calculated delay period is substantial (typically 7-13 seconds).

Activated carbon (MGN-101) from Pica, Inc. is evaluated. The carbon sample demonstrates preferential capacity for methane over nitrogen, as well as thermal swing differential capacity of 15 mg/gm methane and less than 2 mg/gm nitrogen between 6° C. and 40° C. at both 2 psig and 100 psig. for a 90% methane and 10% nitrogen mixture. A similar methane swing capacity at 2 psig is measured, while the nitrogen swing capacity drops below 1 mg/gm. The mixture composition is relevant because gob gas contains nearly 85% methane and must be purified to 97% methane for pipeline quality.

The results of adsorption capacity testing for the Pica carbon adsorbent are shown in Tables 2 and 3 and in FIGS. 27 through 32. The capacity data (Tables 2 and 3) show the increase in capacity with increasing mole fraction of a given component. The data show the expected trends of increasing capacity with decreasing temperature and increasing pressure. A few data points (especially nitrogen) do not show the expected decrease in capacity as temperature is increased. This is attributed to errors in the nitrogen analyzer measurements, and possibly errors in the outlet flow meter readings (as it was calibrated using the inlet composition, while the actual composition varied throughout the testing).

TABLE 2

PICA Carbon MGN-101, capacity as a function of temperature and mixture composition near 1 atm

| Temp (C.) | Pressure (psig) | CH4 flow (sccm) | N2 Flow (sccm) | CH4 Capacity (mg/g) | N2 Capacity (mg/g) |
|---|---|---|---|---|---|
| 6 | 2 | 100 | 900 | 5.8 | 20.8 |
| 6 | 2 | 500 | 500 | 21.2 | 9.2 |
| 6 | 2 | 900 | 100 | 32.2 | 1.3 |
| 23 | 2 | 100 | 900 | 4.1 | 19.1 |
| 23 | 2 | 500 | 500 | 14.2 | 10.2 |
| 23 | 2 | 900 | 100 | 21.6 | 2.6 |
| 40 | 2 | 100 | 900 | 2.7 | 11.5 |
| 40 | 2 | 500 | 500 | 10.0 | 5.6 |
| 40 | 2 | 900 | 100 | 16.4 | 1.8 |

TABLE 3

PICA Carbon MGN-101 capacity as a function of temperature and mixture composition near 100 psig

| Temp (C.) | Pressure (psig) | CH4 flow (sccm) | N2 Flow (sccm) | CH4 Capacity (mg/g) | N2 Capacity (mg/g) |
|---|---|---|---|---|---|
| 6 | 100 | 100 | 900 | 16.4 | 64.8 |
| 6 | 100 | 500 | 500 | 70.1 | 21.1 |
| 6 | 100 | 900 | 100 | 94.2 | 5.3 |
| 23 | 100 | 100 | 900 | 12.7 | 37.8 |
| 23 | 100 | 500 | 500 | 55.4 | 26.8 |
| 23 | 100 | 900 | 100 | 94.4 | 18.6 |
| 40 | 100 | 100 | 900 | 9.6 | 53.6 |
| 40 | 100 | 500 | 500 | 41.9 | 23.8 |
| 40 | 100 | 900 | 100 | 79.5 | 2.9 |

EXAMPLE 2

The test system described in Example 1 is used to identify a suitable adsorbent for use in an NRU. In order to calculate the capacity of each absorbent for methane and nitrogen, three types of responses may be measured in real time and recorded every 0.5 seconds: the mass flow meter reading for total outlet flow, the mole fraction methane in the outlet, and the mole fraction nitrogen in the outlet (see FIG. 33). The time at which the feed to the adsorbent bed is switched by solenoid valve from argon to the feed mixture is also recorded to the nearest 0.5 seconds. The adsorbent capacity is calculated for each component i ($CH_4$ or $N_2$) as in Equation 1:

$$capacity = \frac{n_{i,adsorbed} \cdot MW_i}{grams\ adsorbent} \quad (1)$$

$n_i$, adsorbed is the moles of component i adsorbed and $MW_i$ is the ponding molecular weight. The moles adsorbed of each component i is ted by mass balance: moles adsorbed equals the cumulative number of entering the adsorbent bed ($n_{i,\ in}$) less the moles exiting the adsorbent bed ($n_{i,out}$) less the moles held up in the void space of the adsorbent bed ($n_{i,\ bed}$) as shown in Equation 2. The cumulative moles in and the cumulative moles out do not included the gas flowing during the initial dead time (during which time argon is being purged from the inlet line and replaced with the feed mixture).

$$n_{i,adsorbed} = n_{i,in} - n_{i,out} - n_{i,bed} \quad (2)$$

Given the void volume of the adsorbent bed ($V_{bed\ void}$), the mole fraction of component in the inlet stream ($y_i$), and the bed temperature ($T_{bed}$) and pressure ($P_{bed}$), the moles held up in the adsorbent bed may be calculated from the ideal gas law (Equation 3).

$$n_{i,bed} = \frac{P_{bed} \cdot y_i \cdot V_{bed\ void}}{R_{gas,\ universal} \cdot T_{bed}} \quad (3)$$

The cumulative moles entering the adsorbent bed is found as shown in Equation 4 below $$n_{i,in} = \sum_{j=1}^{n} SLPM\ i\ in_j \cdot \left(\frac{1\ \text{min}}{60\ \text{sec}}\right) \cdot \left(\frac{1\ \text{mol}\ i/\text{min}}{22.4\ SLPM\ i}\right) \cdot \Delta t_j \quad (4)$$

where "SLPM i in$_j$" is the flow rate of component i (CH$_4$ or N$_2$) in standard liters per minute (standard conditions being 0° C. and 1 atm) at the bed entrance at time j, and $\Delta t_j$ is the time increment at time j in seconds. The cumulative moles leaving the adsorbent bed may be found as shown in Equation 5 below:

$$n_{i,out} = \sum_{j=1}^{n} SLPM\ out_j \cdot \left(\frac{1\ \text{min}}{60\ \text{sec}}\right) \cdot \left(\frac{1\ \text{mol}/\text{min}}{22.4\ SLPM}\right) \cdot y_{i,j} \cdot \Delta t_j \quad (5)$$

where "SLPM out$_j$" is the total flow rate out of the bed in standard liters per minute (standard conditions being 0° C. and 1 atm) at the bed exit at time j, $y_{i,j}$ is the mole fraction of component i at the bed exit at time j, and $\Delta t_j$ is the time increment at time j in seconds. Since mole fractions are not measured at the bed exit, but further downstream at the analyzer after addition of additional Ar, the composition at the bed exit is assumed to be offset in time from the composition at the analyzer by the time required for the gas to travel between the two. The reading of the mass flow meter for the total outlet flow is offset from the actual total outlet flow by a factor which shows a linear dependence on gas composition as shown below in Equation 6.

$$F_{total,reading} = F_{Ar} \cdot K_{Ar} + F_{N2} + K_{N2} + F_{CH4} \cdot K_{CH4} \quad (6)$$

In Equation 6, $F_i$ represents the true flow rate in SLPM at the mass flow meter for each component i and the $K_i$ values are correction factors determined from calibration with known mixtures of Ar, CH$_4$, and N$_2$ ($K_{Ar}$=0.964, $K_{CH4}$=1.889, and $K_{N2}$=1.431). If ($F_{total,\ actual} - F_{N2} - F_{CH4}$) is substituted for $F_{Ar}$ in Equation 6 and the equation re-arranged, the expression below (Equation 7) is obtained for actual total outlet flow rate.

$$F_{total,actual} = \quad (7)$$
$$\frac{1}{K_{Ar}} \cdot [F_{total,reading} + F_{N2} \cdot (K_{Ar} - K_{N2}) + F_{CH4} \cdot (K_{Ar} - K_{CH4})]$$

Using the above equation, the actual total flow rate is iteratively calculated from the mass flow meter reading and the known composition of the gas at any given time. Iteration is necessary since only the mole fraction and not the flow rate of each component is known. The mass flow meter reading gives a first guess for the iteration, which converges to give an actual flow rate after 2 iterations. The argon flow rate exiting the bed is calculated as the total argon flow rate ($F_{total,\ actual} - F_{N2} - F_{CH4}$) corresponding to the iterative solution to Equation 7 less the 1 SLPM downstream of bed purge argon flow.

The composition of the gas is measured at the gas analyzers, so the composition at the mass flow meter is assumed to be offset in time from the composition at the analyzer by the time required for the gas to travel between the two. In addition, a 1.2 second intrinsic methane analyzer delay is assumed as this given match between the outlet flow readings and the methane analyzer readings under a wide variety of conditions. It is assumed that once the outlet composition reaches an asymptotic value (at long run times beyond the point of breakthrough) that the outlet molar flow rates are equivalent to the inlet molar flow rates. The reading from the continuous nitrogen analyzer show a sharp increase at the time which nitrogen begins to be present in the outlet stream being analyzed. This sharp increase, or spike, is used to identify the beginning of the nitrogen peak (or N$_2$ peak start time, see FIG. 33). Since the analyzer shows a complex dependency on time-on-stream as well as on methane and argon concentration, Equation 8 is used to simulate the nitrogen evolution step-function curve at the analyzer.

$$SLPM_{N2} = \frac{\max SLPM_{N2}}{1 + \exp\left[-\frac{(t - \tau_1)}{\tau_2}\right]} \quad (8)$$

where "max SLPM$_{N2}$" is the asymptotic N$_2$ flow rate (based on inlet flows), t is the time in seconds, and $T_1$ and $T_2$ are fitting parameters which are adjusted to match the N$_2$ peak start time indicated by the N$_2$ analyzer and the calculated actual outlet total flow and argon flow as a function of time. The physical sense of $T_1$ and $T_2$ may be understood as follows: $T_1$ is the average of the peak start time (detected by N$_2$ analyzer) and the peak duration time (in seconds), and $T_2$ is the peak duration time in seconds divided by 8.8. Since the adsorbent bed is flushed with Ar before starting the flow of CH$_4$ and N$_2$ at the inlet, Ar gas is flushed out the exit of the bed during the time in which CH$_4$ and N$_2$ were adsorbed. The N$_2$ peak duration time is estimated via the response seen in the measured outlet flow (which is composition sensitive), adjusting the estimate until the calculated Ar outlet flow curve and calculated actual total outlet flow curves were smooth and continuous during the transition in composition of the outlet flow (see FIG. 34). In a few cases, where the N$_2$ peak is obscured by the CH$_4$ peak, the N$_2$ peak duration time for the 90/10 CH$_4$/N$_2$ inlet mixture is assumed to be the same as for the 50/50 inlet mixture at the same conditions of temperature and pressure (see FIG. 35). Although this method of nitrogen evolution estimation introduces some additional error into the nitrogen capacity measurement, the effect seems to be minor (less than 10%) in most cases.

EXAMPLE 3

Figure 33:
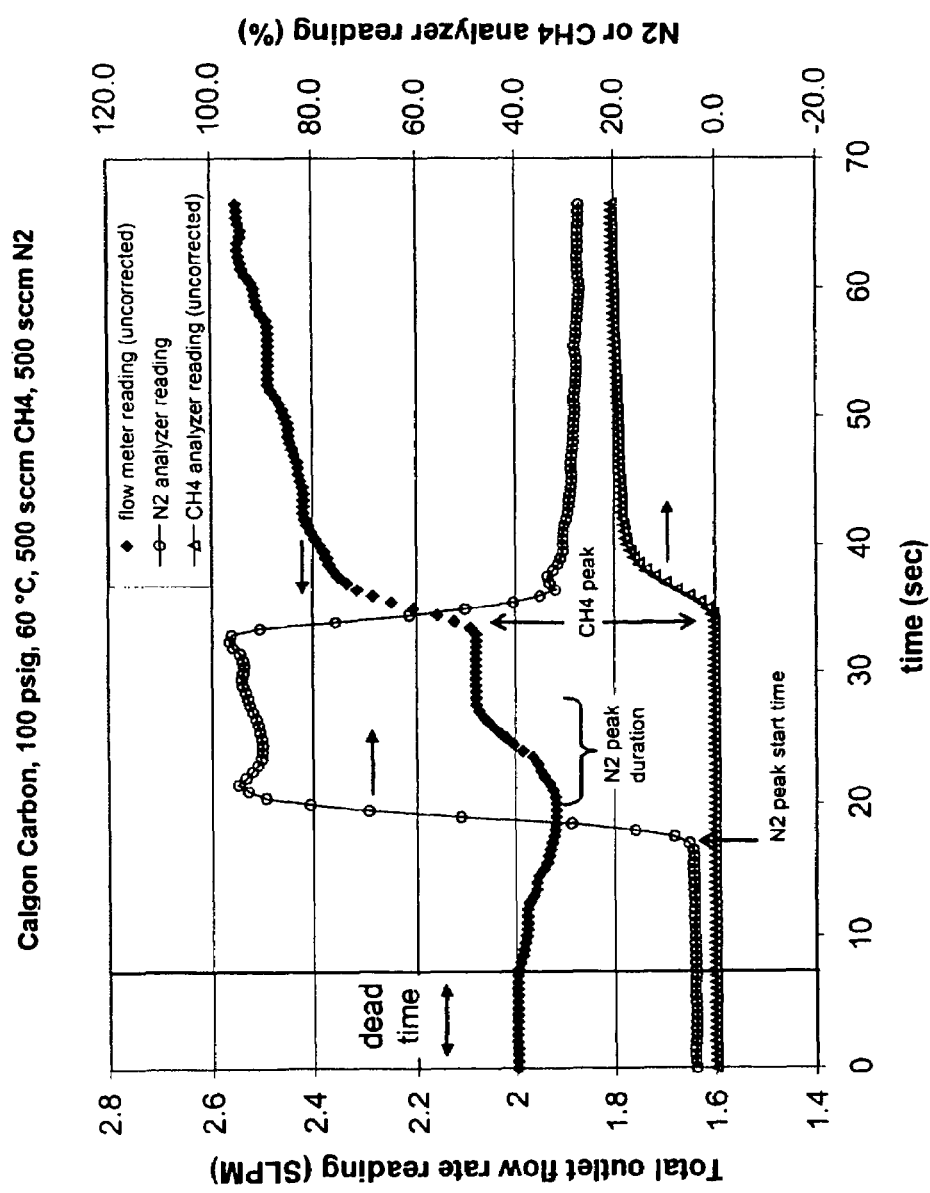
FIG. 33 is a plot showing outlet flow rate readings from a mass flow meter (left axis) and nitrogen and methane analyzer readings (right axis, before calibration correction) for adsorption capacity tests on a Calgon carbon adsorbent using an equimolar feed mixture at 60° C. and 100 psig with a dead time of 7 seconds.
Figure 34:
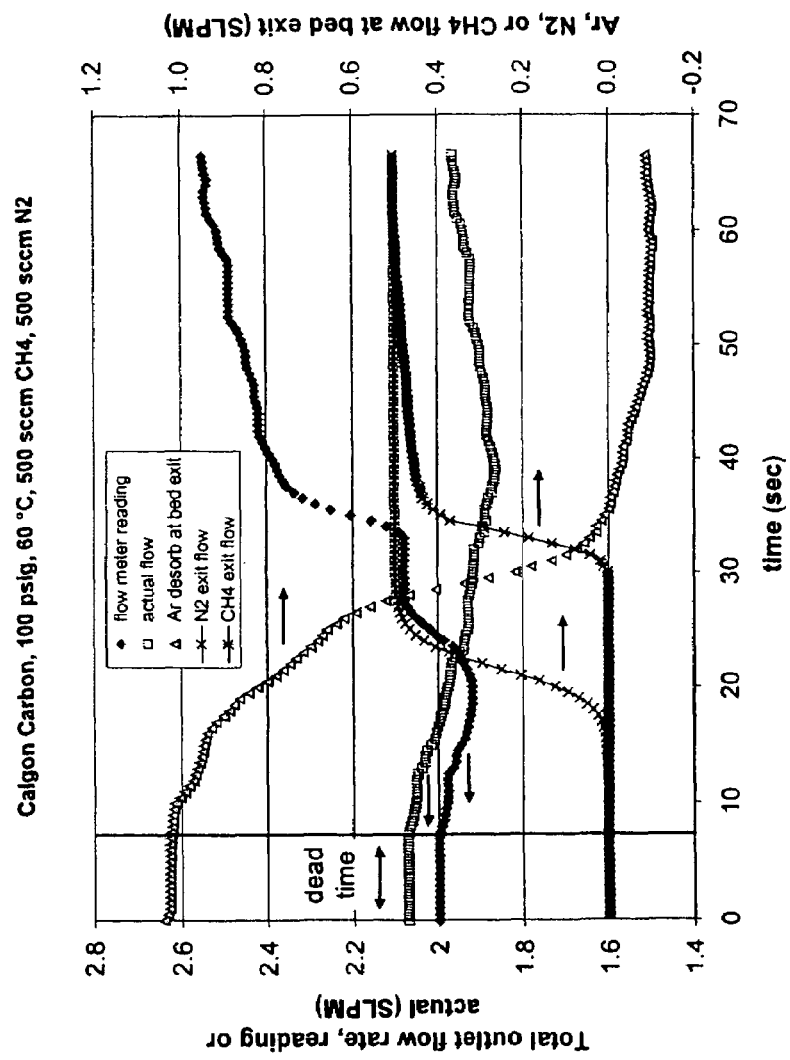
FIG. 34 is a plot showing outlet flow rate readings from a mass flow meter and corrected total outlet flow (left axis) and argon, nitrogen, and methane flows at the sorbent bed exit (right axis) for adsorption capacity tests on a Calgon carbon adsorbent while feeding 0.5 SLPM $CH_4$ and 0.5 SLPM $N_2$ at 60° C. and 100 psig with a dead time of 7 seconds.
Figure 35:
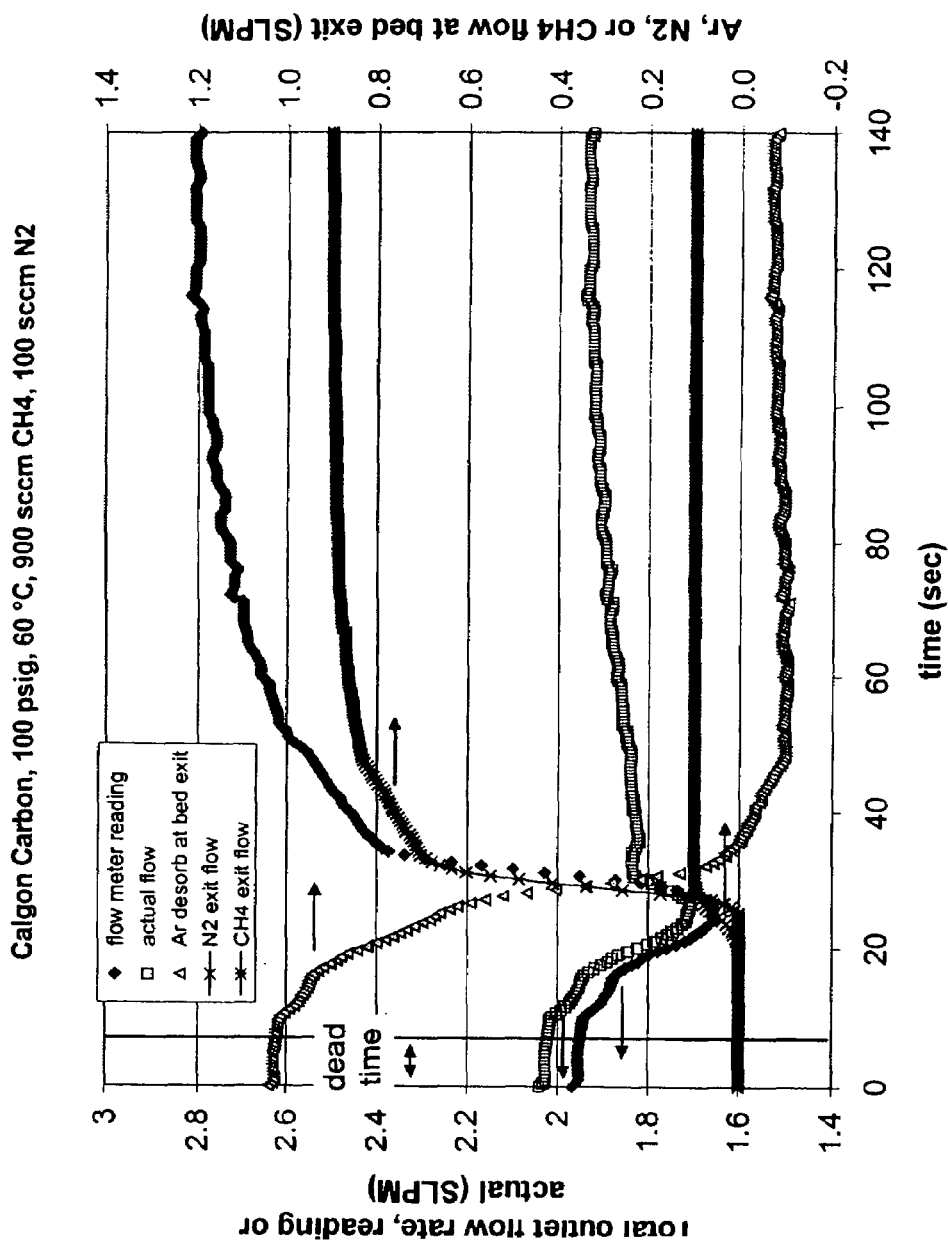
FIG. 35 is a plot showing outlet flow rate readings from a mass flow meter and corrected total outlet flow (left axis) and argon, nitrogen, and methane flows at the sorbent bed exit (right axis) for adsorption capacity tests on a Calgon carbon adsorbent while feeding 0.9 SLPM $CH_4$ and 0.1 SLPM $N_2$ at 60° C. and 100 psig with a dead time of 7 seconds.

In the design of a methane upgrading system, the following assumptions may be made:
The methane upgrading system is sized for 3 million standard cubic feet per day (MMSCFD) of sub-quality natural gas entering from a gob gas well or wells
Composition of the gas from the well is: 70% $CH_4$, 4% $O_2$, 22% $N_2$, 4% $CO_2$ and saturated with water at ambient conditions
Composition required for the pipeline: 96% $CH_4$, <4% $N_2$ or $CO_2$, 10 ppm $O_2$ and dry to −40° C. at 600 psi
Inlet temperature and pressure from the well: 20° C. and 1 psig
Outlet temperature and pressure to pipeline: <200° C. and 600 psig
Typical analyzer and mass flow meter reading curves are shown in FIG. 33. FIGS. 34 and 35 depict outlet flow curves produced from typical tests at 100 psig with mixtures of 50/50 and 90/10 (v/v) methane/nitrogen, respectively. The results of the adsorbent capacity screening tests are shown in Tables 4-8. Tables 4 and 5 summarize carbon adsorbent capacities for the 2 psig and 100 psig tests, respectively. Table 6 shows Calgon carbon adsorbent capacities for the 200, 300, and 400 psig tests. Tables 7 and 8 summarize zeolite adsorbent capacities for the 2 psig and 100 psig tests, respectively. The zeolite adsorbents may be obtained from Alpha Aesar. These capacities can then be used to determine differential capacities between any two temperature conditions for a given inlet composition and pressure (the differential capacity for a given component is simply the difference between the two measured capacities for that component at the low and high temperature).

It may be desirable to have a high of the differential capacities for methane and a low differential capacity for nitrogen over a given temperature range in order to effect separation by thermal swing adsorption. In general, the carbon adsorbents had much higher differential capacities than the zeolite adsorbents over the range of conditions tested. The 2 psig pressure capacities are lower than the corresponding 100 psig capacities, so the best adsorbent for a 90/10 mixture over the interval of 40-60° C. is identified from the data at 100 psig. This adsorbent (Calgon) is further tested at 200, 300, and 400 psig. Performance at these higher pressures shows no significant increase in differential capacity as compared to the 100 psig performance.

The values of adsorbent capacity reported here for methane and nitrogen on the PICA carbon are somewhat different that those reported previously. The new data are taken after making improvements in the testing system.

TABLE 4

Carbon sorbent capacities measured over a range of temperature and feed mixture compositions at near ambient pressure.

| Carbon sorbents-2 psig | | | Barnaby-Sutcliffe | | Calgon | | PICA | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 6 | 100 | 900 | 6.5 | 10.1 | — | — | — | — |
| 6 | 500 | 500 | 19.7 | 7.7 | 16.4 | 6.4 | 18.2 | 7.6 |
| 6 | 900 | 100 | 26.7 | 2.5 | 23.6 | 1.9 | 24.6 | 2.1 |
| 23 | 100 | 900 | 3.8 | 5.7 | — | — | — | — |
| 23 | 500 | 500 | 12.3 | 4.8 | 11.4 | 4.2 | 13.3 | 6.3 |
| 23 | 900 | 100 | 18.2 | 1.4 | 16.1 | 1.3 | 16.9 | 1.6 |
| 40 | 100 | 900 | 2.3 | 3.2 | — | — | — | — |
| 40 | 500 | 500 | 9.4 | 2.8 | 7.8 | 4.3 | 8.4 | 5.0 |
| 40 | 900 | 100 | 12.3 | 0.9 | 9.5 | 1.0 | 10.9 | 1.3 |
| 60 | 100 | 900 | 1.7 | 4.3 | — | — | — | — |
| 60 | 500 | 500 | 5.1 | 2.4 | 4.8 | 2.9 | 4.9 | 2.9 |
| 60 | 900 | 100 | 8.3 | 0.5 | 7.1 | 0.8 | 5.7 | 0.9 |

TABLE 5

Carbon adsorbent capacities measured at 100 psig

| Carbon sorbents-100 psig | | | Barnaby-Sutcliffe | | Calgon | | PICA | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 6 | 100 | 900 | 16.5 | 40.7 | — | — | — | — |
| 6 | 500 | 500 | 55.5 | 27.1 | 44.4 | 22.5 | 54.9 | 28.6 |
| 6 | 900 | 100 | 75.7 | 6.1 | 63.0 | 5.0 | 75.0 | 5.9 |
| 23 | 100 | 900 | 12.4 | 32.1 | — | — | — | — |
| 23 | 500 | 500 | 44.2 | 25.6 | 36.0 | 18.7 | 40.0 | 18.9 |
| 23 | 900 | 100 | 57.8 | 5.1 | 54.6 | 4.1 | 59.6 | 4.3 |
| 40 | 100 | 900 | 8.6 | 24.9 | — | — | — | — |
| 40 | 500 | 500 | 36.9 | 22.8 | 31.7 | 17.6 | 28.9 | 13.3 |

TABLE 5-continued

Carbon adsorbent capacities measured at 100 psig

| | Carbon sorbents-100 psig | | Barnaby-Sutcliffe | | Calgon | | PICA | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 40 | 900 | 100 | 48.1 | 4.4 | 41.6 | 3.5 | 42.9 | 2.6 |
| 60 | 100 | 900 | 7.5 | 22.2 | — | — | — | — |
| 60 | 500 | 500 | 28.0 | 18.4 | 23.4 | 10.7 | 25.3 | 11.1 |
| 60 | 900 | 100 | 39.6 | 3.8 | 31.8 | 2.5 | 35.3 | 2.6 |

TABLE 6

Measured Calgon carbon sorbent capacities as a function of temperature and mixture composition for 200, 300, and 400 psig bed pressures.

| | Calgon carbon-high P | | 200 psig | | 300 psig | | 400 psig | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 6 | 500 | 500 | 52.1 | 29.8 | 66.5 | 40.0 | 76.1 | 45.1 |
| 6 | 900 | 100 | 66.2 | 6.3 | 91.4 | 8.5 | 112.7 | 10.2 |
| 23 | 500 | 500 | 41.8 | 23.8 | 51.2 | 34.2 | 65.5 | 39.5 |
| 23 | 900 | 100 | 63.1 | 5.4 | 81.3 | 7.5 | 95.2 | 8.4 |
| 40 | 500 | 500 | 35.3 | 22.0 | 43.2 | 26.7 | 50.5 | 31.7 |
| 40 | 900 | 100 | 51.5 | 4.6 | 70.2 | 6.3 | 87.5 | 8.3 |
| 60 | 500 | 500 | 33.2 | 18.4 | 39.4 | 25.8 | 54.6 | 32.9 |
| 60 | 900 | 100 | 45.4 | 3.8 | 63.3 | 5.3 | 84.6 | 7.4 |

TABLE 7

Zeolite adsorbent capacities measured over a range of temperature and feed mixture compositions at near ambient pressure.

| | Zeolites, 2 psig | | Z-10-02 | | Z-10-06 | | Alpha Aesar | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 6 | 500 | 500 | 5.5 | 3.3 | 5.7 | 5.5 | 4.7 | 4.2 |
| 6 | 900 | 100 | 7.5 | 1.2 | 8.2 | 1.4 | 6.9 | 0.9 |
| 23 | 500 | 500 | | | 3.6 | 2.6 | 3.1 | 2.2 |
| 23 | 900 | 100 | | | 6.4 | 0.8 | 4.7 | 0.4 |
| 40 | 500 | 500 | 1.8 | 1.4 | 3.2 | 2.0 | 2.4 | 1.8 |
| 40 | 900 | 100 | 2.1 | 1.3 | 4.1 | 1.0 | 2.5 | 0.3 |
| 60 | 500 | 500 | | | 1.5 | 1.6 | 1.0 | 0.9 |
| 60 | 900 | 100 | | | 2.5 | 0.6 | 1.2 | 0.2 |

TABLE 8

Zeolite adsorbent capacities measured at 100 psig

| | Zeolites, 100 psig | | Z-10-02 | | Z-10-06 | | Alpha Aesar | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 6 | 500 | 500 | 24.5 | 14.2 | 24.7 | 14.7 | 21.7 | 13.7 |
| 6 | 900 | 100 | 36.0 | 4.4 | 39.1 | 4.5 | 34.0 | 3.4 |
| 23 | 500 | 500 | | | 18.6 | 13.9 | 16.8 | 9.2 |
| 23 | 900 | 100 | | | 28.0 | 3.2 | 28.2 | 2.4 |
| 40 | 500 | 500 | 15.5 | 9.3 | 15.8 | 8.9 | 12.4 | 7.1 |
| 40 | 900 | 100 | 23.7 | 2.1 | 24.3 | 2.1 | 20.9 | 1.7 |

TABLE 8-continued

Zeolite adsorbent capacities measured at 100 psig

| | Zeolites, 100 psig | | Z-10-02 | | Z-10-06 | | Alpha Aesar | |
|---|---|---|---|---|---|---|---|---|
| Temp (C.) | CH4 flow (sccm) | N2 Flow (sccm) | CH4 Capacity (mg/g) | N2 Capacity (mg/g) | CH4 Capacity (mg/g) | N2 Capacity (mg/g) | CH4 Capacity (mg/g) | N2 Capacity (mg/g) |
| 60 | 500 | 500 | | | 13.4 | 8.7 | — | — |
| 60 | 900 | 100 | | | 22.5 | 2.0 | — | — |

Methane upgrading may involve upgrading coal-bed methane to pipeline quality. This process, as shown in FIG. 15, may comprise six steps: process compression, dehydration, nitrogen rejection, oxygen removal, carbon dioxide rejection and sales compression. Below is a simplified diagram showing the basic processing steps.

The process may be modeled in detail using ChemCAD, a process simulation software package. The resulting process flow diagram and stream table are shown below. The case displayed assumes that NRU can achieve 90% recovery, the target recovery and system design point.

The methane upgrading system requires two separate gas compression operations. To enter the process the gob gas stream must be pressurized from 1 to approximately 120 psig. Then after the final upgrading processing step ($CO_2$ removal), the product gas must again be compressed to 600 psig to enter the sales natural gas pipeline.

The feed compressor requires two stages and approximately 250 horsepower to compress the entire 3 MMSCFD of sub-quality gas. The estimated cost of this unit, including inter and after coolers, vapor-liquid separators and associated auxiliary equipment may be relatively high.

Sales compression may be less costly for two reasons. First, only one stage is required to raise the pressure of a gas stream from 100 psig (after a 20 psi loss through the upgrading system) to 600 psig. Second, the quantity of gas remaining after the processing steps is less than 2 MMSCFD. The large volume reduction is due to the removal of sub-quality components, such as nitrogen and carbon dioxide, and the loss of some methane.

Compression may reduce the concentration of water vapor to the dew point (saturation) at the inlet to the removal stage; for example the water vapor dew point at 600 psig is 78° C. (172° F.) and 0.47 mole percent. Therefore addition dehydration is needed to meet the pipeline specification of −40° C. dew point (0.00039 mole percent water vapor). Typically molecular sieves may be used to remove water vapor from natural gas processes and represent a commercial basis for this unit operation.

The TSA system may cycle between about 40 and about 60° C. every two seconds, one second per phase, and achieve a methane recovery rate of about 90 percent. The tail gas, containing the remaining 10 percent of the methane may be used to provide the energy needed to swing the adsorber temperature. The operating pressure may be about 120 psig and the predicted system pressure drop may be about 10 psig.

A significant fraction of the oxygen may be removed with the nitrogen in the NRU. However, a separate oxygen removal unit operation may be included. Catalytic combustion of methane and oxygen may be expected to reduce the oxygen concentration below the specified concentration of 10 parts per million (ppm) for pipeline natural gas.

An amine carbon dioxide ($CO_2$) removal system may be used for natural gas and petrochemical processing. This represents a commercial basis for this unit operation.

A mathematical model may be developed to simulate a multi-stage nitrogen recovery unit (NRU). A series of runs are performed on the model with the following objectives:

To determine key parameters governing energy requirements for NRU.

To design system to deliver required energy to NRU.

Figure 36:
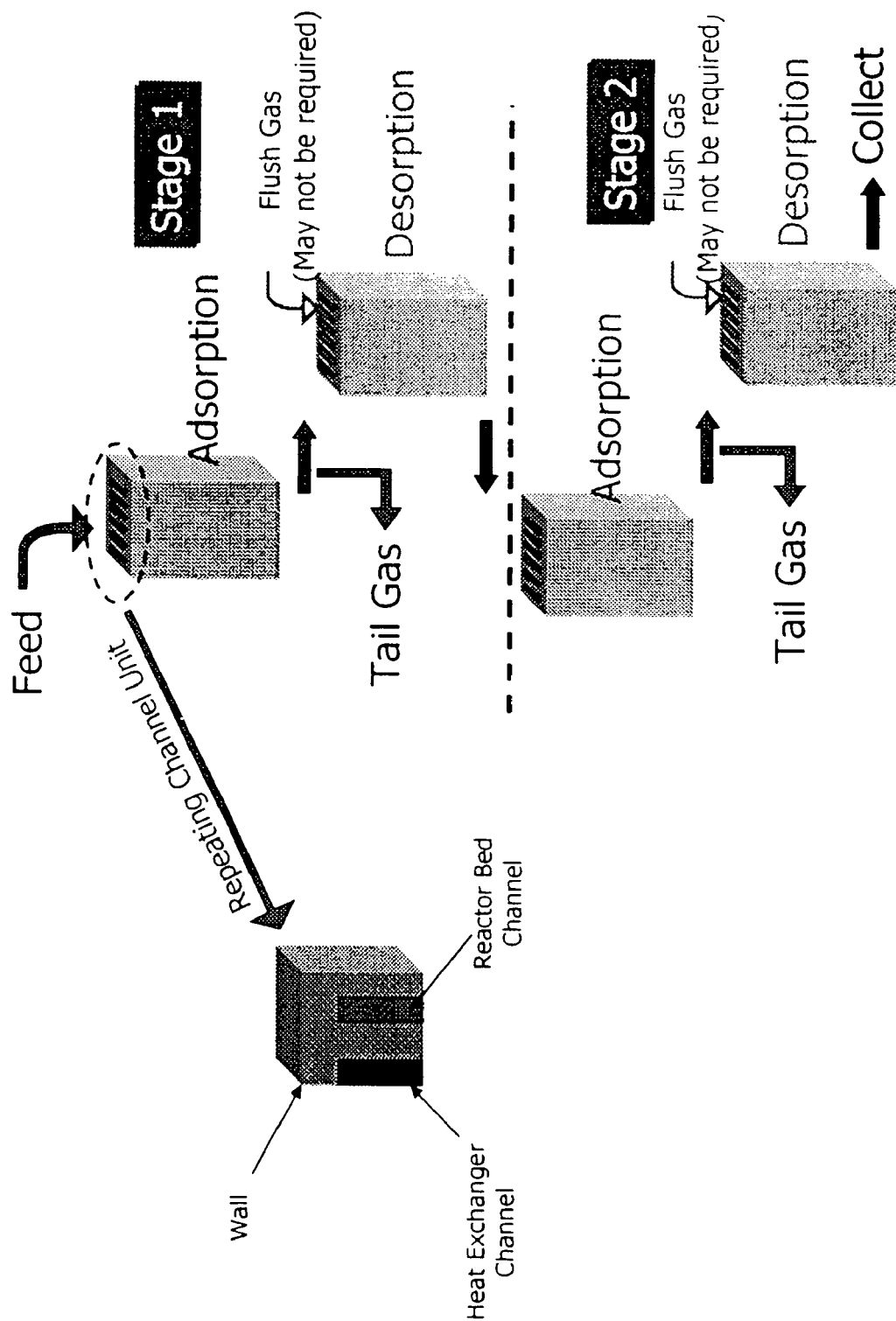
FIG. 36 is a schematic illustration of a nitrogen rejection unit.

FIG. 36 shows the schematic of an NRU system. A theoretical NRU has channels housing adsorbent material adjacent to heat exchange channels. The heat exchange channels are used to swing the bed temperature between the adsorbing and desorbing temperature state. The feed gas enters the low temperature adsorbent section of the NRU to preferentially adsorb methane. A nitrogen rich exhaust stream, labeled 'tail gas', is rejected out of the unit prior to breakthrough of the product methane. After the adsorber unit is filled to capacity with methane, the device is heated to desorb methane. In order to flush removed methane out of the box, a small quantity of "flush gas" may be flowed, but this may not be necessary. The methane released from the desorption cycle may become the feed for the next stage or collected as product if sufficient purity is attained.

The inputs to the computational NRU model are:

Channel dimensions

Adsorbent Characteristics

Inlet Feed gas composition and outlet methane flow rate

Adsorption/desorption temperature and cycle time

Construction material of box

By varying the following inputs, two potential NRU design concepts are developed. The first, called 'early entry,' requires more energy to swing the temperature of the adsorbent bed but is expected to be a more straight-forward development effort. The second, which uses an engineered form of the adsorbent material, is expected to have a longer development effort, but may result in improved methane recovery and reduced energy consumption. The specifics of each concept are presented in Table 9.

TABLE 9

NRU process performance targets and anticipated performance

| | Early Entry | Engineered Form |
|---|---|---|
| Material of Construction | Stainless Steel | Porous Carbon Engineered |
| Adsorbent Form | Powdered | Form/Stainless Steel Composite |
| Cycle Time | 1 to 5 seconds | 1 to 3 seconds |
| Energy Requirement | 1.5 MW | 408 kW |
| Methane Recovery | 80% | 95% |

Integral pieces of the NRU are the heating and cooling systems that permit the rapid temperature swings. A schematic of these systems is shown in FIG. 17.

The system may be fueled by methane in the tail gas, which is combusted with air to provide heat to desorb the bed. An efficiency of 70% is assumed for heat transfer from combusted gas to the nitrogen rejection unit. Achieving this energy efficiency may require the use of efficient microchannel exchangers. The heat from the combusted gases is transferred to a circulating fluid which flows through the NRU system to provide heat to the desorption cycle.

Other sources of heat, such as inter-stage and/or after coolers on the compression equipment, may also be used to affect the thermal swing. If these other sources can be tapped, then a further reduction in the amount of tail gas methane required for the desorption cycle is possible.

The adsorber and the desorber units may be designed for a total capacity of 3 MMSCFD of gas fed to the NRU system. Below are assumptions that may be used for designing an adsorber and desorber unit:

Adsorbent characteristics for the selected granular carbon:
1. Differential capacity of $CH_4$=0.01 gram (gm)/gm
2. Differential capacity of $N_2$=0.0003 gm/gm
3. Particle size=315 micrometers
4. Heat Capacity=1,260 Joule/kilogram/° C.
5. Bed Density=540 kg/cubic meter
6. Void fraction=0.4.

Figure 37:
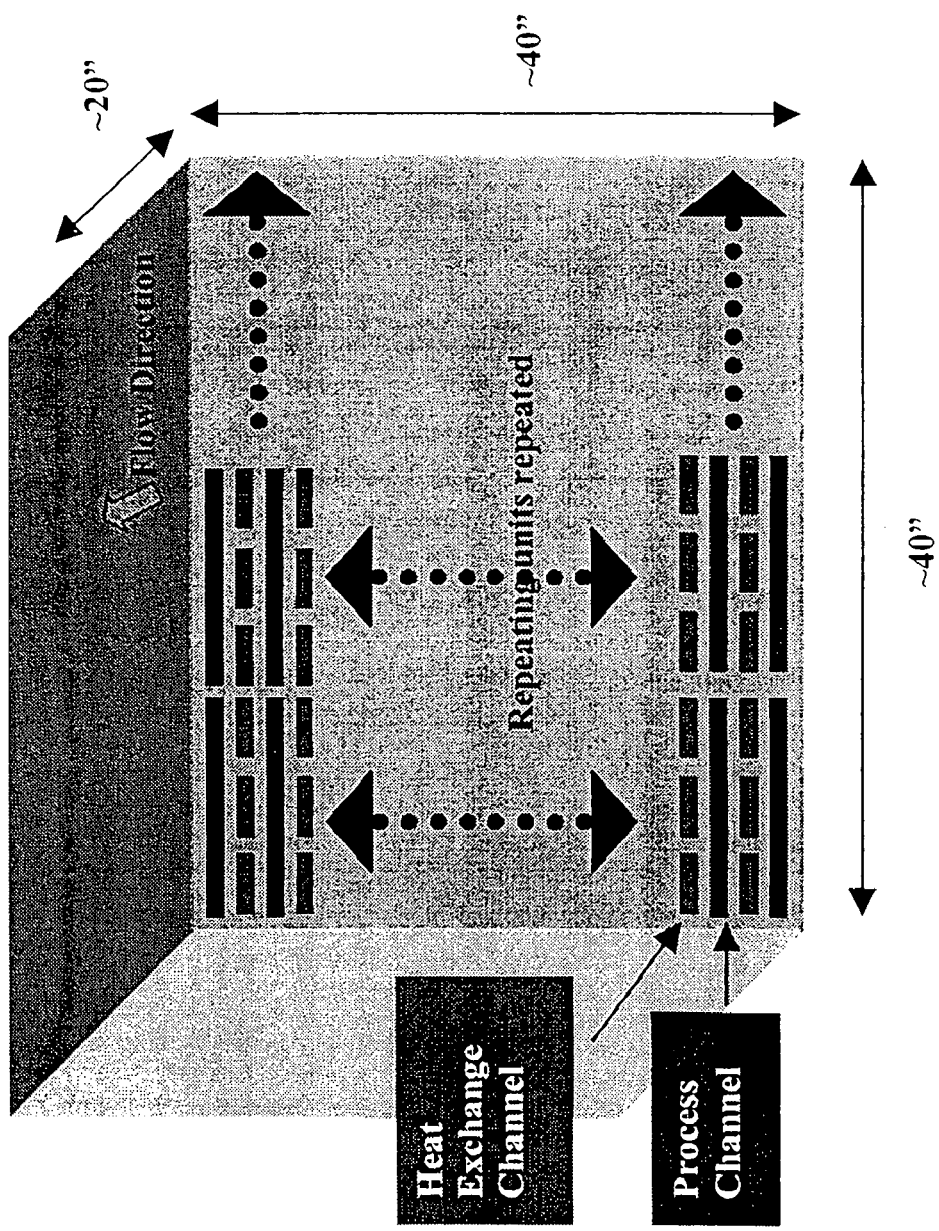
FIG. 37 is an illustration of an adsorber/desorber unit, where the sorption process microchannels are the longer slots interleaved between heat exchange microchannels

Feed gas design basis:
1. Molar composition: 70% $CH_4$, 30% $N_2$ at inlet
2. Adsorber temperature=40° C.
3. Desorber temperature=60° C.
4. Process pressure=100 psig
5. The desorbed gas is removed from the channels by pressure differential The adsorber and the desorber may be designed to withstand a total absolute pressure of 150 psig and differential pressure of 70 psi. The material of construction may be Stainless Steel 304L. FIG. 37 shows a drawing of the adsorber and desorber unit.

The drawing shown in FIG. 37 is illustrative and is not to scale. The overall dimension of the unit may be ~40" (width)× ~40" (height)×~20" (flow length). The unit has parallel process and heat exchange channels. Both the process and heat exchange channels have a microchannel gap on the order of 1000 microns. The process channel contains an adsorbent bed to adsorb methane from the process gas. The heat exchange channels heats and cools on adjacent sides of the adsorbent channel to adsorb and desorb methane.

The design basis feed gas may be a mixture of 70% methane and 30% nitrogen. The adsorber operating temperature may be approximately 40° C., while the desorber operating temperature is approximately 60° C.

The design performance of the adorber/desorber unit may be
1. Purity of the product=96%
2. Recovery of methane=90%
3. Cycle time=4 seconds
4. Number of stages required=1
5. Energy required to swing the temperature of the unit=1.65 megawatts (MW)

The energy requirement of the box to swing temperature may be obtained by combustion of the tail gas (assuming 70% energy transfer efficiency).

Water may be used as coolant for heat exchange channels to provide and remove heat from the box for desorption and adsorption, respectively. The total flow rate of water required may be 20 kg/second. A schematic of heating and cooling system is shown in FIG. 17.

The possible greenhouse gas (GHG) emission reduction may be measured by installing an ultra-fast TSA NRU system using the global warming potential (GWP) methodology. This technique evaluates the relative atmospheric warming potential of a variety of greenhouse gases relative to the potential of carbon dioxide, the most abundant GHG. The time horizon used for these calculations is 100 years, which gives methane a GWP factor of 21.

The same basis used for the design and cost study is used to calculate the GWP advantage for a coal-mine methane project using the NRU. The results of these calculations are shown in Table 10 below. Assuming that 600 MMSCFD of gas upgrading facilities are built each year in the five years from 2007, approximately 3 billion SCFD may be on-line in 2012. The resulting greenhouse gas abatement would be equivalent to decreasing carbon dioxide emissions by 148 million metric tons per year, or approximately 2% of the U.S. total.

TABLE 10

Greenhouse gas emission comparison

| Scenario | Vented Gas | Gas Utilization |
|---|---|---|
| Inlet gas flow rate | 3 MMSCFD | 3 MMSCFD |
| $CH_4$ Released to Environment (kg/year) | $1.42 \times 10^7$ | 0 |
| $CO_2$ Released to Environment (kg/year) | $2.24 \times 10^6$ | $6.55 \times 10^6$ |
| Global Warming Potential (equivalent kg $CO_2$/year) | $3.01 \times 10^8$ | $6.55 \times 10^6$ |
| Savings(equivalent kg $CO_2$/yr and metric tons/year) | | $2.95 \times 10^8$ (148,000) |

Figure 38:
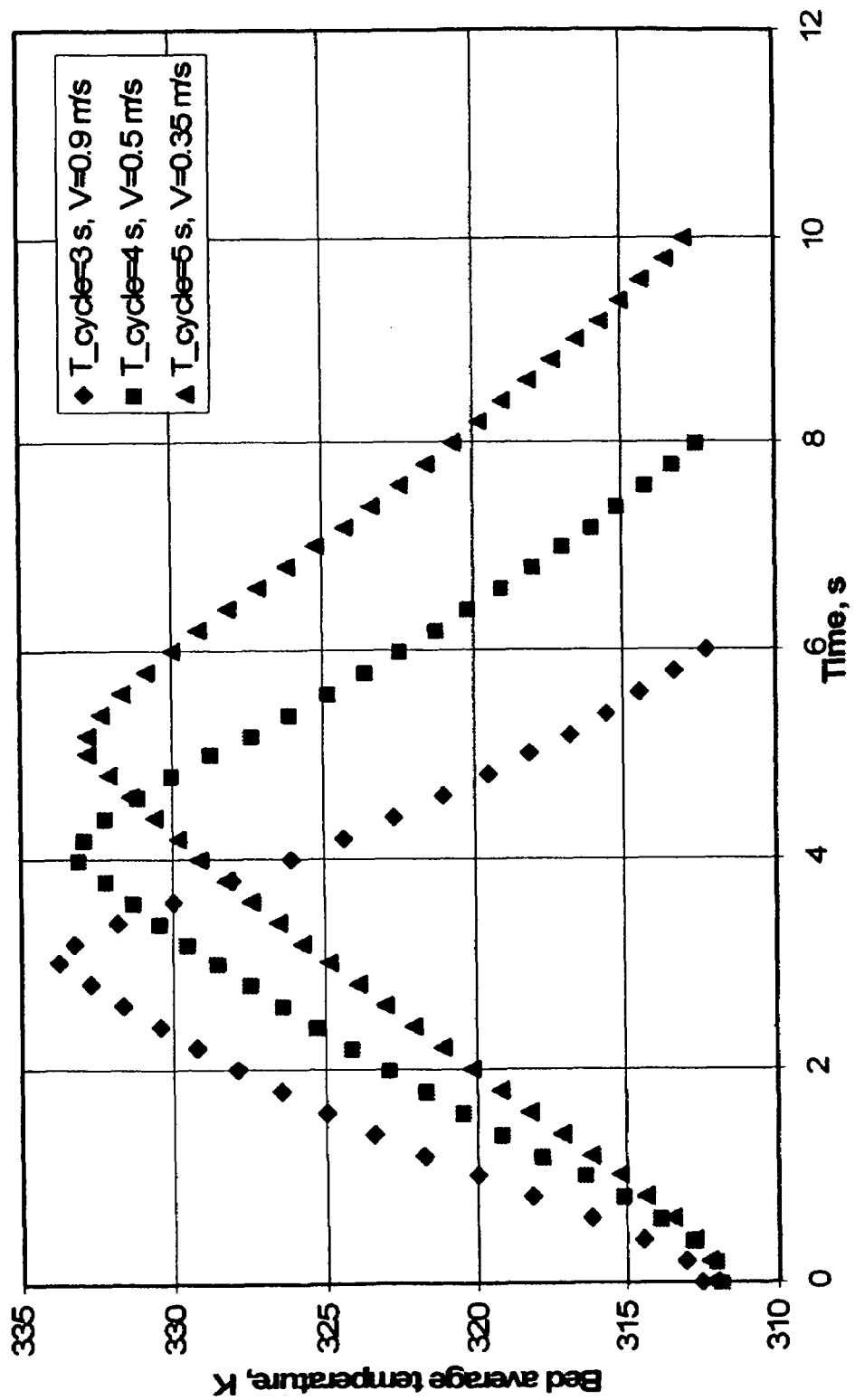
FIG. 38 is a plot showing average adsorbent bed temperature as a function of cycle time and heat exchange flowrate.
Figure 39:
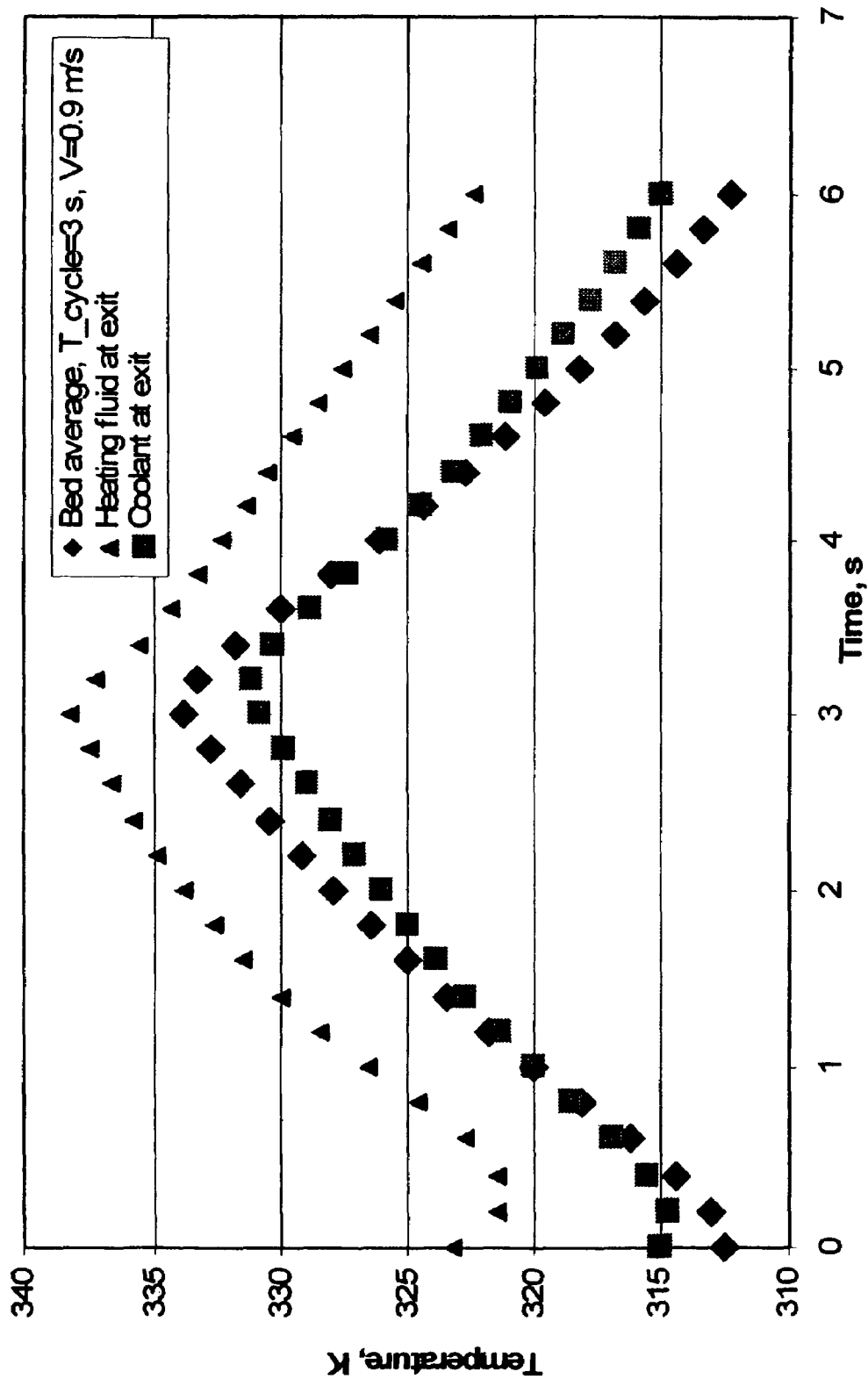
FIG. 39 is a plot showing a comparison of temperatures in an adsorbent bed and coolants for the case of a three second cycle.

A dynamic numerical model may be developed to study the impact of design variables on the time required to thermally swing the adsorbent unit. For the selected adsorbent and channel geometry, the predicted cyclic thermal profile in the adsorbent bed may be shown as a function of the heating and cooling medium flow rate. The selected system cycle time of 4 seconds requires a water flow rate of 0.5 meters per second in adjacent microchannels. This is shown in FIGS. 38 and 39.

A capacity of about 10 milligram [mg]/gm methane and<1 mg/gm N2 appears feasible.

Adsorbent kinetics or time for equilibration within the granular carbon also appears feasible. The selected particle size is on average 315 microns in diameter. The time for gas-phase diffusion from the surface to the interior active sites is calculated to be on the order of 1 millisecond, while the gas spends more than a second in the adsorbent channel. The resulting time difference of two or three orders of magnitude suggests the adsorbate molecules should have sufficient time for equilibration within the adsorbent particle.

Diffusion time is estimated as the square of the longest diffusion distance divided by the diffusivity. The diffusivity for this mixture at temperature and pressure is estimated to be roughly 0.23 square centimeters per second using the Wilke equation. The longest transport distance is the particle radius, or 0.0158 centimeter. The resulting effective time for diffusion within a particle is estimated to be 1.1 milliseconds.

In regard to manufacturability of the NRU design, the proposed design may,conform to standards for feature size formation, tolerance allowances for subsystems and assembly, and metal joining requirements for either diffusion bonding or metal brazing. Loading and refurbishment of the granular adsorbent may conform to standards for granular catalyst systems.

Two NRU sub-systems are evaluated: a stand-alone case and an integrated case that shares chilled water with the upstream dehydration sub-system and heating with an adjacent power cogeneration plant. Significant cost, energy, and environmental advantages may result from an integrated system.

Figure 40:
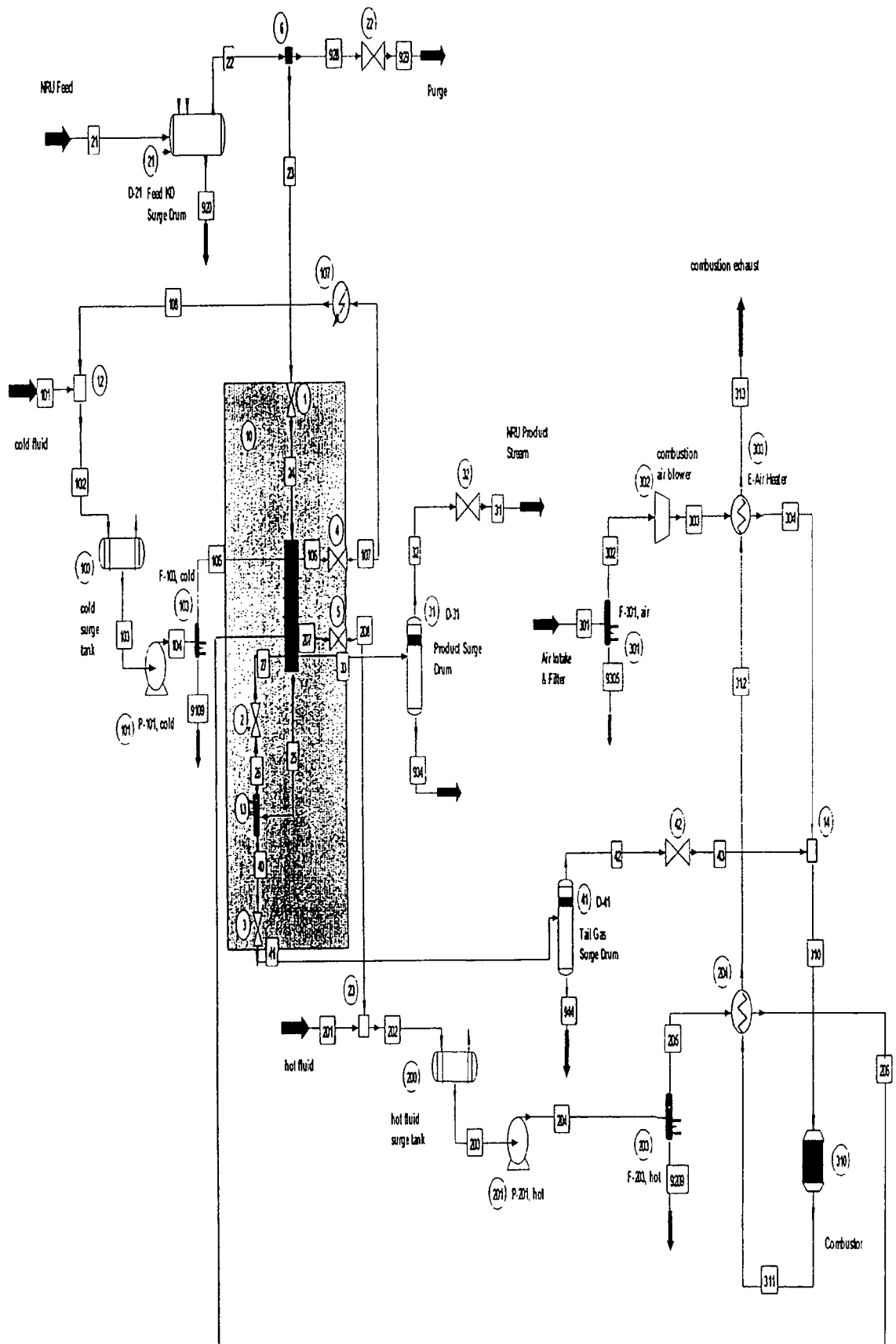
FIG. 40 is a process flow diagram for a stand-alone nitrogen rejection unit subsystem.

A process flow diagram for a stand-alone NRU subsystem is presented as FIG. 40 and is the basis for the heat and mass balance calculations. The feed stream is compressed and dehydrated before entering the NRU subsystem. The NRU cycles between adsorbing and desorbing the methane ($CH_4$). The process design treats the NRU sub-system as a continuous-flow, steady-state device although it cycles between adsorbing and desorbing two reactors/vessels.

Cooling fluid reduces the process temperature to 40° C. during the adsorption cycle. Unrecovered $CH_4$, $CO_2$, $N_2$ and $O_2$ exit as rejected tail gas during this cycle. The valve sequence stops cooling fluid flow and feed to the first box and starts heating fluid flow for the desorption cycle to produce NRU product at 60° C. Table 11 lists the valve positions. The cooling and heating fluids are assumed to be water.

TABLE 11

| | | Valve positions | |
|---|---|---|---|
| Stream | Valve # | Adsorber (Desorber) #1 | Desorber (Adsorber) #2 |
| Feed | 1 | Open | Closed |
| Product | 2 | Closed | Open |
| Tail Gas | 3 | Open | Closed |
| Cooling Fluid | 4 | Open | Closed |
| Heating Fluid | 5 | Closed | Open |

Surge tanks provide buffer capacity to stabilize flows during the valve cycling. NRU product proceeds to the $O_2$ and $CO_2$ removal sub-systems for further processing and purification.

The following Table 12 contains the process flow diagram stream data for key streams within the stand-alone NRU. Methane recovery is 90% for the NRU. Other constituents, such as $CO_2$, $N_2$ and $O_2$, are separated at specific separation factors that require experimental validation. The tail gas is used as fuel to a conventional packaged boiler (hot water heater) for the heating fluid and heat recovery/integration with the overall system. The specific combustor design will establish the quantity of excess air that may be needed and the resulting combustion exhaust temperature.

TABLE 12

Heat and Mass Balance Calculations for Selected Streams

| | Stream No. | | | | | | | | | | | | |
|---|---|---|---|---|---|---|---|---|---|---|---|---|---|
| | 21 | 24 | 25 | 27 | 33 De- | 31 | 41 | 43 | 105 Cool- | 106 | 107 | 108 |
| Name | NRU Feed | NRU Feed | Cooled Feed | Adsorbed Feed | sorbed Product | Product | Tail Gas | Tail Gas | ing Fluid | | Cold Fluid | |
| Overall | 0 | 0 | 0 | 0 | 0 | 0 | 0 | 0 | 0 | 0 | 0 | 0 |
| Molar flow kmol/h | 155.5 | 155.5 | 155.5 | 104.53 | 104.53 | 104.53 | 50.97 | 50.97 | 3600.8 | 3600.7 | 3600.7 | 3600.7 |
| Mass flow kg/h | 3143.23 | 3143.23 | 3143.23 | 1807.14 | 1807.14 | 1807.14 | 1336.1 | 1336.1 | 64868.43 | 64866.62 | 64866.62 | 64866.62 |
| Temp C. | 48.9 | 48.88 | 40 | 39.97 | 60 | 59.98 | 39.98 | 38.55 | 30.02 | 51.39 | 51.39 | 30 |
| Pres psia | 123 | 122 | 113 | 112 | 111 | 110 | 112 | 28 | 30 | 29 | 20 | 19 |
| Vapor mole fraction | 1 | 1 | 1 | 1 | 1 | 1 | 1 | 1 | 0 | 0 | 0 | 0 |
| Enth MMBtu/h | −9.3762 | −9.3762 | −9.4211 | −8.3248 | −8.2507 | −8.2507 | −1.0967 | −1.0967 | −974.87 | −969.34 | −969.34 | −974.85 |
| Average mol wt | 20.21 | 20.21 | 20.21 | 17.29 | 17.29 | 17.29 | 26.21 | 26.21 | 18.01 | 18.01 | 18.01 | 18.01 |
| Vapor only | 0 | 0 | 0 | 0 | 0 | 0 | 0 | 0 | | | | |
| Actual dens lb/ft3 | 0.4 | 0.4 | 0.38 | 0.32 | 0.3 | 0.3 | 0.12 | 0.12 | 0 | 0 | 0 | 0 |
| Actual vol MMft3/day | 0.41 | 0.42 | 0.44 | 0.3 | 0.32 | 0.32 | 0.58 | 0.15 | 0 | 0 | 0 | 0 |
| Std vap 0 C MMscfd | 2.95 | 2.95 | 2.95 | 1.99 | 1.99 | 1.99 | 0.97 | 0.97 | 0 | 0 | 0 | 0 |
| Cp Btu/lbmol-F | 8.45 | 8.45 | 8.38 | 8.82 | 9 | 9 | 7.48 | 7.4 | 0 | 0 | 0 | 0 |
| Cp/Cv | 1.33 | 1.33 | 1.33 | 1.32 | 1.3 | 1.3 | 1.38 | 1.37 | | | | |
| Z factor | 0.9928 | 0.9929 | 0.9924 | 0.9891 | 0.9917 | 0.9918 | 0.998 | 0.9994 | | | | |
| Visc cP | 0.01424 | 0.01423 | 0.01391 | 0.01207 | 0.01271 | 0.01271 | 0.01741 | 0.01734 | | | | |
| Th cond Btu/hr-ft-F | 0.02 | 0.02 | 0.0193 | 0.0206 | 0.0223 | 0.0223 | 0.0167 | 0.0164 | | | | |
| Total kmol/h | 155.5 | 155.5 | 155.5 | 104.53 | 104.53 | 104.53 | 50.97 | 50.97 | 3600.8 | 3600.7 | 3600.7 | 3600.7 |
| Flowrates in kmol/h | 0 | 0 | 0 | 0 | 0 | 0 | 0 | 0 | 0 | 0 | 0 | 0 |
| Methane | 110 | 110 | 110 | 99 | 99 | 99 | 11 | 11 | 0 | 0 | 0 | 0 |
| Nitrogen | 33 | 33 | 33 | 0.33 | 0.33 | 0.33 | 32.67 | 32.67 | 0 | 0 | 0 | 0 |
| Carbon Dioxide | 4.5 | 4.5 | 4.5 | 3.6 | 3.6 | 3.6 | 0.9 | 0.9 | 0 | 0 | 0 | 0 |
| Oxygen | 8 | 8 | 8 | 1.6 | 1.6 | 1.6 | 6.4 | 6.4 | 0 | 0 | 0 | 0 |
| Water | 0 | 0 | 0 | 0 | 0 | 0 | 0 | 0 | 3600.8 | 3600.7 | 3600.7 | 3600.7 |
| Component mole fractions | | | | | | | | | | | | |
| Methane | 0.707 | 0.707 | 0.707 | 0.947 | 0.947 | 0.947 | 0.216 | 0.216 | 0 | 0 | 0 | 0 |
| Nitrogen | 0.212 | 0.212 | 0.212 | 0.003 | 0.003 | 0.003 | 0.641 | 0.641 | 0 | 0 | 0 | 0 |
| Carbon Dioxide | 0.029 | 0.029 | 0.029 | 0.034 | 0.034 | 0.034 | 0.018 | 0.018 | 0 | 0 | 0 | 0 |
| Oxygen | 0.051 | 0.051 | 0.051 | 0.015 | 0.015 | 0.015 | 0.126 | 0.126 | 0 | 0 | 0 | 0 |
| Water | 0 | 0 | 0 | 0 | 0 | 0 | 0 | 0 | 1 | 1 | 1 | 1 |
| Total kg/h | 3143.23 | 3143.23 | 3143.23 | 1807.14 | 1807.14 | 1807.14 | 1336.1 | 1336.1 | 64868.43 | 64866.62 | 64866.62 | 64866.62 |
| Flowrates in kg/h | 0 | 0 | 0 | 0 | 0 | 0 | 0 | 0 | 0 | 0 | 0 | 0 |
| Methane | 1764.73 | 1764.73 | 1764.73 | 1588.26 | 1588.26 | 1588.26 | 176.47 | 176.47 | 0 | 0 | 0 | 0 |
| Nitrogen | 924.46 | 924.46 | 924.46 | 9.24 | 9.24 | 9.24 | 915.22 | 915.22 | 0 | 0 | 0 | 0 |
| Carbon Dioxide | 198.04 | 198.04 | 198.04 | 158.44 | 158.44 | 158.44 | 39.61 | 39.61 | 0 | 0 | 0 | 0 |
| Oxygen | 255.99 | 255.99 | 255.99 | 51.2 | 51.2 | 51.2 | 204.79 | 204.79 | 0 | 0 | 0 | 0 |
| Water | 0 | 0 | 0 | 0 | 0 | 0 | 0 | 0 | 64868.43 | 64866.62 | 64866.62 | 64866.62 |

| | Stream No. | | | | | | | | |
|---|---|---|---|---|---|---|---|---|---|
| | 205 | 206 | 207 | 208 | 304 | 311 | 312 | 313 |
| Name | Inlet E-204 | Heating Fluid | | Hot Fluid | Preheated | | Hot Exhaust | Exhaust |

TABLE 12-continued

Heat and Mass Balance Calculations for Selected Streams

| Overall | | | | | | | |
|---|---|---|---|---|---|---|---|
| Molar flow kmol/h | 0 | 3600.6 | 0 | 0 | 0 | 0 | 0 |
| Mass flow kg/h | 3600.6 | 64864.82 | 3600.5 | 3600.5 | 300 | 350.97 | 350.97 | 350.97 |
| Temp C. | 64864.82 | 80.06 | 64863.01 | 64863.01 | 8655.25 | 9991.34 | 9991.34 | 9991.34 |
| Pres psia | 58.63 | 29 | 58.62 | 58.62 | 320.47 | 1020.35 | 538.58 | 370.47 |
| Vapor mole fraction | 30 | 0 | 28 | 20 | 29 | 23 | 22 | 21 |
| Enth MMBtu/h | 0 | −961.92 | 0 | 0 | 1 | 1 | 1 | 1 |
| Average mol wt | −967.45 | 18.01 | −967.43 | −967.43 | 2.4946 | 1.3621 | −4.1679 | −5.9748 |
| Vapor only | 18.01 | 0 | 18.01 | 18.01 | 28.85 | 28.47 | 28.47 | 28.47 |
| Actual dens lb/ft3 | 0 | 0 | 0 | 0 | 0 | 0 | 0 | 0 |
| Actual vol MMft3/day | 0 | 0 | 0 | 0 | 0.07 | 0.03 | 0.04 | 0.05 |
| Std vap 0 C MMscfd | 0 | 0 | 0 | 0 | 6.28 | 20.18 | 13.24 | 11 |
| Cp Btu/lbmol-F | 0 | 0 | 0 | 0 | 5.7 | 6.67 | 6.67 | 6.67 |
| Cp/Cv | 0 | 0 | 0 | 0 | 7.29 | 8.56 | 7.87 | 7.56 |
| Z factor | 0 | 0 | 0 | 0 | 1.38 | 1.3 | 1.34 | 1.36 |
| Visc cP | 0 | 0 | 0 | 0 | 1.0009 | 1.0004 | 1.0005 | 1.0006 |
| Th cond Btu/hr-ft-F | 0 | 0 | 0 | 0 | 0.03034 | 0.05028 | 0.03674 | 0.03121 |
| Total kmol/h | 3600.6 | 0 | 3600.5 | 3600.5 | 0.0262 | 0.0503 | 0.0341 | 0.028 |
| Flowrates in kmol/h | | | | | 300 | 350.97 | 350.97 | 350.97 |
| Methane | 0 | 0 | 0 | 0 | 0 | 0 | 0 | 0 |
| Nitrogen | 0 | 0 | 0 | 0 | 237 | 269.67 | 269.67 | 269.67 |
| Carbon Dioxide | 0 | 0 | 0 | 0 | 0 | 11.9 | 11.9 | 11.9 |
| Oxygen | 0 | 0 | 0 | 0 | 63 | 47.4 | 47.4 | 47.4 |
| Water | 3600.6 | 0 | 3600.5 | 3600.5 | 0 | 22 | 22 | 22 |
| Component mole fractions | | | | | | | | |
| Methane | 0 | 0 | 0 | 0 | 0 | 0 | 0 | 0 |
| Nitrogen | 0 | 0 | 0 | 0 | 0.79 | 0.768 | 0.768 | 0.768 |
| Carbon Dioxide | 0 | 0 | 0 | 0 | 0 | 0.034 | 0.034 | 0.034 |
| Oxygen | 0 | 0 | 0 | 0 | 0.21 | 0.135 | 0.135 | 0.135 |
| Water | 1 | 1 | 1 | 1 | 0 | 0.063 | 0.063 | 0.063 |
| Total kg/h | 64864.82 | 64864.82 | 64863.01 | 64863.01 | 8655.25 | 9991.34 | 9991.34 | 9991.34 |
| Flowrates in kg/h | | | | | | | | |
| Methane | 0 | 0 | 0 | 0 | 0 | 0 | 0 | 0 |
| Nitrogen | 0 | 0 | 0 | 0 | 6639.32 | 7554.53 | 7554.53 | 7554.53 |
| Carbon Dioxide | 0 | 0 | 0 | 0 | 0 | 523.72 | 523.72 | 523.72 |
| Oxygen | 0 | 0 | 0 | 0 | 2015.94 | 1516.75 | 1516.75 | 1516.75 |
| Water | 64864.82 | 64864.82 | 64863.01 | 64863.01 | 0 | 396.34 | 396.34 | 396.34 |

Figure 41:
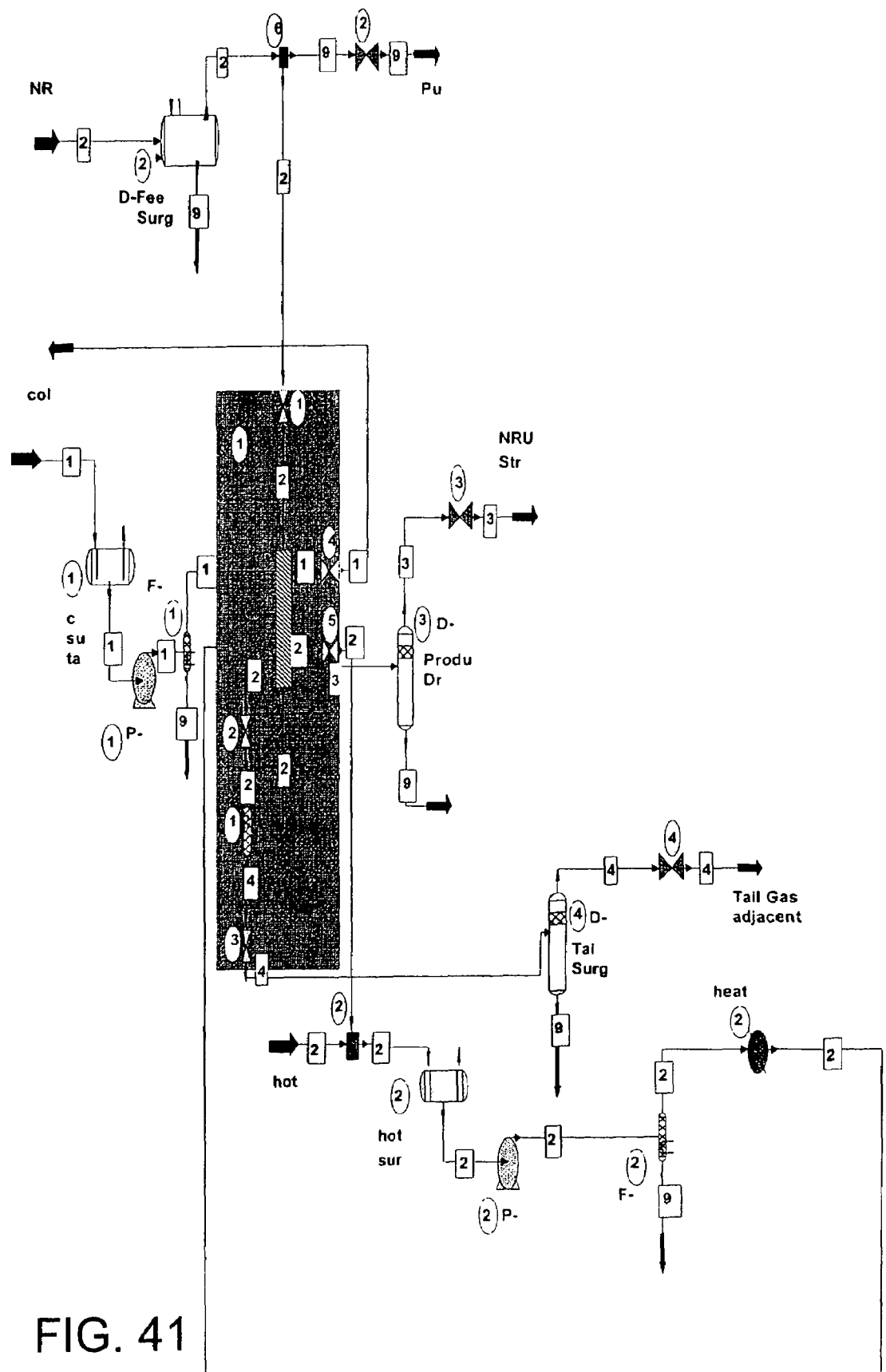
FIG. 41 is a process flow diagram for a nitrogen rejection unit integrated with other process equipment available at a gas upgrading project site.

An NRU integrated with the other process equipment available at a gas upgrading project site is shown in FIG. 41. The feed stream is compressed and dehydrated before entering the NRU subsystem. NRU product continues to the $O_2$ and $CO_2$ removal subsystems.

In the integrated plant, the cooling fluid for the NRU adsorption cycle is from a chiller that supplies the dehydration subsystem. The cost for incremental capacity of chilled water is advantageous rather than buying two independent chillers. Operating the cooling fluid at 5° C. (40° F.) is also favorable for TSA performance.

Tail gas from the NRU has a heating value of approximately 230 Btu/SCF and may be mixed with feed gas (70% $CH_4$, heating value of 700 Btu/SCF) as fuel to an engine-driven generator. On-site generation of electricity can be cost-effective with low-cost fuels as a site-specific evaluation. The estimated power requirement for a 3 MMSCFD gob gas upgrade system is estimated to be 1,200 horsepower to operate compressors, chillers, pumps, and auxiliary equipment. The exhaust from an engine-driven generator would heat water to 80° C. (176° F.) as the NRU heating fluid in exchanger E-204. This integration eliminates the combustor and associated equipment from the stand-alone case.

Coal mines are typically in remote locations with limited available electrical power. Many remote locations justify on-site power generation, especially with low-cost fuel, rather than paying for power distribution and the associated electrical operating costs. Carbon dioxide reduction credits may apply since this represents a more energy efficient and environmentally acceptable solution than venting the tail gas as is practiced for some NRU technologies.

Other advantages of the TSA sub-system include
- Less compressor power is required because the NRU product methane exits at essentially the same pressure as the NRU feed.
- Methane in the tail gas is used as fuel rather than vented to atmosphere.
- Flow is in one direction, which avoids the dynamic stability issues of reverse flow as practiced by some competing technologies.

In one embodiment, a capacity of about 10 milligram [mg]/gm methane and <1 mg/gm N2 may be feasible for obtaining process performance. A dynamic numerical model may be developed to study the impact of design variables on the time required to thermally swing the adsorbent unit. Selecting a system cycle time of 4 seconds requires a water flow rate of 0.5 meters per second in adjacent microchannels.

Adsorbent kinetics or time for equilibration within the granular carbon also appears feasible. The selected particle size may be on average 315 microns in diameter. The time for gas-phase diffusion from the surface to the interior active sites may be calculated to be on the order of 1 millisecond, while the gas spends more than a second in the adsorbent channel. The resulting time difference of two or three orders of magnitude may suggest that the adsorbate molecules should have sufficient time for equilibration within the adsorbent particle.

EXAMPLE 4

Figure 42:
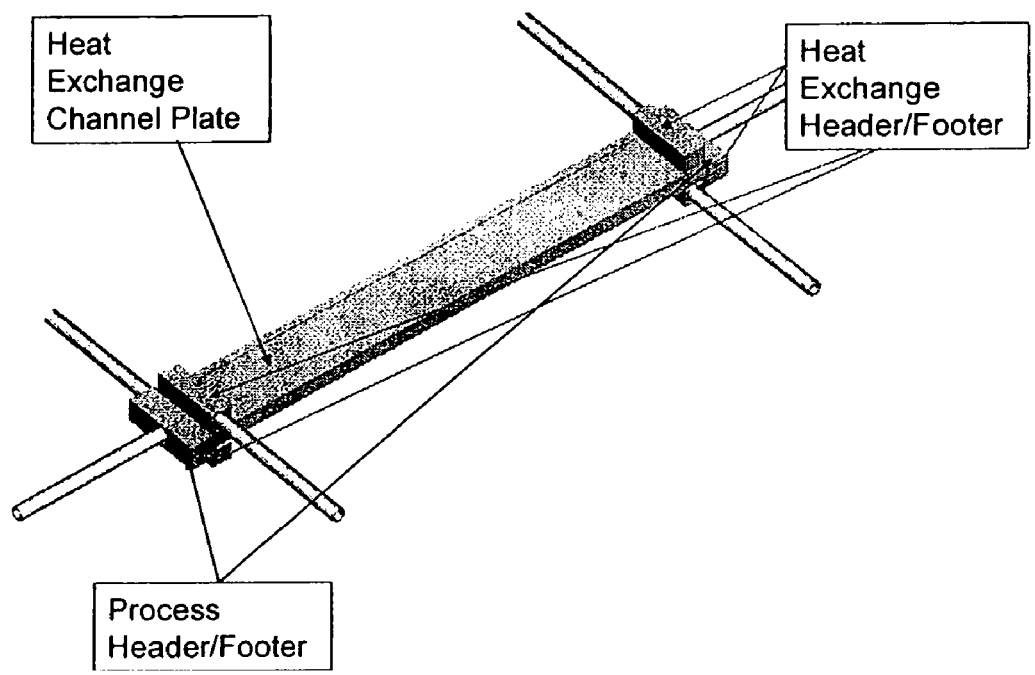
FIG. 42 is a schematic illustration of a bench-scale microchannel separation unit.

A bench-scale device, as illustrated in FIG. 42 includes a central process microchannel with heat exchange channels on both sides. Thin stainless steel walls separate the process channel from the heat exchange channels to minimize thermal mass and conduction path. Operating pressure in the process channel is higher than the heat exchange channel pressure. The heat exchange channel is divided into several smaller channels to provide ribs to support the wall and reduce stress due to the pressure differential. T-shaped longitudinal supports form the side walls of the process channel and determine the channel height and length. The heat exchange channels are machined into aluminum plates with connecting holes to individual manifolds.

The longitudinal supports, walls, and heat exchange plates are joined. The openings in the T-shaped longitudinal supports and the angled grooves in the heat exchange plates provide sufficient joint area. An additional C-shaped member is joined along the length to provide additional support and reduce joint stresses.

Process manifolds fit over the ends of the bonded plate and C-channel assembly. Heat exchange manifolds are attached to the heat exchange plates. Flow through the heat exchange manifold is in a Z-configuration on both sides. Flow on one side is independent of flow on the other side. Tubing connections are used to the system valves.

Figure 43:
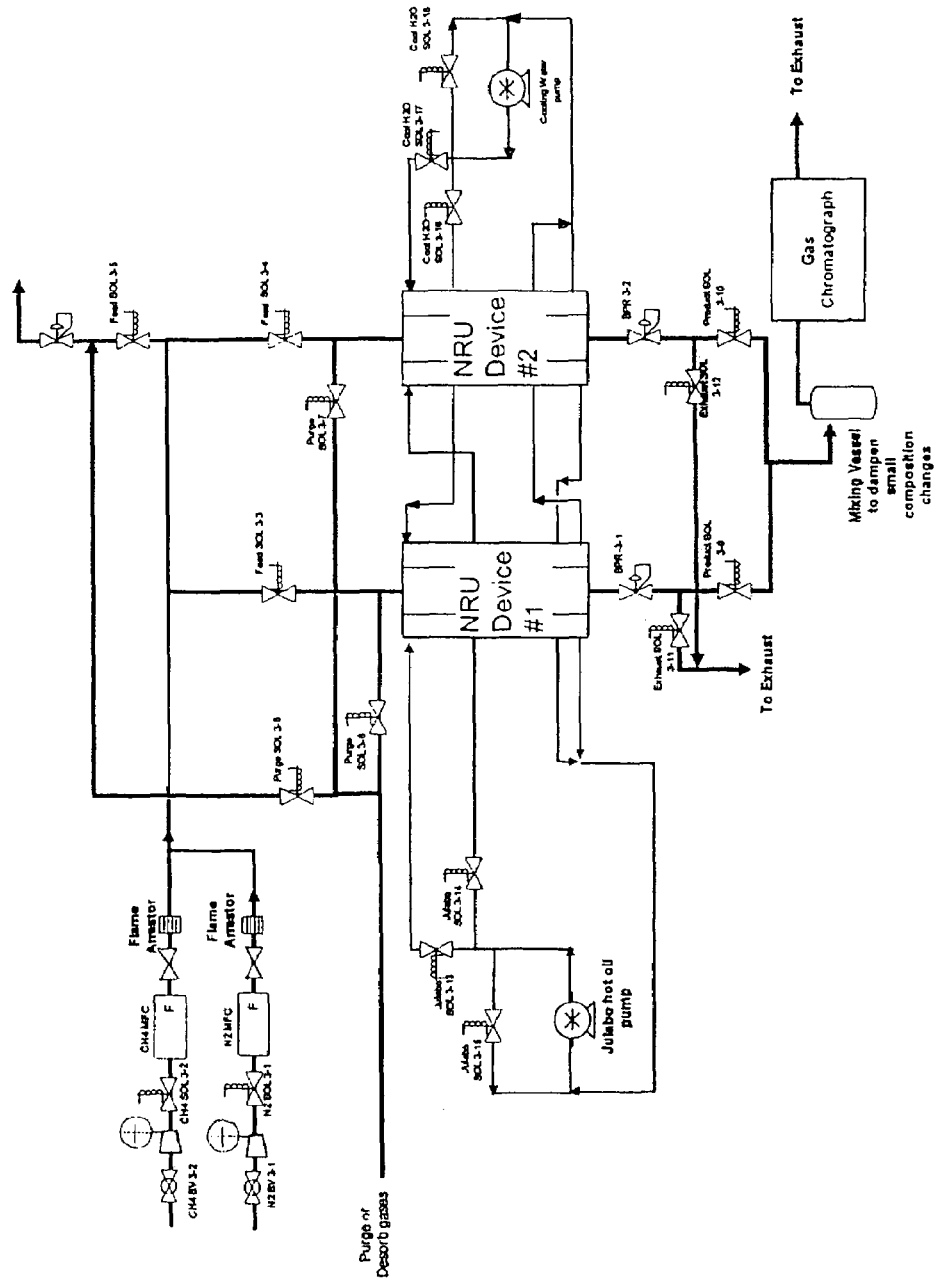
FIG. 43 is a flow diagram of an experimental test setup for an ultra-fast thermal swing adsorption single channel nitrogen rejection unit.
Figure 44:
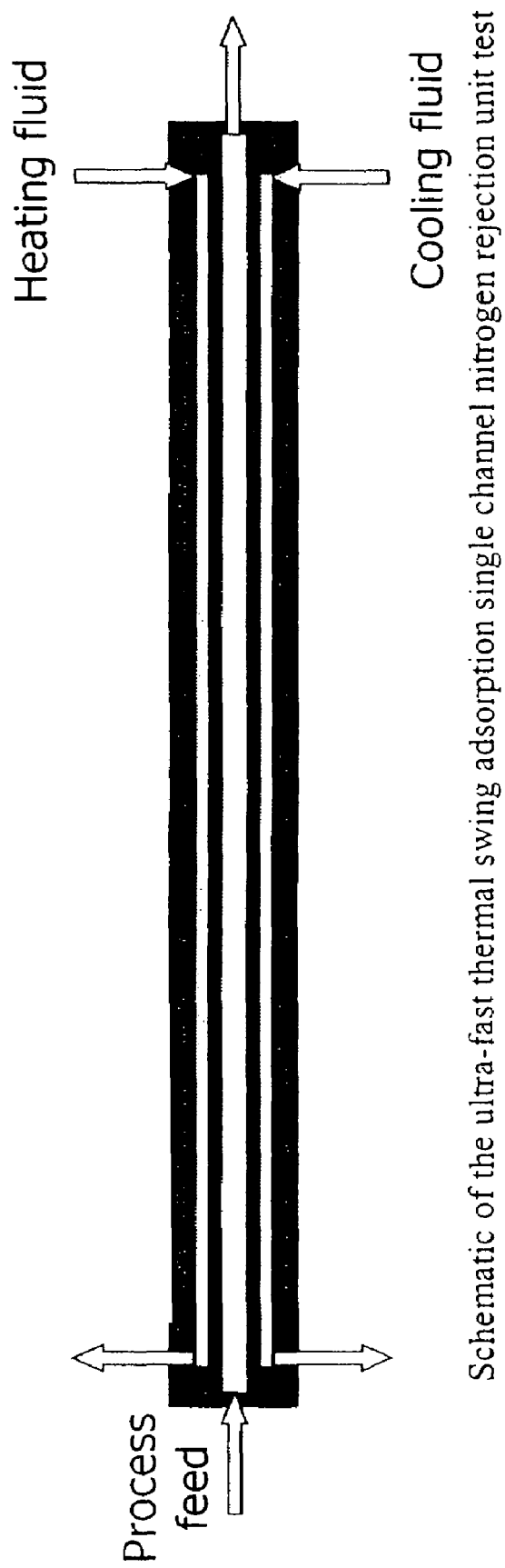
FIG. 44 is a schematic illustration of the ultra-fast thermal swing adsorption single channel nitrogen rejection unit shown in FIG. 43.

An experimental test setup (see FIG. 43) is designed to test the performance of the ultra-fast thermal swing adsorption single channel test device. The primary system components are two identical microchannel devices each having a cooling channel, a process channel and a heating channel (see FIG. 44). A chiller delivers cold heat exchange fluid (propylene glycol/water mixture) to the cooling channel via the cooling loop and a Julabo hot oil pump & heater delivers hot oil to the heating channel via the heating loop. The system is operated by alternately opening or closing a system of solenoid valves to cycle each device between cold (adsorption) and hot (desorption) states. During the adsorption (cold) stage for a given device, a methane and nitrogen mixture is fed to the process channel of that device while the cooling fluid is fed to the cooling channel. Upon switching to the desorption (hot) stage in a given device, the feed mixture and cooling fluid are diverted to the other device and the effluent from the other device directed to the exhaust (waste stream), while heating fluid is fed to the first device to cause the adsorbed gas (now enriched in methane) to desorb from the first device process channel and flow into the product stream. The system is cycled in this way to continually produce a stream of methane-enriched product gas and a stream of nitrogen-enriched waste exhaust gas.

Performance of the nitrogen rejection unit single channel test device may be evaluated via analysis of the product and exhaust streams. In each of these streams the flow rate and composition may be measured to determine the product purity and methane recovery at a given condition. Flow rate may be measured using a 10 liter dry test meter, while composition may be measured by gas chromatograph. A mixing vessel may be included upstream of the gas chromatograph to dampen out variations in composition in the product outlet flow.

Feed mixtures may consist of mixtures of nitrogen and methane (with option to add small fractions of air and $CO_2$ later), which are metered separately with calibrated Brooks mass flow controllers and mixed before entering the test device process channel.

Prior to testing the single channel NRU may be loaded with the selected adsorbent (i.e. 80-100 mesh Calgon carbon) and tested. The adsorbent may be reduced to the desired particle size range by crushing and grinding the as-received activated carbon with a mortar and pestle, then hand-sieving between US standard 80 and 100 mesh sieves and regrinding and resieving the oversized material after each sieving step.

EXAMPLE 5

Figure 45:
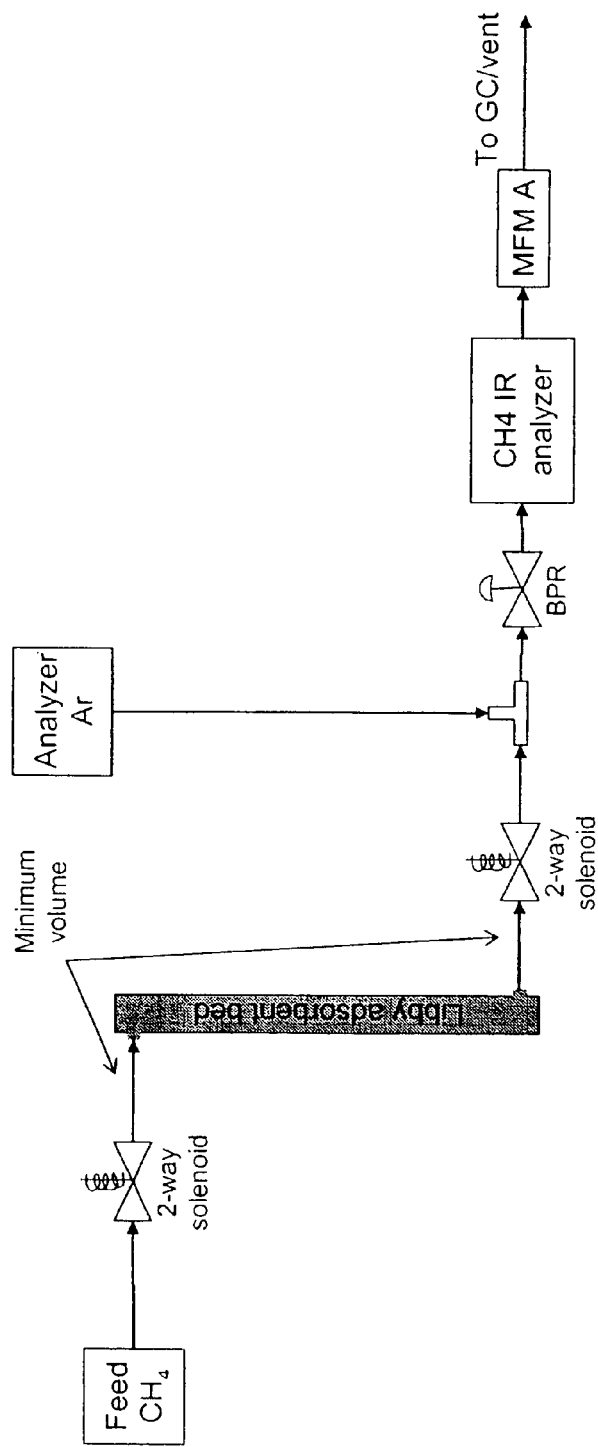
FIG. 45 is an illustration of an experimental test setup for an ultra-fast thermal swing adsorption single channel nitrogen rejection unit test device (heat exchange fluid flow not shown.)

A test setup for an ultra-fast TSA single channel NRU test device is illustrated in FIG. 45. Pure methane (metered by Brooks mass flow controller) is used as the process gas in this setup.

Figure 46:
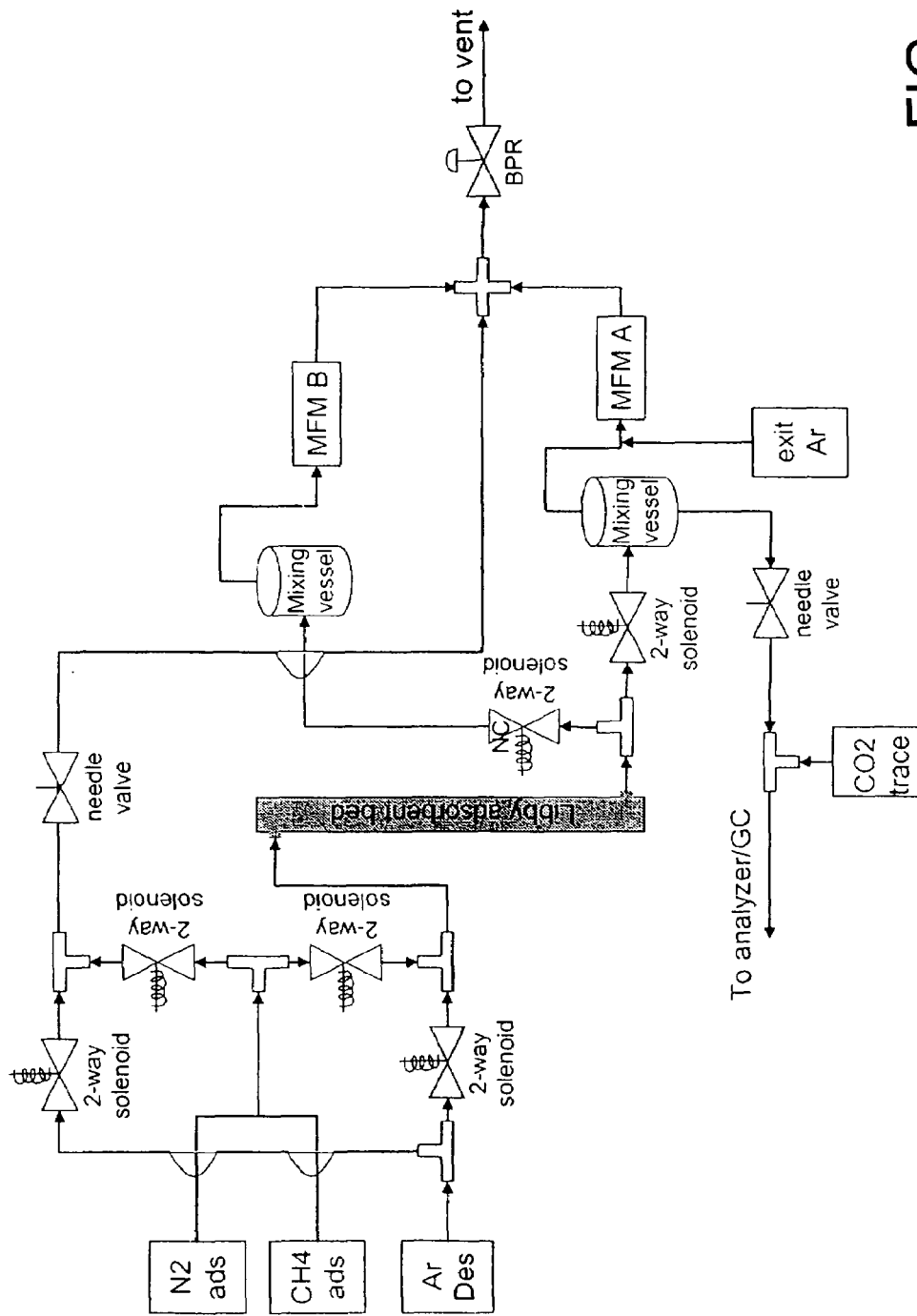
FIG. 46 is an illustration of an experimental test setup for an ultra-fast thermal swing adsorption single channel nitrogen rejection unit test device used for testing product purity (heat exchange fluid flow not shown).

A modified testing configuration (see FIG. 46) and procedure are used to estimate the purity achieved in the product of the ultra-fast TSA tests, while eliminating the diluting effect of dead volume before and after the adsorbent bed. The test setup in FIG. 46 differs from that shown in FIG. 45 in that all the gases (adsorption or sweep gases which bypass the bed, product gas, and tail gas) are eventually combined and sent to a common backpressure regulator. This allows operation with a steady back-pressure, since the total flow through the back-pressure regulator is constant at any given time. In order to sample the product gas line, the product is withdrawn from a point upstream of the point of product/tailgas mixing and a separate Ar gas flow is provided downstream of the sampling point to allow analysis of the entire product stream, diluted with some Ar. The test setup is designed to allow a single pulse of product to be sent to the gas analyzer system, where the capacity and product purity can be analyzed.

The procedure for estimating product purity is as follows:
1) The bed and product lines are swept out with Ar gas until no more $CH_4$ is detected in the product line while swinging the bed between about 40 and about 60° C. (10 second half-cycle time).
2) Then the bed is saturated with a mixture of 70% $CH_4$/30% $N_2$ with the bed still swinging between about 40 and about 60° C. (10 second half-cycle time), sending the bed outlet stream to the tailgas line.
3) Next, the bed thermal cycling is stopped and the bed is held at abut 40° C. (cold heat exchange fluid continued to flow) while flushing the bed with 450 sccm Ar for 4, 5, or 6 seconds (depending on desired flush time), again sending the bed outlet stream to the tailgas line.
4) Finally, while continuing to flush with 450 sccm Ar, the bed outlet stream is sent to the pre-flushed product line and the bed temperature is rapidly raised to 60° C. (240 ml/min hot fluid continues to flow).

The product stream is analyzed. By integrating the $CH_4$ outlet flow over time ($CH_4$ analyzer), the $CH_4$ capacity is estimated. By analyzing the $CH_4:N_2$ ratio (gas chromatograph), the methane content of the sorbed bed gases is estimated.

Figure 47:
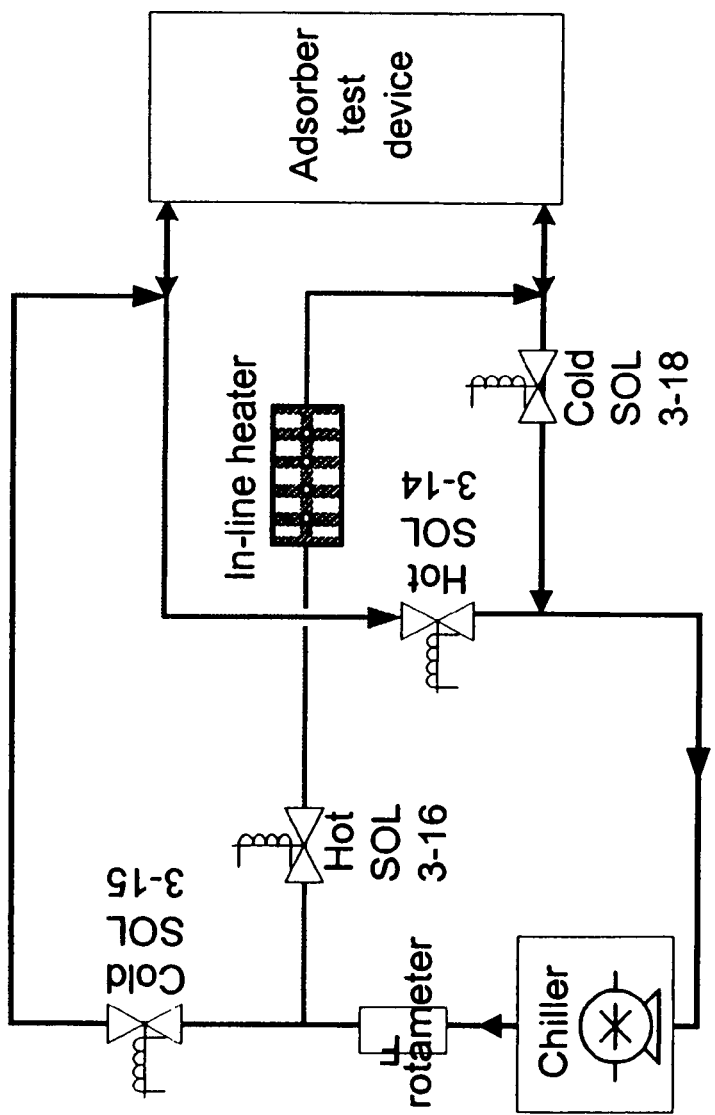
FIG. 47 is a flow diagram for an experimental heat exchange fluid system for the cylindrical ultra-fast thermal swing adsorption single channel nitrogen rejection units illustrated in FIGS. 45 and 46 (process flow not shown).

For both process gas configurations (FIGS. 45 and 46), the heat exchange configuration shown in FIG. 47 is used. In this configuration, heat exchange fluid (a propylene glycol/water mixture) is first cooled by a chiller, and then either delivered to the device (during the cooling portion of the cycle) or sent to an in-line microchannel electric heater where it is heated to the desired inlet hot temperature before being sent to the device. The change in direction of the heat exchange fluid is accomplished by opening or closing the appropriate combination of valves. For example, in FIG. 47, when solenoid valves SOL 3-14 and SOL 3-16 are open and SOL 3-15 and SOL 3-18 are closed, the heat exchange fluid is heated by the in-line heater and flows upwardly through the device. Then in the cooling portion of the cycle all the valve positions are changed, simultaneously, and the chilled fluid flows downwardly through the device. Because the test device temperature changes quickly (on the order of seconds), the hot and cold streams remain nearly isothermal in the tubing of the test setup external to the device during the portion of the cycle in which they remain stagnant.

In this embodiment, a single heat exchange fluid is used for both the hot and cold heat exchange stream flows. In this approach, the heat exchange fluid is either routed through a hot loop or a cold loop, alternately, with the one stream's flow being stagnant whenever the other stream is flowing. This has the advantage of a simplified process, since redundant reservoir, pump, and metering systems are not required. This arrangement is particularly desirable when adsorbers are not being operated in pairs, since the fluid does not have to be directed elsewhere during part of the cycle.

EXAMPLE 6

Figure 48:
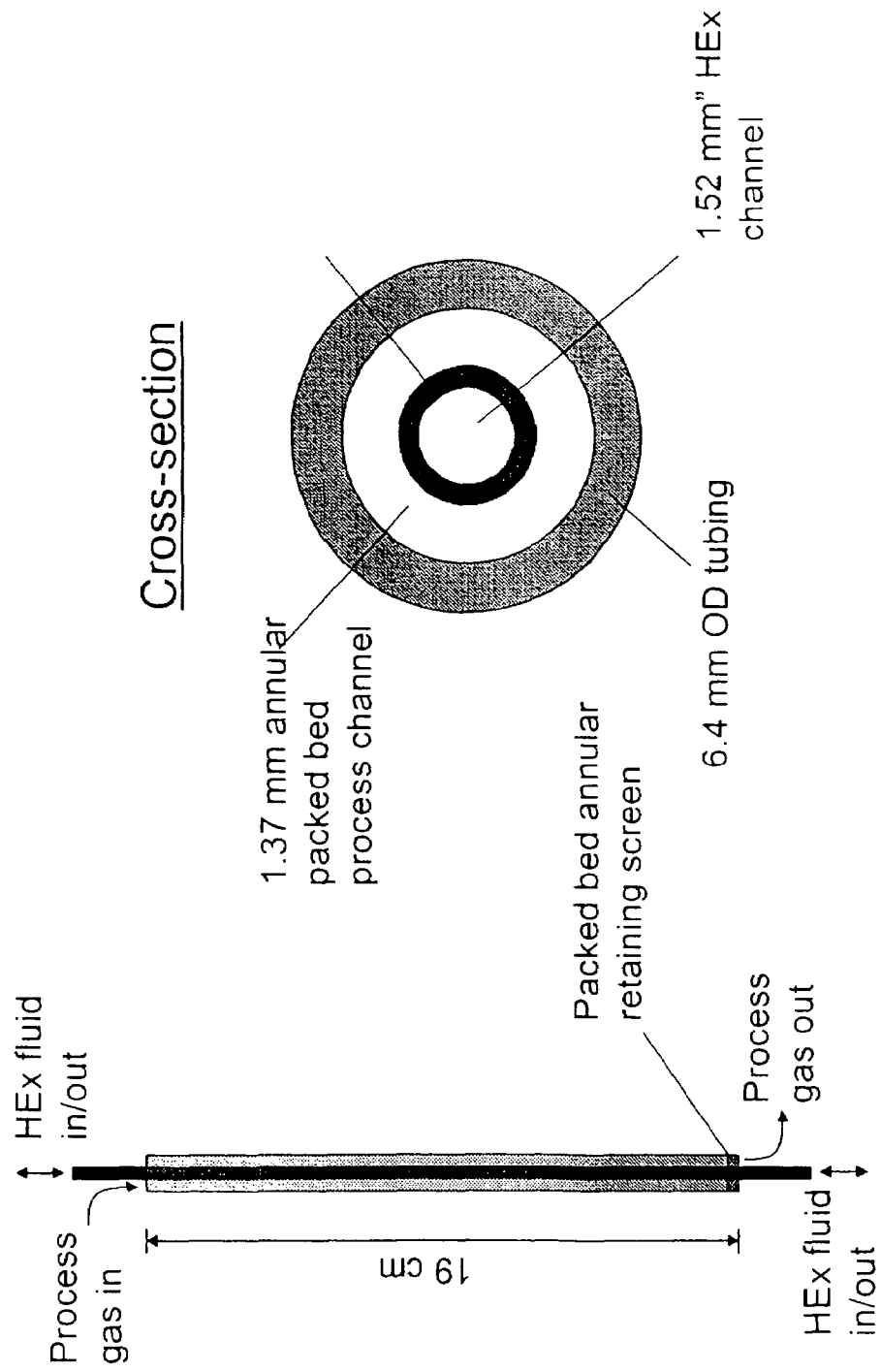
FIG. 48 is an illustration of a cylindrical ultra-fast thermal swing adsorption single channel nitrogen rejection unit test device.

A stainless steel cylindrical single-channel test device (see FIG. 48) is used to demonstrate the feasibility of the ultra-fast thermal swing approach. The test device includes several key features, including the capability of including three 0.5 mm diameter thermocouples in the bed along the axis of flow, a 1.4 mm thick (19 cm long) packed bed, a 0.15 mm thick heat transfer wall, and a single heat exchange channel which alternates between heating and cooling fluid during thermal cycling. The cooling fluid flow runs vertically downward during the adsorption portion of the cycle and then the heating fluid runs in the opposite direction (vertically upward) through the same channel during the desorption portion of the cycle. A 150 mesh stainless steel retaining screen is used at the annular packed bed outlet. Vespule-graphite ferrules with drilled holes and stainless-steel swagelock fittings are used to seal the feed-through for the inner heat exchange tube and to seal three 12-18 inch 0.5 mm diameter type K thermocouples fed-through above the top of the bed. Inlet and outlet process lines are reduced to 1.8 mm ID at the inlet and outlet to minimize dead volume.

The adsorbent is reduced to the desired particle size range by crushing and grinding the as-received activated carbon with a mortar and pestle, then hand-sieving between US standard 80 and 100 mesh sieves and regrinding and re-sieving the oversized material after each sieving step. The adsorbent is then dried at 70° C. overnight before mixing with enough industrial diamond powder to obtain a 25% high-thermal-conductivity powder (by volume) mixture. The high-thermal-conductivity powder used is an industrial diamond powder (MBG-660) obtained from Diamond Innovations. Twenty-five volume percent diamond powder is used in order to increase the effective thermal conductivity of the mixture to about 1-2 W/m-K (estimated). The effective thermal conductivity of the packed bed is estimated to be the volume-fraction (v)-weighted geometric mean of the thermal conductivities (k) of the gas, diamond powder, and adsorbent powder, as shown in the following equation:

$$k_{packed\ bed} \cong k_{adsorbent}^{v_{adsorbent}} \cdot k_{high\ conductivity\ powder}^{v_{high\ conductivity\ powder}} \cdot k_{gas}^{v_{gas}}$$

The adsorbent/diamond mixture is then wetted with about 0.15 ml of water for every ml of adsorbent mixture (75% Calgon carbon, 25% diamond v/v) to prevent segregation due to density differences between the adsorbent and diamond powders during adsorbent bed loading. The device is then dried at 70° C. overnight before installation in the test stand.

In one set of tests, the cylindrical test device is tested over a range of cycle times (3-15 seconds), heat exchange fluid flow rates (80-240 ml/min) and heat exchange fluid temperatures (70-90° C. hot and 30-10° C. cold.) Although most tests are performed at 100 psig process pressure, tests at 80 and 120 psig are also included. Isothermal tests are also performed to compare the measured $CH_4$ adsorption isothermal capacity with previously measured values. Even after more than 2100 full thermal cycles spanning a 10-30 degree Kelvin temperature range, the adsorbent particulates remain fully intact upon inspection at 10-40X magnification.

Figure 49:
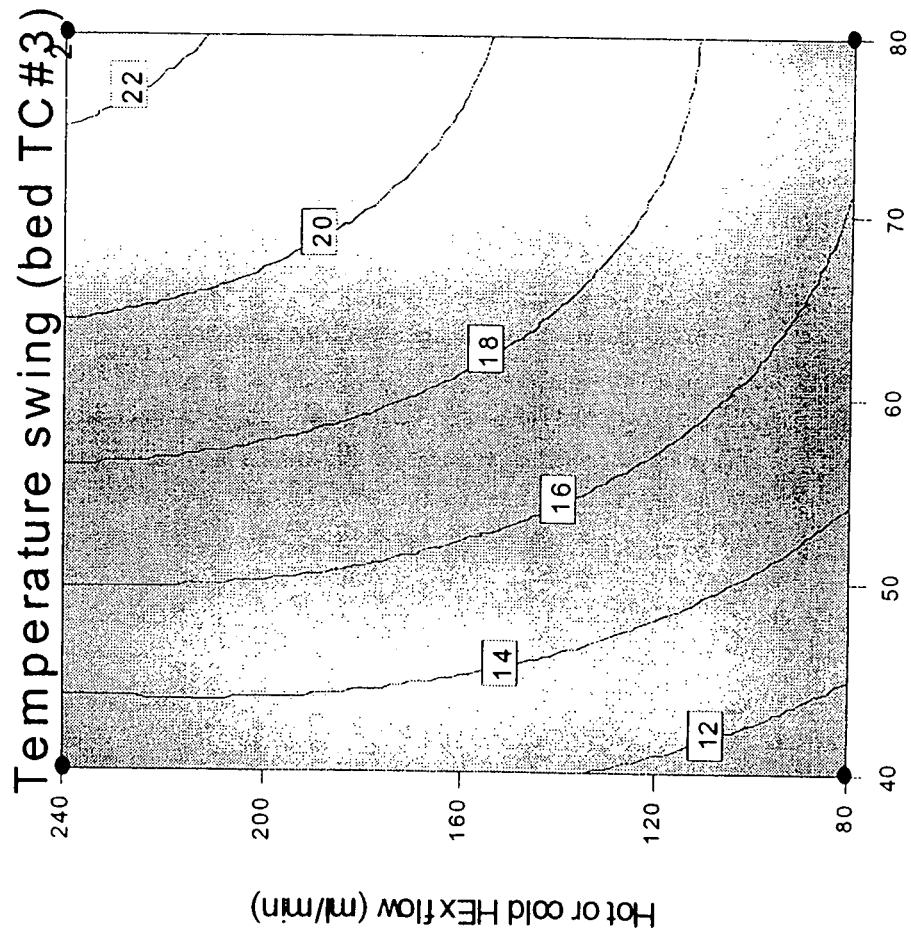
FIG. 49 is a quadratic fit of bed temperature swing data in a cylindrical ultra-fast thermal swing adsorption test device for a cycle time of 10 seconds.

The setup and cylindrical test device with 25% (v/v) industrial diamond is sufficient to obtain the desired thermal swing between 40 and 60° C. for a swing time of about 5 seconds (that is, 5 seconds of heating followed by 5 seconds of cooling) for a properly packed adsorbent bed with 240 ml/min heat exchange fluid flow, with 90° C. and 10° C. hot and cold heat exchange fluid temperatures, respectively. A plot of the thermal swing response for a typical bed thermocouple reading to heat exchange (HEx) fluid flow rate (y-axis) and temperature difference (x-axis) is shown in FIG. 49 for a cycle time of 10 seconds. In FIG. 49, the contours labels show the difference between the average maximum and minimum temperature measured at one axial location in the bed during preliminary thermal swing adsorption tests in the cylindrical test device. The contours in FIG. 49 are interpolated based on a quadratic fit of the data. A 20° C. swing in the packed bed can be achieved with heat exchange fluid temperature swings of 70-80° C. and heat exchange fluid flow rates of 160-240 ml/min.

Figure 50:
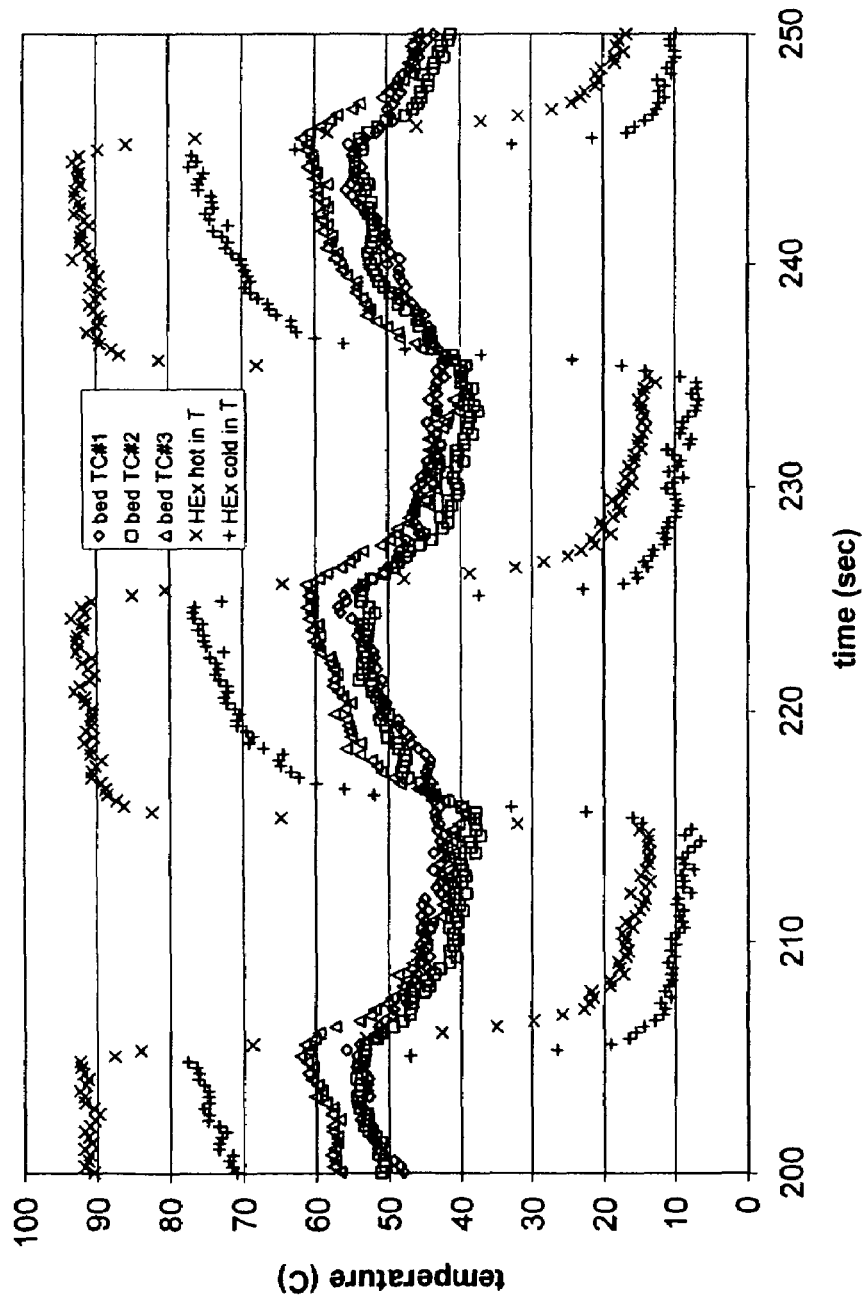
FIG. 50 is a plot showing thermal swing temperature data taken during preliminary ultra-fast thermal swing experiments with pure methane feed, 240 ml/min heat exchange fluid at 90° C. hot and 10° C. cold with a cycle time of 10 seconds.

A plot of typical real-time measurements during thermal swing adsorption is shown in FIG. 50.

Figure 51:
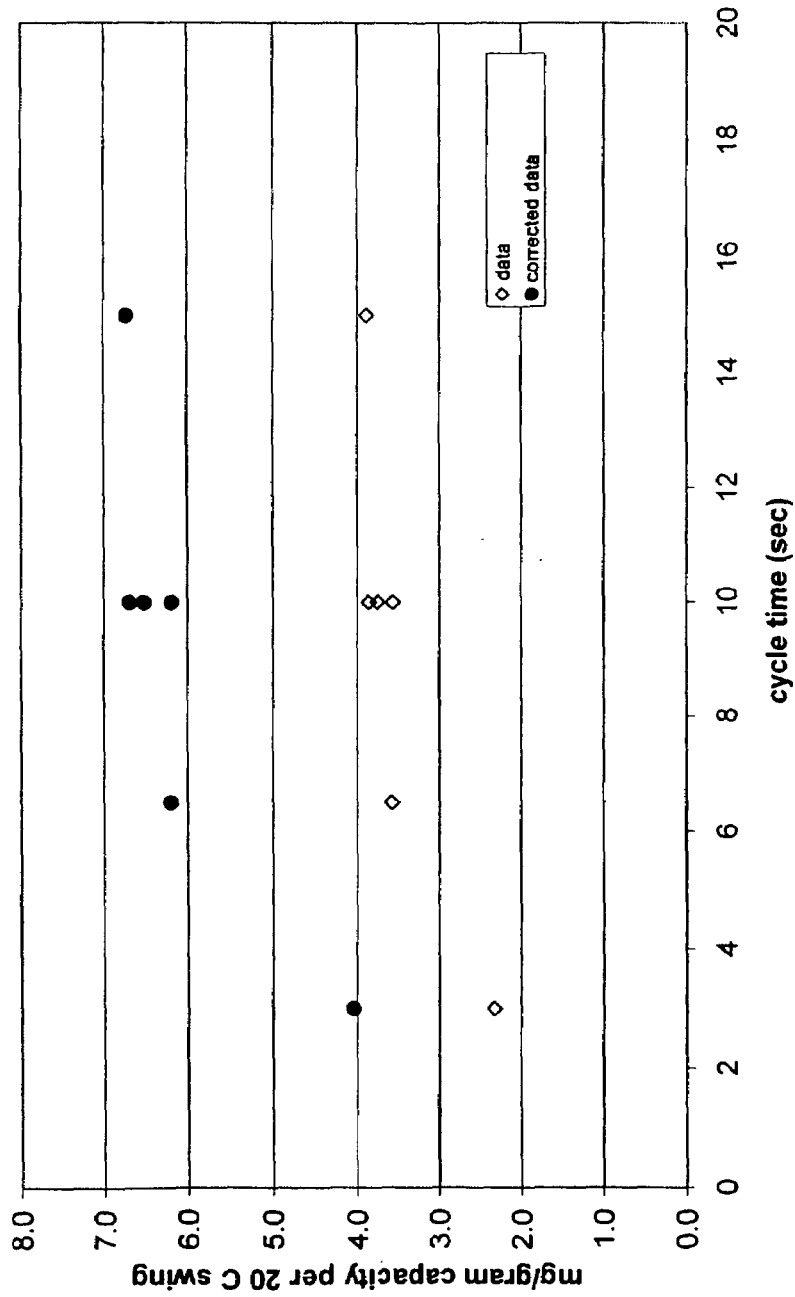
FIG. 51 is a plot showing differential methane capacity (normalized to 20° C. temperature swing) from preliminary thermal swing adsorption tests on a cylindrical test device. Corrected values assume that only the adsorbent recovered from the device after removal from test setup (60% of initial) is present during testing.

The tests indicate that the adsorbent bed differential capacity is near the expected value when corrected for lost adsorbent (see FIG. 51). Because the bed temperatures in the device take a few seconds to reach a maximum, the differential capacity during thermal swing is less than the full capacity based on isothermal adsorption tests (for example, it appears that for a 5-6 second swing time, about 60% of the isothermal capacity might be expected).

The isothermal differential capacity at 100 psig between 40 and 60° C. (6 $mgCH_4$/gram adsorbent/20° C.) is only about 65% of the value measured earlier (9.4 mg $CH_4$/gram adsorbent). This is in agreement with the finding upon uninstalling the device, that 30% of the initial bed weight loaded is recovered from the tubing upstream of the bed and only 60% of the initial bed weight loaded is recovered from the test device.

Tests performed at 80 and 120 psig give thermal swing differential capacities of about 96% and 105% respectively, relative to those measured at 100 psig, all other settings being held constant.

Flushed dead volume half-cycle tests used to determine product purity for a 10 second half-cycle between 40 and 60° C. indicate that the 70% $CH_4$ feed is enriched to about 91% $CH_4$ in a single cycle.

While the invention has been explained in relation to various detailed embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for separating a first fluid from a fluid mixture comprising the first fluid, the process comprising:
   (A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, removing non-sorbed parts of the fluid mixture from the microchannel separator, flowing the cooled heat exchange fluid out of the at least one heat exchange channel, heating the cooled heat exchange fluid to form a heated heat exchange fluid; and
   (B) heating the sorption medium to desorb first fluid from the sorption medium, the sorption medium being heated using the heated heat exchange fluid formed in step (A), the heated heat exchange fluid being in at least one heat exchange channel, the at least one heat exchange channel being in thermal contact with the sorption medium, removing desorbed first fluid from the microchannel separator, flowing the heated heat exchange fluid out of the at least one heat exchange channel, cooling the heated heat exchange fluid to form a cooled heat exchange fluid, the cooled heat exchange fluid being used in step (A) to cool the fluid mixture and the sorption medium.

2. The process of claim 1 wherein during cooling the heated heat exchange fluid to form the cooled heat exchange fluid the heat exchange fluid undergoes expansion.

3. The process of claim 2 wherein the heat exchange fluid flows through at least one expansion device.

4. The process of claim 1 wherein during heating the cooled heat exchange fluid to form the heated heat exchange fluid the heat exchange fluid undergoes compression.

5. The process of claim 4 wherein the heat exchange fluid is compressed in at least one compressor.

6. The process of claim 1 wherein during the cooling of the fluid mixture and the sorption medium the heat exchange fluid is at least partially vaporized.

7. The process of claim 6 wherein the heat exchange fluid is at least partially vaporized in the at least one heat exchange channel.

8. The process of claim 1 wherein during the heating of the sorption medium the heat exchange fluid is at least partially condensed.

9. The process of claim 8 wherein the heat exchange fluid is at least partially condensed in the at least one heat exchange channel.

10. The process of claim 1 wherein steps (A) and (B) are conducted simultaneously in separate microchannel separators, step (A) being conducted in a first microchannel separator while step (B) is conducted in a second microchannel separator, and step (B) being conducted in the first microchannel separator while step (A) is conducted in the second microchannel separator.

11. The process of claim 1 wherein the first fluid comprises methane and the fluid mixture comprises methane and nitrogen.

12. The process of claim 1 wherein the sorption medium is at an average sorbent temperature in the range from about 20° C. to about 45° C. during step (A) and an average sorbent temperature in the range from about 55° C. to about 80° C. during step (B).

13. The process of claim 1 wherein the at least one heat exchange channel in step (A) comprises at least one microchannel and the at least one heat exchange channel in step (B) comprises at least one microchannel.

14. The process of claim 1 wherein the at least one heat exchange channel used in step (A) and the at least one heat exchange channel used in step (B) are the same.

15. The process of claim 1 wherein the at least one heat exchange channel used in step (A) and the at least one heat exchange channel used in step (B) are different.

16. The process of claim 1 wherein fluid flows in the microchannel separator in a first direction, the microchannel separator having a first side and a second side, the at least one heat exchange channel comprising at least one first heat exchange channel adjacent to the first side of the microchannel separator and at least one second heat exchange channel adjacent the second side of the microchannel separator, the microchannel separator being cooled during step (A) by the cooled heat exchange fluid flowing in the at least one first heat exchange channel in a second direction, the microchannel separator being heated during step (B) by the heated heat exchange fluid flowing in the at least one second heat exchange channel in the first direction, the second direction being counter current to the first direction.

17. The process of claim 1 wherein fluid flows in the microchannel separator in a first direction, the microchannel separator having a first side and a second side, the at least one heat exchange channel comprising at least one first heat exchange channel adjacent to the first side of the microchannel separator and at least one second heat exchange channel adjacent to the second side of the microchannel separator, the microchannel separator being cooled during step (A) by the cooled heat exchange fluid flowing in the at least one first heat exchange channel in a second direction and the at least one second heat exchange channel in the first direction, the microchannel separator being heated during step (B) by the heated heat exchange fluid flowing in the at least one second heat exchange channel in the first direction and the at least one first heat exchange channel in the second direction, the first direction being counter current to the second direction.

18. The process of claim 1 wherein fluid flows in the microchannel separator in a first direction, the microchannel separator having a first side and a second side, the at least one heat exchange channel comprising at least one first heat exchange channel adjacent to the first side of the microchannel separator and at least one second heat exchange channel adjacent the second side of the microchannel separator, the microchannel separator being cooled during step (A) by the cooled heat exchange fluid flowing through the at least one first and at least one second heat exchange channels in the first direction or in a second direction, the microchannel separator being heated during step (B) by the heated heat exchange fluid flowing through the at least one first and at least one second heat exchange channels in the first direction, the first direction being counter current to the second direction.

19. The process of claim 1 wherein the heat exchange fluid is heated during step (A) by compressing the heat exchange fluid in a compressor.

20. The process of claim 1 wherein the heat exchange fluid is cooled during step (B) by flowing the heat exchange fluid through an expansion device.

21. The process of claim 1 wherein the microchannel separator comprises at least one process microchannel, the at least one process microchannel being made of a material comprising: steel; aluminum; titanium; nickel; platinum; rhodium; copper; chromium; brass; an alloy of any of the foregoing metals; a polymer; ceramics; glass; a composite comprising a polymer and fiberglass; quartz; silicon; or a combination of two or more thereof.

22. The process of claim 1 wherein the at least one heat exchange channel is made of a material comprising: steel; aluminum; titanium; nickel; platinum; rhodium; copper; chromium; brass; an alloy of any of the foregoing metals; a polymer; ceramics; glass; a composite comprising polymer and fiberglass; quartz; silicon; or a combination of two or more thereof.

23. The process of claim 1 wherein the sorption medium is in the form of a flow-by sorption medium, or a flow-through sorption medium.

24. The process of claim 1 wherein the microchannel separator comprises at least one process microchannel, the at least one process microchannel having an interior surface, the sorption medium being coated on the interior surface of the at least one process microchannel.

25. The process of claim 1 wherein the sorption medium is in the form of particulate solids.

26. The process of claim 1 wherein the sorption medium is in the form of particulate solids which are mixed with thermally conductive particulate solids to increase the thermal conductivity of the sorption medium.

27. The process of claim 26 wherein the thermally conductive particulate solids comprise diamond powder.

28. The process of claim 1 wherein the sorption medium is in the form of a foam, felt, wad, gauze, honeycomb, fin assembly, flow-by structure with an adjacent gap, foam with an adjacent gap, fin assembly with an adjacent gap, washcoat on an inserted substrate, gauze that is parallel to the flow direction with a corresponding gap for flow, or a combination thereof.

29. The process of claim 1 wherein the sorption medium comprises metal-organic complex, copper metal complex, zeolite, activated carbon, microporous carbon powder, porous carbon foam, carbon nanotubes, or a combination of two or more thereof.

30. The process of claim 1 wherein the sorption medium comprises activated carbon particulates and diamond powder.

31. The process of claim 1 wherein at least about 5% by volume of the first fluid sorbed during step (A) is desorbed during step (B), the time to complete steps (A) and (B) being up to about 10 seconds.

32. The process of claim 1 wherein the fluid mixture prior to step (A) comprises methane, nitrogen, and optionally one or more of carbon dioxide, oxygen and water vapor.

33. The process of claim 1 wherein the fluid mixture comprises methane, the concentration of methane in the fluid mixture prior to step (A) being in the range from about 1% to about 98% by volume.

34. The process of claim 1 wherein the fluid mixture comprises a methane containing composition derived from a coal mine or landfill.

35. The process of claim 1 wherein the fluid mixture comprises methane and nitrogen, the microchannel separator comprising a microchannel separator core containing a plurality of process microchannels, the process microchannels containing the sorption medium, the fluid mixture flowing through the process microchannels at a flow rate of at least about 20 standard cubic meters per hour per cubic meter of volume of the microchannel separator core, the recovery of methane or nitrogen from the fluid mixture being at least about 50% by volume of the methane or nitrogen in the fluid mixture entering the microchannel separator.

36. The process of claim 1 wherein the non-sorbed parts of the fluid mixture removed from the microchannel separator during step (A) comprises a tail gas, the microchannel separator being heated during step (B) in part by combusting of the tail gas.

37. The process of claim 1 wherein during step (A) pressure within the microchannel separator is increased to remove non-sorbed parts of the fluid mixture from the microchannel separator.

38. The process of claim 1 wherein during step (B) pressure within the microchannel separator is increased to remove desorbed methane or desorbed nitrogen from the microchannel separator.

39. The process of claim 1 wherein the flow of fluid into and out of the microchannel separator is controlled by valves with actuation times of less than about one second.

40. A process for separating a first fluid from a fluid mixture comprising the first fluid, the process being conducted in a microchannel separator having an inlet valve and an outlet valve, the process comprising:
  (A) opening the inlet valve and the outlet valve and flowing the fluid mixture in the microchannel separator in contact with a sorption medium until at least part of the first fluid is sorbed by the sorption medium, and flowing non-sorbed parts of the fluid mixture out of the microchannel separator, the inlet valve and the outlet valve remaining open dueing step (A); and
  (B) closing the inlet valve and the outlet valve, heating the microchannel separator to desorb the first fluid from the sorption medium, increasing pressure within the microchannel separator and opening the outlet valve to cause the desorbed first fluid to flow out of the microchannel separator.

41. The process of claim 40 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent the second side of the microchannel separator, the microchannel separator being cooled during step (A) by a cooled heat exchange fluid flowing in the at least one first heat exchange channel in a second direction, the microchannel separator being heated during step (B) by a heated heat exchange fluid flowing in the at least one second heat exchange channel in the first direction, the second direction being counter current to the first direction.

42. The process of claim 40 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent to the second side of the microchannel separator, the microchannel separator being cooled during step (A) by a cooled heat exchange fluid flowing in the at least one first heat exchange channel in a second direction and the at least one second heat exchange channel in the first direction, the microchannel separator being heated during step (B) by a heated heat exchange fluid flowing in the at least one second heat exchange channel in the first direction and the at least one first heat exchange channel in the second direction, the first direction being counter current to the second direction.

43. The process of claim 40 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent the second side of the microchannel separator, the microchannel separator being cooled during step (A) by a cooled heat exchange fluid flowing through the at least one first and at least one second heat exchange channels in the first direction or in a second direction, the microchannel separator being heated during step (B) by a heated heat exchange fluid flowing through the at least one first and at least one second heat exchange channels in the first direction, the first direction being counter current to the second direction.

44. A process for separating a first fluid from a fluid mixture comprising the first fluid, the process comprising:
  (A) flowing the fluid mixture into a microchannel separator in contact with a sorption medium, the sorption medium comprising a mixture of activated carbon particulates and thermally conductive particulates, the thermally conductive particulates comprising diamond powder, the fluid mixture being maintained in the microchannel separator until at least part of the first fluid is sorbed by the sorption medium, removing non-sorbed parts of the fluid mixture from the microchannel separator; and
  (B) desorbing first fluid from the sorption medium, removing desorbed first fluid from the microchannel separator.

45. The process of claim 44 wherein pressure within the microchannel separator is increased during step (A) to cause the non-sorbed parts of the fluid mixture to flow out of the microchannel separator.

46. The process of claim 44 wherein pressure within the microchannel separator is increased during step (B) to cause the desorbed first fluid to flow out of the microchannel separator.

47. The process of claim 44 wherein the first fluid comprises methane and the fluid mixture comprises methane and nitrogen.

48. The process of claim 44 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent the second side of the microchannel separator, the microchannel separator being cooled during step (A) by a cooled heat exchange fluid flowing in the at least one first heat exchange channel in a second direction, the microchannel separator being heated during step (B) by a heated heat exchange fluid flowing in the at least one second heat exchange channel in the first direction, the second direction being counter current to the first direction.

49. The process of claim 44 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent to the second side of the microchannel separator, the microchannel separator being cooled during step (A) by a cooled heat exchange fluid flowing in the at least one first heat exchange channel in a second direction and the at least one second heat exchange channel in the first direction, the microchannel separator being heated during step (B) by a heated heat exchange fluid flowing in the at least one second heat exchange channel in the first direction and the at least one first heat exchange channel in the second direction, the first direction being counter current to the second direction.

50. The process of claim 44 wherein fluid flows in the microchannel separator in a first direction, the microchannel separator having a first side and a second side and at least one heat exchange channel, the at least one heat exchange channel comprising at least one first heat exchange channel adjacent to the first side of the microchannel separator and at least one second heat exchange channel adjacent the second side of the microchannel separator, the microchannel separator being cooled during step (A) by a cooled heat exchange fluid flowing through the at least one first and at least one second heat exchange channels in the first direction or in a second direction, the microchannel separator being heated during step (B) by the heated heat exchange fluid flowing through the at least one first and at least one second heat exchange channels in the first direction, the first direction being counter current to the second direction.

51. A process for separating nitrogen from a fluid mixture comprising nitrogen and methane, the process comprising:
   (A) flowing the fluid mixture in a microchannel separator in contact with a sorption medium and cooling the fluid mixture and the sorption medium to sorb at least part of the methane on the sorption medium, the sorption medium comprising activated carbon particulates and thermally conductive particulates, the fluid mixture and the sorption medium being cooled by a cooled heat exchange fluid in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator; and
   (B) heating the sorption medium to desorb first fluid from the sorption medium, the sorption medium being heated using a heated heat exchange fluid, the heated heat exchange fluid being in at least one heat exchange channel, the at least one heat exchange channel being in thermal contact with the sorption medium, at least part of the heated heat exchange fluid being condensed in the at least one heat exchange channel, removing desorbed methane from the microchannel separator.

52. A process for separating a first fluid from a fluid mixture comprising the first fluid, the process comprising:
   (A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, the cooled heat exchange fluid being heated and/or at least partially vaporized in the at least one heat exchange channel, removing non-sorbed parts of the fluid mixture from the microchannel separator, flowing the cooled heat exchange fluid out of the at least one heat exchange channel through at least one first heat exchanger where it is cooled and/or at least partially condensed; and
   (B) heating the sorption medium to desorb first fluid from the sorption medium, the sorption medium being heated using a heated heat exchange fluid, the heated heat exchange fluid being in at least one heat exchange channel, the at least one heat exchange channel being in thermal contact with the sorption medium, the heated heat exchange fluid being cooled and/or at least partially condensed in the at least one heat exchange channel, removing desorbed first fluid from the microchannel separator, flowing the heated heat exchange fluid out of the at least one heat exchange channel through at least one second heat exchanger where it is heated and/or at least partially vaporized.

53. A process for separating a first fluid from a fluid mixture comprising the first fluid, the process comprising:
   (A) flowing the fluid mixture in a microchannel separator in contact with a sorption medium and cooling the fluid mixture and the sorption medium to sorb at least part of the first fluid on the sorption medium, the fluid mixture and the sorption medium being cooled by a cooled heat exchange fluid in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator, flowing the cooled heat exchange fluid out of the at least one heat exchange channel, compressing the cooled heat exchange fluid in a compressor to form a heated heat exchange fluid; and
   (B) heating the sorption medium to desorb first fluid from the sorption medium, the sorption medium being heated using the heated heat exchange fluid from step (A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the microchannel separator, flowing the heated heat exchange fluid out of the at least one heat exchange channel, flowing the heated heat exchange fluid through an expansion device to form a cooled heat exchange fluid, the cooled heat exchange fluid being used in step (A) to cool the fluid mixture and the sorption medium.

54. A process for separating a first fluid from a fluid mixture comprising the first fluid, the process comprising steps (I)(A), (I)(B), (II)(A) and (II)(B), steps (I)(A) and (II)(B) being conducted simultaneously, and steps (I)(B) and (II)(A) being conducted simultaneously:
   step (I)(A) comprising flowing part of the fluid mixture in a first microchannel separator in contact with a sorption medium and cooling the fluid mixture and the sorption medium to sorb at least part of the first fluid on the sorption medium, the fluid mixture and the sorption medium being cooled using the cooled heat exchange fluid formed in step (I)(B), the cooled heat exchange fluid being in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the first microchannel separator, flowing the cooled heat exchange fluid out of the at least one heat exchange channel, compressing the cooled heat exchange fluid in a compressor to form a heated heat exchange fluid;
   step (I)(B) comprising heating the sorption medium in the first microchannel separator to desorb first fluid from the sorption medium, the sorption medium being heated using the heated heat exchange fluid formed in step (I)(A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the first microchannel separator, flowing the heated heat exchange fluid out of the at least one heat exchange channel, flowing the heated heat exchange fluid through an expansion device to form a cooled heat exchange fluid;
   step (II)(A) comprising flowing part of the fluid mixture in a second microchannel separator in contact with a sorption medium and cooling the fluid mixture and the sorption medium to sorb at least part of the first fluid on the sorption medium, the fluid mixture and the sorption medium being cooled using the cooled heat exchange fluid formed in step (II)(B), the cooled heat exchange fluid being in at least one heat exchange channel, the at least one heat exchange channel being in thermal contact with the sorption medium, at least part of the cooled heat exchange fluid being vaporized in the at least one heat exchange channel, removing non-sorbed parts of the fluid mixture from the microchannel separator, flowing the cooled heat exchange fluid out of the at least one heat exchange channel, compressing the cooled heat exchange fluid in a compressor to form a heated heat exchange fluid;

step (II)(B) comprising heating the sorption medium in the second microchannel separator to desorb first fluid from the sorption medium, the sorption medium being heated using the heated heat exchange fluid formed in step (II)(A), the heated heat exchange fluid being in at least one heat exchange channel, the at least one heat exchange channel being in thermal contact with the sorption medium, at least part of the heated heat exchange fluid being condensed in the at least one heat exchange channel, removing desorbed first fluid from the second microchannel separator, flowing the heated heat exchange fluid out of the at least one heat exchange channel, flowing the heated heat exchange fluid through an expansion device to form a cooled heat exchange fluid.

55. A process for separating a first fluid from a fluid mixture comprising the first fluid, the process comprising steps (I)(A), (I)(B), (II)(A) and (II)(B), the process being conducted using a first microchannel separator, a second microchannel separator, a hot heat exchange fluid source, a cold heat exchange fluid source, the heat exchange fluid in the hot heat exchange fluid source being hot relative to the cold heat exchange fluid in the cold heat exchange fluid source, and a valve assembly for controlling the flow of process fluids and heat exchange fluids, steps (I)(A) and (I)(B) being conducted simultaneously with the valve assembly set in a first position, and steps (II)(B) and (II)(A) being conducted simultaneously with the valve assembly set in a second position:

step (I)(A) comprising flowing part of the fluid mixture through at least one valve in the valve assembly into the first microchannel separator in contact with a sorption medium in the first microchannel separator, flowing cold heat exchange fluid from the cold heat exchange fluid source through at least one valve in the valve assembly into at least one heat exchange channel in thermal contact with the sorption medium in the first microchannel separator, cooling the fluid mixture and the sorption medium in the first microchannel separator to sorb at least part of the first fluid on the sorption medium, removing non-sorbed parts of the fluid mixture from the first microchannel separator, flowing the non-sorbed parts of the fluid mixture through at least one valve in the valve assembly, flowing cold heat exchange fluid from the at least one heat exchange channel in the first microchannel separator through at least one valve in the valve assembly to the cold heat exchange fluid source;

step (I)(B) comprising flowing hot heat exchange fluid from the hot heat exchange fluid source through at least one valve in the valve assembly into at least one heat exchange channel in thermal contact with the sorption medium in the first microchannel separator and heating the sorption medium in the first microchannel separator to desorb first fluid from the sorption medium, removing desorbed first fluid from the first microchannel separator, flowing the desorbed first fluid through at least one valve in the valve assembly, flowing the hot heat exchange fluid from the at least one heat exchange channel in the first microchannel separator through at least one valve in the valve assembly to the hot heat exchange fluid source;

step (II)(A) comprising flowing part of the fluid mixture through at least one valve in the valve assembly into the second microchannel separator in contact with a sorption medium in the second microchannel separator, flowing cold heat exchange fluid from the cold heat exchange fluid source through at least one valve in the valve assembly into at least one heat exchange channel in thermal contact with the sorption medium in the second microchannel separator, cooling the fluid mixture and the sorption medium in the second microchannel separator to sorb at least part of the first fluid on the sorption medium, removing non-sorbed parts of the fluid mixture from the second microchannel separator, flowing the non-sorbed parts of the fluid mixture through at least one valve in the valve assembly, flowing the cold heat exchange fluid from the at least one heat exchange channel in the second microchannel separator through at least one valve in the valve assembly to the cold heat exchange fluid source;

step (II)(B) comprising flowing hot heat exchange fluid from the hot heat exchange fluid source through at least one valve in the valve assembly into at least one heat exchange channel in thermal contact with the sorption medium in the second microchannel separator, heating the sorption medium in the second microchannel separator to desorb first fluid from the sorption medium, removing desorbed first fluid from the second microchannel separator, flowing the desorbed first fluid through at least one valve in the valve assembly, flowing the hot heat exchange fluid from the at least one heat exchange channel in the second microchannel separator through at least one valve in the valve assembly to the hot heat exchange fluid source.

56. A process for upgrading sub-quality methane gas, the sub-quality methane gas comprising methane, water, nitrogen, oxygen and carbon dioxide, the process comprising:
(I) removing water from the sub-quality methane gas to form a first intermediate product;
(II) removing nitrogen from the first intermediate product by the steps of
    (A) flowing the first intermediate product into a microchannel separator in contact with a sorption medium, the first intermediate product being maintained in the microchannel separator until at least part of the nitrogen is sorbed by the sorption medium, removing the non-sorbed parts of first intermediate product from the microchannel separator to form a second intermediate product;
    (B) desorbing nitrogen from the sorption medium, removing the desorbed nitrogen from the microchannel separator; and
(III) removing oxygen and carbon dioxide from the second intermediate product to form upgraded methane gas.

57. A process for upgrading sub-quality methane gas, the sub-quality methane gas comprising methane, water, nitrogen, oxygen and carbon dioxide, the process comprising:
(I) removing water from the sub-quality methane gas to form a first intermediate product;

(II) removing nitrogen from the first intermediate product by the steps of
(A) flowing the first intermediate product into a microchannel separator in contact with a sorption medium, the first intermediate product being maintained in the microchannel separator until at least part of the methane is sorbed by the sorption medium, removing non-sorbed parts of the first intermediate product from the microchannel separator, the non-sorbed parts of the first intermediate product comprising nitrogen;

(B) desorbing methane from the sorption medium to form a second intermediate product, removing the second intermediate product from the microchannel separator; and (III) removing oxygen and carbon dioxide from the second intermediate product to form upgraded methane gas.

* * * * *